US010549797B2

(12) United States Patent
Ehrlich et al.

(10) Patent No.: US 10,549,797 B2
(45) Date of Patent: Feb. 4, 2020

(54) SIDE UNDERRIDE GUARD

(71) Applicant: Wabash National, L.P., Lafayette, IN (US)

(72) Inventors: Rodney P. Ehrlich, Monticello, IN (US); Andrzej Wylezinski, Lafayette, IN (US)

(73) Assignee: Wabash National, L.P., Lafayette, IN (US)

( * ) Notice: Subject to any disclaimer, the term of this patent is extended or adjusted under 35 U.S.C. 154(b) by 107 days.

(21) Appl. No.: 15/955,209

(22) Filed: Apr. 17, 2018

(65) Prior Publication Data

US 2018/0304941 A1    Oct. 25, 2018

Related U.S. Application Data

(60) Provisional application No. 62/487,743, filed on Apr. 20, 2017, provisional application No. 62/487,775, filed on Apr. 20, 2017.

(51) Int. Cl.
*B62D 35/00* (2006.01)
*B60R 19/56* (2006.01)

(52) U.S. Cl.
CPC .......... *B62D 35/001* (2013.01); *B60R 19/565* (2013.01)

(58) Field of Classification Search
CPC ...... B62D 35/001; B60R 19/565; Y02T 10/88
USPC ...................................................... 296/180.4
See application file for complete search history.

(56) References Cited

U.S. PATENT DOCUMENTS

| 164,252 | A | 6/1875 | Bass |
|---|---|---|---|
| 221,817 | A | 11/1879 | Heyn |
| 357,800 | A | 2/1887 | Wescott |
| 495,801 | A | 4/1893 | Henthorne |
| 564,027 | A | 7/1896 | Pratt |
| 824,541 | A | 6/1906 | Hager |
| 1,127,241 | A | 2/1915 | Hawksworth |
| 1,482,637 | A | 2/1924 | Fergusson |
| 2,231,089 | A | 2/1941 | Rorer |
| 2,318,863 | A | 5/1943 | Jabelmann |
| 2,737,411 | A | 3/1956 | Potter |
| 2,862,333 | A | 12/1958 | Cardiol |
| 3,256,655 | A | 6/1966 | Teeter |
| 3,401,953 | A | 9/1968 | Prohl |

(Continued)

FOREIGN PATENT DOCUMENTS

| CA | 2651688 A1 | 7/2009 |
|---|---|---|
| CA | 2715304 A1 | 3/2011 |

(Continued)

OTHER PUBLICATIONS

Non-Final Office Action issued in corresponding U.S. Appl. No. 12/760,798, dated Oct. 13, 2011, 12 pages.

(Continued)

*Primary Examiner* — Pinel E Romain

(74) *Attorney, Agent, or Firm* — Quarles & Brady LLP

(57) ABSTRACT

A side underride system configured to be coupled to a trailer may comprise a first skirt wall coupled to the trailer, positioned below a first side wall of the trailer, and extending along a first length of the trailer between a skirt wall front end and a skirt wall rear end and a cable system including a first cable coupled to the trailer, positioned below the first side wall, and extending along a second length of the trailer between a cable system front end and a cable system rear end, the skirt wall rear end being positioned forward of the cable system rear end.

20 Claims, 30 Drawing Sheets

(56) References Cited

U.S. PATENT DOCUMENTS

| | | |
|---|---|---|
| 3,483,939 A | 12/1969 | Maddock |
| 3,487,999 A | 1/1970 | Nash |
| 3,608,928 A | 9/1971 | Hooker |
| 3,707,804 A | 1/1973 | Cook |
| 3,711,146 A | 1/1973 | Madzsar |
| 3,852,965 A | 12/1974 | Rudd |
| 3,859,797 A | 1/1975 | Ayers |
| 4,006,932 A | 2/1977 | McDonald |
| 4,045,962 A | 9/1977 | Preus |
| 4,060,268 A | 11/1977 | Page, Jr. |
| 4,103,918 A | 8/1978 | Salden |
| 4,104,884 A | 8/1978 | Preus |
| 4,142,755 A | 3/1979 | Keedy |
| 4,190,381 A | 2/1980 | Knaus et al. |
| 4,236,745 A | 12/1980 | Davis |
| 4,262,961 A | 4/1981 | Schmidt |
| 4,282,946 A | 8/1981 | MacGuire |
| 4,352,502 A | 10/1982 | Leonard et al. |
| 4,421,333 A | 12/1983 | Van Dyke |
| 4,544,094 A | 10/1985 | Scholey |
| 4,611,847 A | 9/1986 | Sullivan |
| 4,688,824 A | 8/1987 | Herring |
| 4,746,160 A | 5/1988 | Wiesemeyer |
| 4,877,266 A | 10/1989 | Lamparter et al. |
| 4,943,204 A | 7/1990 | Ehrlich |
| 4,989,782 A | 2/1991 | McKie |
| 5,058,945 A | 10/1991 | Elliott, Sr. et al. |
| 5,094,744 A | 3/1992 | Scovell |
| 5,152,228 A | 10/1992 | Donkin |
| 5,280,990 A | 1/1994 | Rinard |
| D354,726 S | 1/1995 | Fitzgerald et al. |
| 5,489,137 A | 2/1996 | Herrmeyer |
| 5,607,200 A | 3/1997 | Smidler |
| 5,673,953 A | 10/1997 | Spease |
| 5,823,531 A | 10/1998 | Huber |
| 5,823,610 A | 10/1998 | Ryan et al. |
| 5,921,617 A | 7/1999 | Loewen et al. |
| 6,079,769 A | 6/2000 | Fannin et al. |
| 6,089,629 A | 7/2000 | Hope et al. |
| 6,092,861 A | 7/2000 | Whelan |
| 6,109,675 A | 8/2000 | Sumrall |
| 6,116,667 A | 9/2000 | Torcomian |
| 6,257,654 B1 | 7/2001 | Boivin et al. |
| 6,286,894 B1 | 9/2001 | Kingham |
| 6,309,010 B1 | 10/2001 | Whitten |
| 6,409,252 B1 | 6/2002 | Andrus |
| 6,443,492 B1 | 9/2002 | Barr et al. |
| 6,467,833 B1 | 10/2002 | Travers |
| 6,485,087 B1 | 11/2002 | Roberge et al. |
| 6,595,578 B1 | 7/2003 | Calsoyds et al. |
| 6,626,475 B2 | 9/2003 | Schroeder |
| 6,641,206 B1 | 11/2003 | Bergstrom et al. |
| 6,644,720 B2 | 11/2003 | Long et al. |
| 6,666,498 B1 | 12/2003 | Whitten |
| 6,742,835 B1 | 6/2004 | Floarea |
| 6,799,791 B2 | 10/2004 | Reiman et al. |
| 6,837,536 B1 | 1/2005 | Schwartz |
| 6,893,079 B1 | 5/2005 | Johnson et al. |
| 6,915,611 B2 | 7/2005 | Reiman et al. |
| 6,959,958 B2 | 11/2005 | Basford |
| 6,974,166 B2 | 12/2005 | Ledford et al. |
| 6,974,178 B2 | 12/2005 | Ortega et al. |
| 7,059,819 B2 | 6/2006 | Brackmann et al. |
| 7,086,674 B2 | 8/2006 | Goertz |
| 7,093,889 B2 | 8/2006 | Graham |
| 7,134,820 B2 | 11/2006 | Ehrlich |
| 7,147,270 B1 | 12/2006 | Andrus et al. |
| 7,163,258 B2 | 1/2007 | Dyer, II et al. |
| 7,188,875 B2 | 3/2007 | Norelius |
| 7,347,154 B2 | 3/2008 | Evans |
| 7,404,592 B2 | 7/2008 | Reiman et al. |
| 7,407,204 B2 | 8/2008 | Eriksson et al. |
| 7,431,381 B2 | 10/2008 | Wood |
| 7,497,502 B2 | 3/2009 | Wood |
| 7,537,270 B2 | 5/2009 | OGrady |
| 7,578,541 B2 | 8/2009 | Layfield et al. |
| 7,604,284 B2 | 10/2009 | Reiman et al. |
| 7,665,716 B2 | 2/2010 | Reast |
| 7,686,385 B2 | 3/2010 | Dolan et al. |
| 7,740,303 B2 | 6/2010 | Wood |
| 7,748,772 B2 | 7/2010 | Boivin et al. |
| 7,780,224 B2 | 8/2010 | Roush |
| 7,837,254 B2 | 11/2010 | Reiman et al. |
| 7,887,120 B2 | 2/2011 | Boivin et al. |
| 7,938,475 B2 | 5/2011 | Boivin et al. |
| 7,942,466 B2 | 5/2011 | Reiman et al. |
| 7,942,467 B2 | 5/2011 | Boivin et al. |
| 7,942,468 B2 | 5/2011 | Boivin et al. |
| 7,942,469 B2 | 5/2011 | Boivin et al. |
| 7,942,470 B2 | 5/2011 | Boivin et al. |
| 7,942,471 B2 | 5/2011 | Boivin et al. |
| 7,950,721 B1 | 5/2011 | Peterson |
| 7,967,349 B2 | 6/2011 | Puppini et al. |
| 8,162,384 B2 | 4/2012 | Giromini et al. |
| 8,177,286 B2 | 5/2012 | Brown et al. |
| 8,186,745 B2 | 5/2012 | Graham et al. |
| 8,191,956 B1 | 6/2012 | Dixon, Jr. et al. |
| 8,210,599 B2 | 7/2012 | Butler |
| 8,292,351 B2 | 10/2012 | Boivin et al. |
| 8,303,025 B2 | 11/2012 | Senatro |
| 8,376,450 B1 | 2/2013 | Long et al. |
| 8,382,194 B2 | 2/2013 | Wood |
| 8,398,150 B2 | 3/2013 | Brown et al. |
| 8,408,570 B2 | 4/2013 | Heppel et al. |
| 8,496,286 B1 | 7/2013 | Katz et al. |
| 8,540,304 B2 | 9/2013 | Kint |
| 8,579,359 B2 | 11/2013 | Brown et al. |
| 8,608,122 B2 | 12/2013 | Mancina et al. |
| 8,616,616 B2 | 12/2013 | van Raemdonck |
| 8,783,758 B2 | 7/2014 | Baker |
| 8,801,078 B2 | 8/2014 | Brown et al. |
| 8,857,893 B2 | 10/2014 | Reiman et al. |
| 8,899,660 B1 | 12/2014 | Praskovskaya et al. |
| 8,973,973 B2 | 3/2015 | Kronemeyer |
| 8,979,172 B2 | 3/2015 | Reiman et al. |
| 8,985,677 B2 | 3/2015 | Wiegel |
| 9,004,575 B2 | 4/2015 | Grandominico et al. |
| 9,045,176 B1 | 6/2015 | Henderson, II |
| 9,139,241 B1 | 9/2015 | Smith |
| 9,199,673 B2 | 12/2015 | Baker |
| 9,199,676 B2 | 12/2015 | Brown et al. |
| 9,211,919 B2 | 12/2015 | Senatro |
| 9,296,433 B2 | 3/2016 | Roush |
| 9,308,949 B1 | 4/2016 | Mihelic et al. |
| 9,340,240 B2 | 5/2016 | Clark |
| 9,352,714 B2 | 5/2016 | Batzer et al. |
| 9,463,759 B1 | 10/2016 | Kiefer |
| 9,487,171 B2 | 11/2016 | Rogers et al. |
| 9,487,245 B2 | 11/2016 | Sjoberg et al. |
| 9,506,488 B2 | 11/2016 | Mancina et al. |
| 9,573,636 B2 | 2/2017 | Grandominico et al. |
| 9,669,883 B2 | 6/2017 | Bassily et al. |
| 9,908,493 B1 | 3/2018 | Kiefer |
| 9,957,991 B2 | 5/2018 | Mancina et al. |
| 2003/0178611 A1 | 9/2003 | Anderson |
| 2005/0040637 A1 | 2/2005 | Wood |
| 2005/0067204 A1 | 3/2005 | Rijsbergen et al. |
| 2005/0115776 A1 | 6/2005 | Doerflinger et al. |
| 2005/0161976 A1 | 7/2005 | Ortega et al. |
| 2006/0152038 A1 | 7/2006 | Graham |
| 2006/0182580 A1 | 8/2006 | Petersen |
| 2006/0254182 A1 | 11/2006 | Cerasi et al. |
| 2007/0024086 A1 | 2/2007 | Shishikura |
| 2007/0037479 A1 | 2/2007 | Margay |
| 2007/0114757 A1 | 5/2007 | Vickroy |
| 2007/0120397 A1 | 5/2007 | Layfield et al. |
| 2007/0176466 A1 | 8/2007 | Dolan et al. |
| 2008/0061597 A1 | 3/2008 | Reiman et al. |
| 2008/0061598 A1 | 3/2008 | Reiman et al. |
| 2008/0093887 A1 | 4/2008 | Wood |
| 2008/0116702 A1 | 5/2008 | Enz et al. |
| 2008/0265049 A1 | 10/2008 | Stadlbauer |
| 2009/0189414 A1 | 7/2009 | Boivin et al. |
| 2009/0212595 A1 | 8/2009 | Heppel et al. |

(56) References Cited

U.S. PATENT DOCUMENTS

| | | |
|---|---|---|
| 2009/0212596 A1 | 8/2009 | Reiman et al. |
| 2009/0218848 A1 | 9/2009 | Boivin et al. |
| 2010/0096880 A1 | 4/2010 | Boivin et al. |
| 2010/0096881 A1 | 4/2010 | Boivin et al. |
| 2010/0096882 A1 | 4/2010 | Boivin et al. |
| 2010/0096883 A1 | 4/2010 | Boivin et al. |
| 2010/0098481 A1 | 4/2010 | Boivin et al. |
| 2010/0231000 A1 | 9/2010 | Andrus et al. |
| 2010/0264690 A1 | 10/2010 | Brown et al. |
| 2010/0264691 A1 | 10/2010 | Giromini et al. |
| 2011/0025092 A1 | 2/2011 | Reiman et al. |
| 2011/0062749 A1 | 3/2011 | Graham et al. |
| 2011/0148142 A1 | 6/2011 | Kint |
| 2011/0175396 A1 | 7/2011 | Boivin et al. |
| 2011/0204677 A1 | 8/2011 | Wood et al. |
| 2011/0285167 A1 | 11/2011 | Butler |
| 2012/0074728 A1 | 3/2012 | Senatro |
| 2012/0091754 A1 | 4/2012 | Lee et al. |
| 2012/0169086 A1 | 7/2012 | Giromini et al. |
| 2012/0200113 A1 | 8/2012 | Brown et al. |
| 2012/0235441 A1 | 9/2012 | Dayton |
| 2012/0319428 A1 | 12/2012 | Wood |
| 2013/0119701 A1 | 5/2013 | Dayton |
| 2013/0181477 A1 | 7/2013 | Reiman et al. |
| 2013/0270857 A1 | 10/2013 | Brown et al. |
| 2013/0285411 A1 | 10/2013 | Layfield et al. |
| 2014/0035318 A1 | 2/2014 | Brown et al. |
| 2014/0110968 A1 | 4/2014 | Henderson |
| 2014/0159419 A1 | 6/2014 | Baker et al. |
| 2014/0252799 A1 | 9/2014 | Smith |
| 2014/0333089 A1 | 11/2014 | Brown et al. |
| 2015/0175221 A1 | 6/2015 | Popa |
| 2015/0259014 A1 | 9/2015 | Baker et al. |
| 2016/0068202 A1 | 3/2016 | Senatro |
| 2016/0096558 A1 | 4/2016 | Bassily et al. |
| 2016/0121940 A1 | 5/2016 | Courtney et al. |
| 2016/0152285 A1 | 6/2016 | Wiegel |
| 2016/0244108 A1 | 8/2016 | Tsuruta et al. |
| 2016/0368443 A1 | 12/2016 | Theethira Kushalappa et al. |
| 2017/0015369 A1 | 1/2017 | Senatro |
| 2018/0118143 A1 | 5/2018 | Ponder |
| 2018/0187708 A1 | 7/2018 | Mancina et al. |

FOREIGN PATENT DOCUMENTS

| | | |
|---|---|---|
| CA | 2795076 A1 | 5/2013 |
| CA | 2810007 A1 | 9/2013 |
| CA | 2812316 A1 | 10/2013 |
| CA | 2860351 A1 | 2/2015 |
| CA | 2905596 A1 | 4/2016 |
| DE | 334664 C | 9/1921 |
| DE | 454156 C | 1/1928 |
| DE | 1291221 B | 3/1969 |
| DE | 1603529 A1 | 7/1971 |
| DE | 2064239 A1 | 7/1972 |
| DE | 2135202 A1 | 2/1973 |
| DE | 3121565 A1 | 12/1982 |
| DE | 3402586 A1 | 8/1985 |
| DE | 19606921 A1 | 8/1997 |
| DE | 10157838 A1 | 10/2002 |
| DE | 102012018487 A1 | 3/2014 |
| EP | 0738621 A1 | 10/1996 |
| EP | 0780268 A1 | 6/1997 |
| EP | 0857620 A1 | 8/1998 |
| EP | 2581509 A2 | 4/2013 |
| FR | 2482548 A1 | 11/1981 |
| GB | 912610 A | 12/1962 |
| JP | 2007223359 A | 9/2007 |
| KR | 20110059021 A | 6/2011 |
| NL | 1034363 C2 | 2/2009 |
| WO | 9748590 A1 | 12/1997 |
| WO | 03093066 A1 | 11/2003 |
| WO | 2004020268 A1 | 3/2004 |
| WO | 2005085009 A1 | 9/2005 |
| WO | 2008147218 A2 | 12/2008 |
| WO | 2009051551 A1 | 4/2009 |
| WO | 2013091232 A1 | 6/2013 |
| WO | 2014083376 A1 | 6/2014 |

OTHER PUBLICATIONS

Final Office Action issued in corresponding U.S. Appl. No. 13/413,998, dated Nov. 2, 2012, 7 pages.
Non-Final Office Action issued in corresponding U.S. Appl. No. 13/413,998, dated Jul. 10, 2012, 6 pages.
Non-Final Office Action issued in corresponding U.S. Appl. No. 13/448,931, dated Jun. 29, 2012, 12 pages.
Non-Final Office Action issued in corresponding U.S. Appl. No. 13/741,639, dated Apr. 5, 2013, 10 pages.
Non-Final Office Action issued in corresponding U.S. Appl. No. 13/847,111, dated Nov. 5, 2013, 5 pages.
Non-Final Office Action issued in corresponding U.S. Appl. No. 14/049,851, dated Dec. 31, 2013, 11 pages.
Non-Final Office Action issued in corresponding U.S. Appl. No. 14/100,071, dated Mar. 26, 2015, 21 pages.
Non-Final Office Action issued in corresponding U.S. Appl. No. 14/321,977, dated Apr. 3, 2015, 12 pages.
Non-Final Office Action issued in corresponding U.S. Appl. No. 14/457,222, dated Jun. 26, 2017, 10 pages.
Non-Final Office Action issued in corresponding U.S. Appl. No. 14/644,508, dated Nov. 10, 2015, 16 pages.
Final Office Action issued in corresponding U.S. Appl. No. 14/923,610, dated Dec. 13, 2016, 7 pages.
Non-Final Office Action issued in corresponding U.S. Appl. No. 14/923,610, dated Aug. 31, 2016, 7 pages.
Non-Final Office Action issued in corresponding U.S. Appl. No. 15/200,628, dated Jun. 30, 2017, 8 pages.
Non-Final Office Action issued in corresponding U.S. Appl. No. 15/252,377, dated Nov. 2, 2017, 12 pages.
International Search Report and Written Opinion issued in corresponding International Application No. PCT/US2010/031173, dated Jun. 14, 2010, 13 pages.
"AeroFlex Fairing™ product info page" Freight Wing Incorporated, 1 page. Retrieved from Internet on Jul. 7, 2010. http://www.freightwing.com/aeroflex96.htm.
"Belly Fairing™ product info page" Freight Wing Incorporated, 2 pages. Retrieved from Internet on Jul. 7, 2010. http://www.freightwing.com/belly%20fairing.html.
"Freight Wing Chassis Belly Fairing product info page" Freight Wing Incorporated, 1 page. Retrieved from Internet on Jul. 7, 2010. http://www.freightwing.com/chassis.htm.
"Innovative Side Skirt Designs From Utility—A New Patent Pending Solution" 2010 Utility Trailer Manufacturing, Utility Brochure, www.utilitytrailer.com, 2 pages.
"LCL—Laydon Composites, Ltd.—Tractor Aerodynamics—Trailer Fairings" Feb. 7, 2009, 3 pages. Retrieved on Feb. 5, 2019. http://web.archive.org/web/20090207195226/http://www.laydoncomp.com/trailer-skirts.php.
"Low Rider Belly Fairing product info page" Freight Wing Incorporated, 1 page. Retrieved from Internet on Jul. 7, 2010. http://www.freihtwing.com/lowrider.htm.
"MFS Skirt, Maximum Flex Skirt" Transtex Composite, 2 pages (undated material).
"Nu-Line® Introducing Nu-Line Aerodynamic Trailer Skirts" 2014 Nu-Line Products Inc., Brochure NLTS-0314, 2 pages.
"Side Skirt Fairing: Options | Aeroefficient—Aerodynamic Solution for the Trucking Industry", 2010 Aeroefficient, 12 pages. Retrieved from Internet on Jul. 7, 2010. http://www.aerofficient.com/side-options.html.
"Strehl—Trailer Blade Documents" Model 715 Advance Aerodynamic Trailer Skirt, 2009-2010 Strehl LLC., 5 pages. Retrieved from Internet on Jul. 7, 2010. http://strehlusa.com/products/trailerbladedocuments.html.
"Takler" 2009 Product catalog for Takler Srl, 31 pages.
"Trailer Fairings" Laydon Composites Ltd., 3 pages. Retrieved from Internet on Jul. 7, 2010. http://www.laydoncomp.cm/trailer-skirts.php.

(56) References Cited

OTHER PUBLICATIONS

"Trailerskirt™ Assembly Instructions" Jun. 12, 2009 Rev. 8.0 supersedes all other version, Property of LCL, LCL-ENG-045, 7 pages.
"Windyne—Truck Fuel Savings, Aerodynamic Failing, Aerodynamic Parts, Truck Industry" 2008 Windyne Corp, 2 pages. Retrieved from Internet on Jul. 7, 2010. http://www.windyne.com/features-functions.htm.

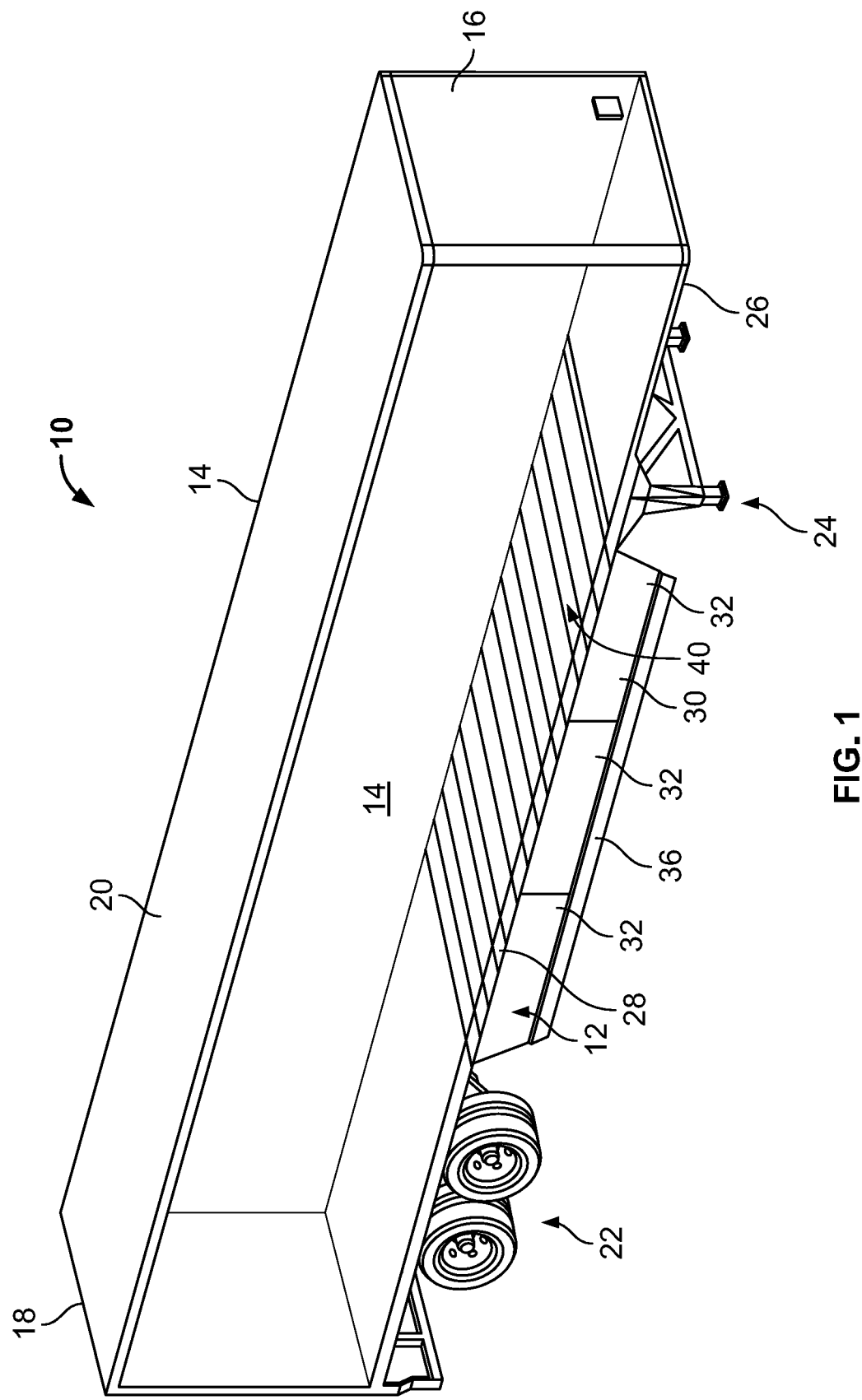

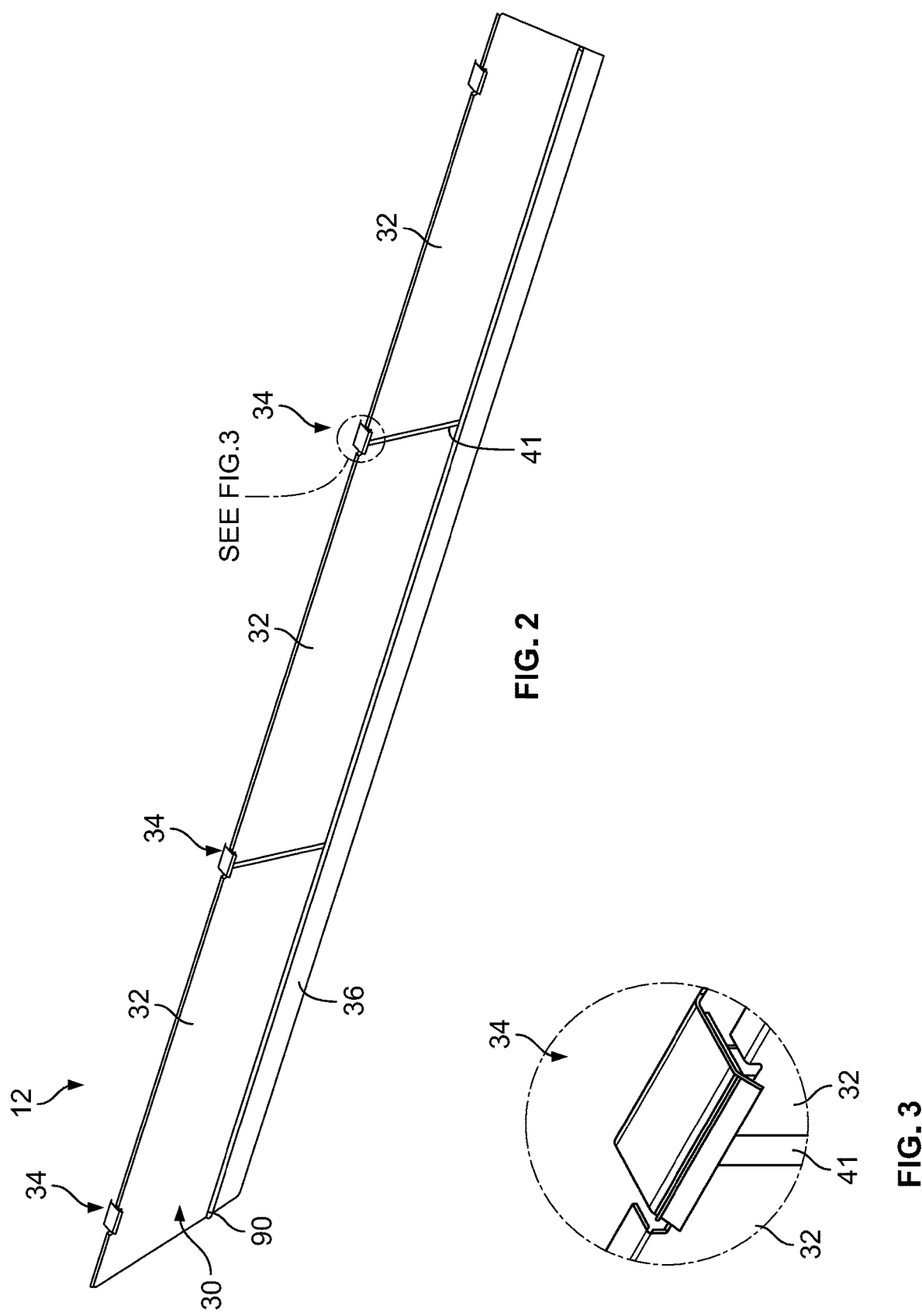

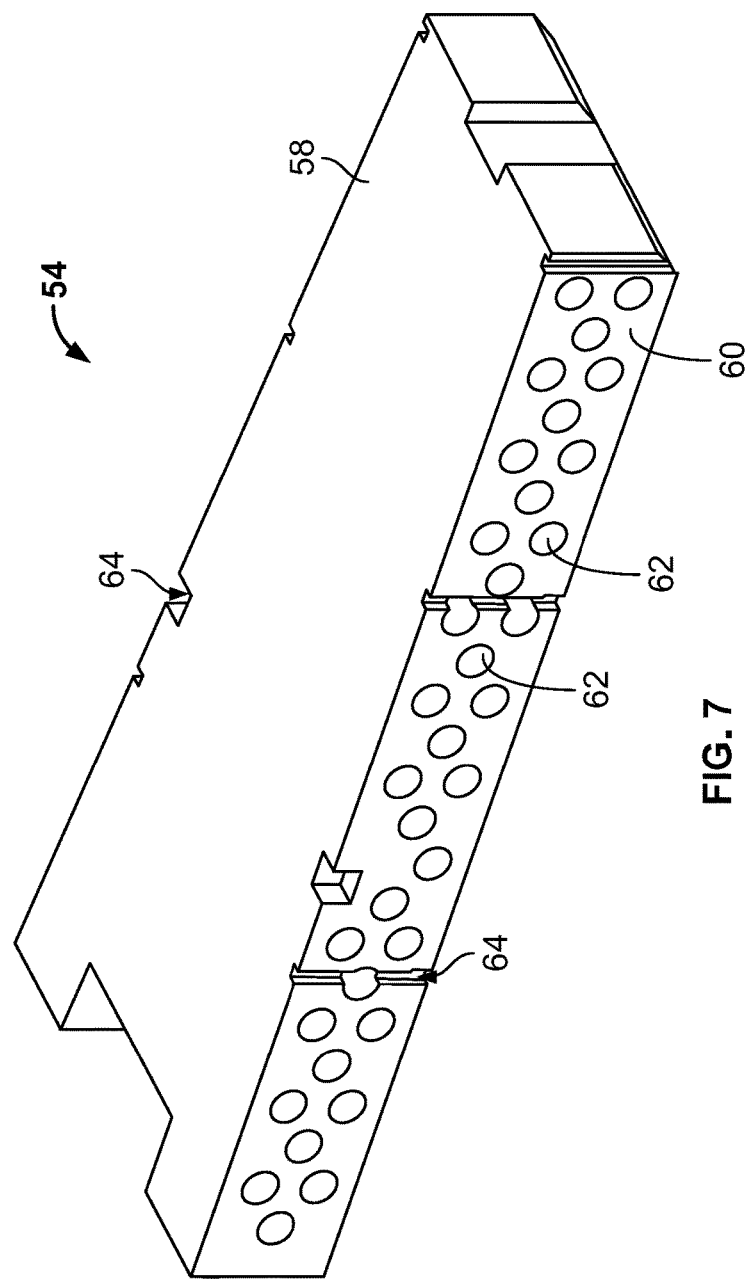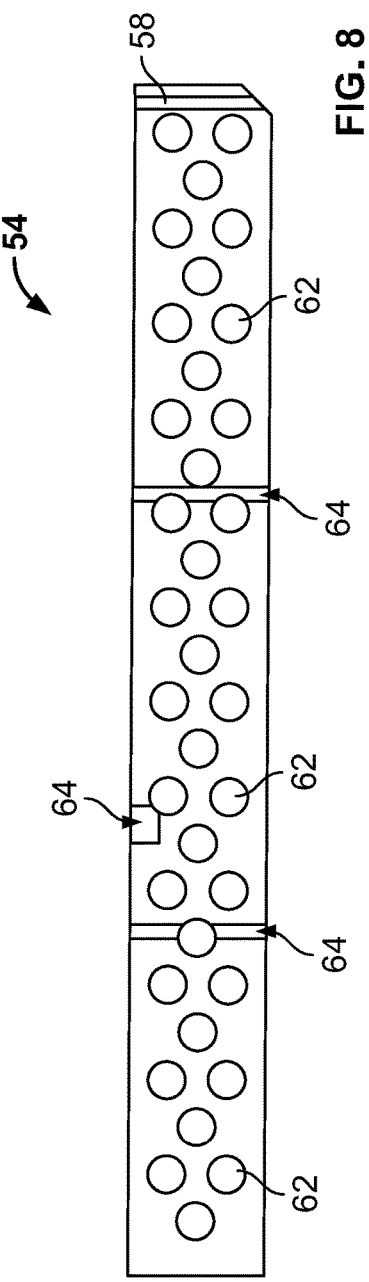

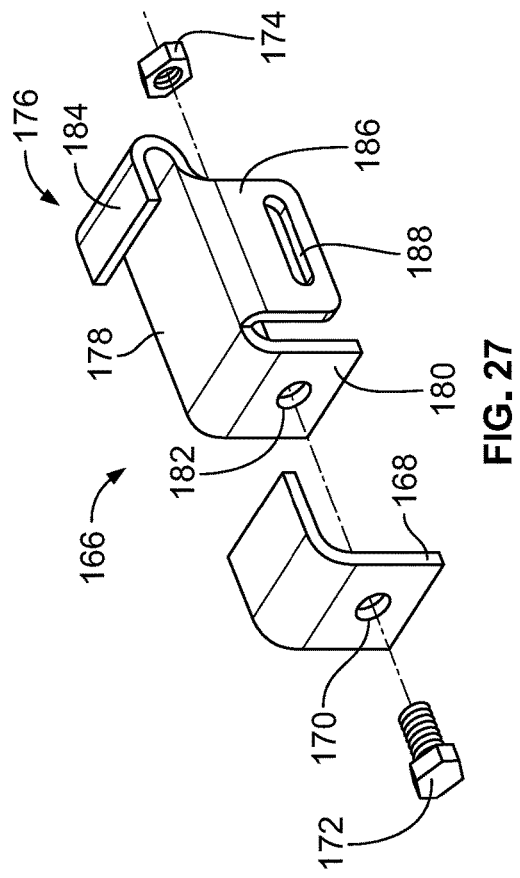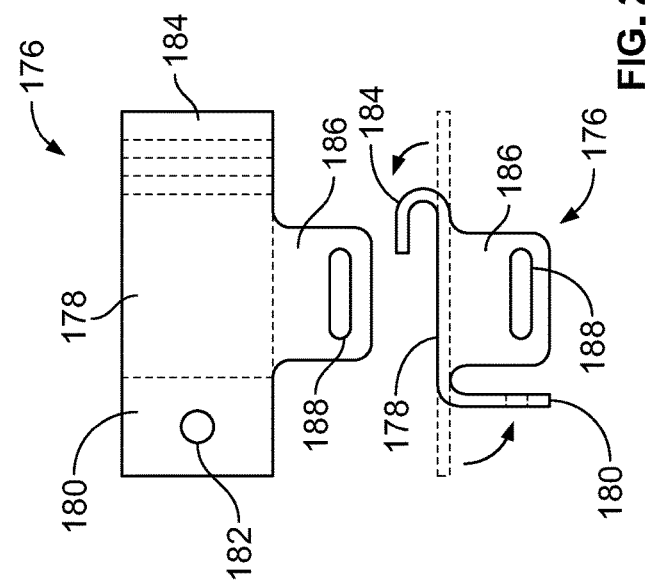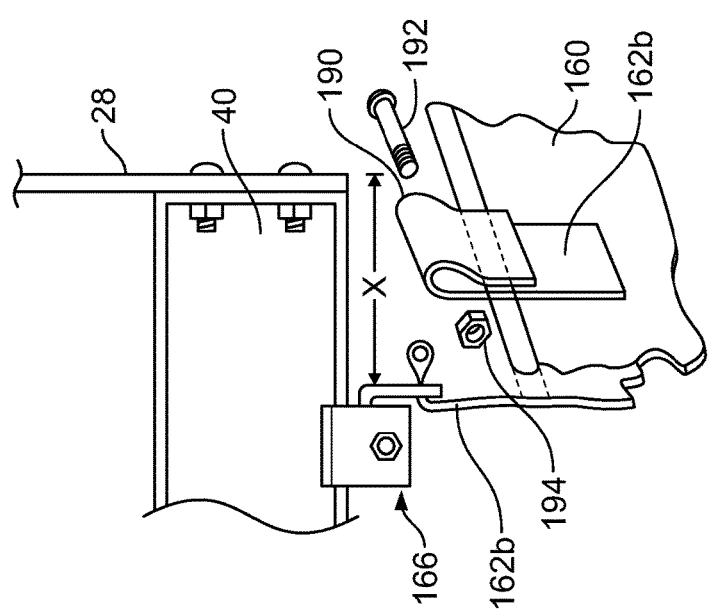

SIDE UNDERRIDE GUARD

CROSS REFERENCE TO RELATED APPLICATIONS

This application claims the benefit of U.S. Provisional Application Ser. No. 62/487,743, filed Apr. 20, 2017, and entitled "Side Underride Guard," and U.S. Provisional Application Ser. No. 62/487,775, filed Apr. 20, 2017, and entitled "Side Underride Guard," the disclosures of which are hereby incorporated by reference in their entireties.

FIELD OF THE INVENTION

The present invention relates generally to semi-trailers, such as van-type trailers, for example. In particular, the present invention relates to both an aerodynamic side skirt system for reducing drag on such a trailer as well as a side underride system for preventing or reducing the extent to which an automobile may ride under the trailer in the event of a side impact collision, for example.

BACKGROUND

To reduce wind flow resistance and drag on a trailer, truck, semi-trailer, or other vehicle, side skirts that extend downwardly from a bottom of the trailer and/or chassis toward the roadway to partially enclose the floor assembly and undercarriage have been utilized.

Air flow passing under a ground vehicle imparts a drag force to the vehicle when it impinges on and flows around the vehicle undercarriage components attached to or a part of the underside of a vehicle. Side skirt systems are designed to prevent or control the flow of air from entering the undercarriage region from a side of the ground vehicle, such as a trailer of a tractor-trailer truck system, for example. Such reduction on the drag of the ground vehicle may operate to conserve fossil fuels as well as other sources of vehicle drive power for hybrid vehicles, battery-operated vehicles, and/or alternative fuel-based vehicles, for example.

Truck trailers typically have a higher elevation than passenger vehicles. This presents a risk that a passenger vehicle may underride the trailer in an accident, potentially resulting in damage to the underriding vehicle and injury to occupants therein. Accordingly, a side protection device, or underride guard, may be provided for use with a trailer in order to reduce the risk of such passenger vehicles underriding the trailer. Side protection devices are intended to reduce the extent to which a "passenger vehicle" (as defined in 49 C.F.R. Part 571 §) can intrude under the side of a trailer, diminishing passenger compartment intrusion.

SUMMARY

The present disclosure may comprise one or more of the following features and combinations thereof.

According to one embodiment of the present disclosure, a side underride system configured to be coupled to a trailer is disclosed, the side underride system comprising a first skirt wall coupled to the trailer, positioned below a first side wall of the trailer, and extending along a first length of the trailer between a skirt wall front end and a skirt wall rear end and a cable system including a first cable coupled to the trailer, positioned below the first side wall, and extending along a second length of the trailer between a cable system front end and a cable system rear end, the skirt wall rear end being positioned forward of the cable system rear end.

According to another embodiment, a side underride system configured to be coupled to a trailer comprises a skirt assembly including (i) a first skirt wall coupled to the trailer, positioned below a first side wall of the trailer, and extending between a front of the trailer and a location forward of a rear wheel assembly of the trailer, and (ii) a first cable coupled to the first skirt wall and a cable system including a second cable coupled to the trailer, positioned below the first side wall, and extending from a second location forward of the rear wheel assembly of the trailer to a location rearward of the rear assembly.

According to another embodiment, a side underride system configured to be coupled to a trailer comprises a cable system including (i) a first cable having a first terminal end configured to be coupled to a first side of the trailer forward of a rear wheel assembly of the trailer and a second terminal end configured to be coupled to the trailer rearward of the rear wheel assembly of the trailer and (ii) a second cable having a first terminal end configured to be coupled to a second side of the trailer forward of the rear wheel assembly of the trailer and a second terminal end configured to be coupled to the trailer rearward of the rear wheel assembly of the trailer, the first and second cables extending past the rear wheel assembly inhibiting movement of objects into an area around the rear wheel assembly without material coupled to portions of the first and second cables adjacent the rear wheel assembly.

These and other features of the present disclosure will become more apparent from the following description of the illustrative embodiments.

BRIEF DESCRIPTION OF THE DRAWINGS

FIG. 1 is a perspective view of a trailer and an aerodynamic side skirt system coupled to the trailer between rear wheels and a landing gear, or front support, of the trailer.

FIG. 2 is a perspective view of the aerodynamic side skirt system of FIG. 1.

FIG. 3 is an enlarged, perspective view of a portion of the side skirt system of FIG. 2 showing a mounting bracket assembly of the side skirt system.

FIG. 7 is a perspective view of the side underride system of FIG. 4.

FIG. 8 is a side view of the side underride system of FIG. 4.

FIG. 26 is a partial rear and perspective view of the side underride system of FIG. 24 coupled to a floor assembly of the trailer with a clip assembly.

FIG. 27 is a perspective, exploded view of the clip assembly of FIG. 26.

FIG. 28 is a front view of the clip assembly of FIG. 26 in blank and formed constructions.

DETAILED DESCRIPTION

Figure 4:
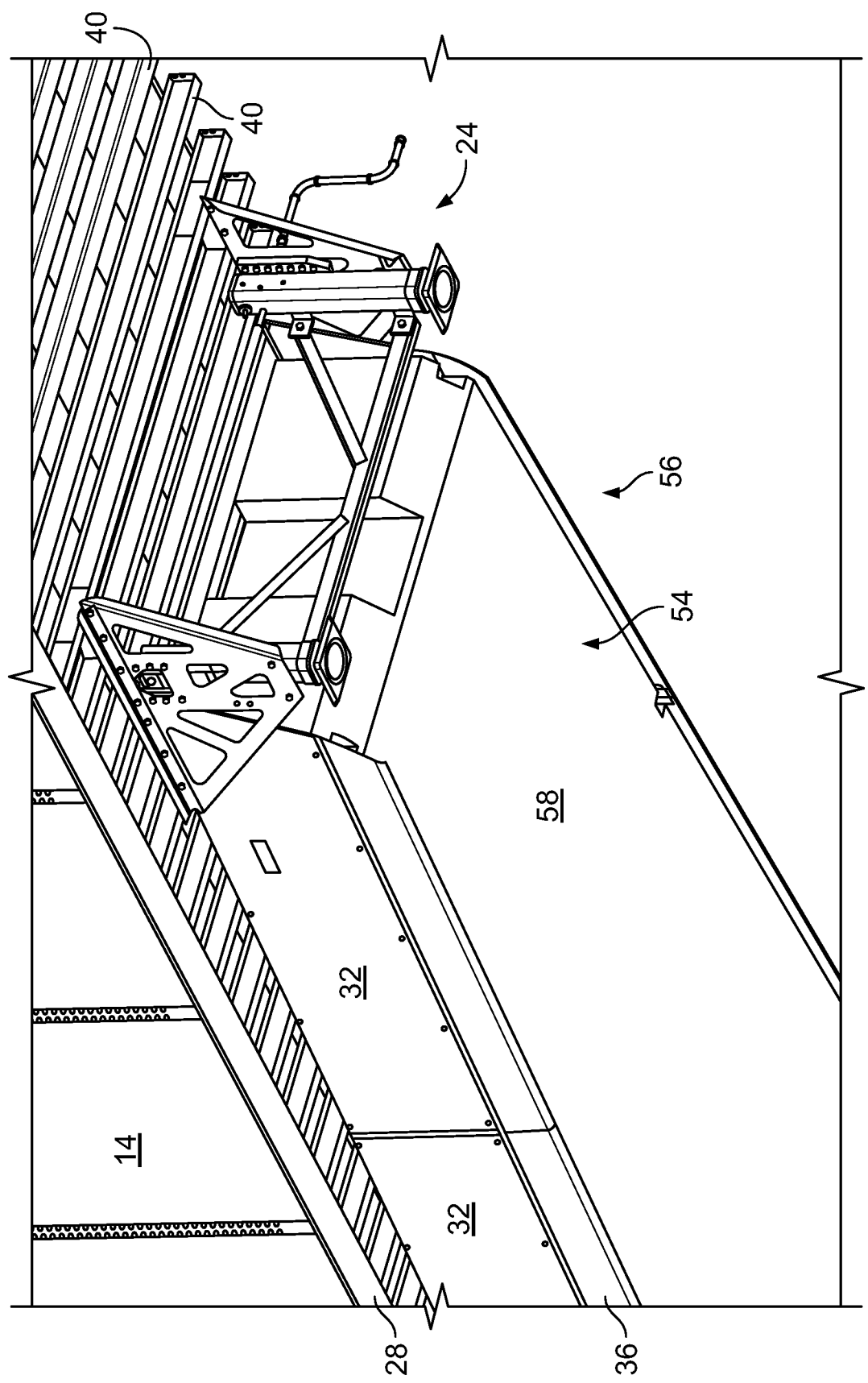
FIG. 4 is a perspective, underside, forward view of a trailer, an aerodynamic side skirt system coupled to the trailer, and a side underride system coupled beneath the trailer and between portions of the side skirt system.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

For the purposes of promoting an understanding of the principles of the invention, reference will now be made to a number of illustrative embodiments shown in the attached drawings and specific language will be used to describe the same. While the concepts of this disclosure are described in relation to a box-type trailer, it will be understood that they are equally applicable to many types of trailers, semi-trailers, and tanks generally, and more specifically to conventional flat-bed and/or box or van type trailers, and/or pup trailers, as well as straight truck bodies, small personal and/or commercial trailers and the like. Accordingly, those skilled in the art will appreciate that the present invention may be implemented in a number of different applications and embodiments and is not specifically limited in its application to the particular embodiments depicted herein.

Looking first to FIGS. 1-6, in a first illustrative embodiment, a trailer 10 includes an aerodynamic skirt system or assembly 12 coupled to and extending downwardly from each side wall 14 of the trailer 10. Illustratively, the skirt system 12 operates to improve the aerodynamic efficiency of the trailer 10 by reducing drag and wind flow under the trailer 10. In particular, the skirt system 12 operates to reduce airflow under the trailer 10 while the trailer 10 is traveling down a road. This reduction of airflow under the trailer 10 may increase the fuel efficiency, or the efficiency of any other such source of vehicle drive power, of the tractor/trailer combination. Illustratively, the skirt system 12, as well as other skirt systems described herein, extends below a side wall 14 of the trailer 10 at least partially along a length of the trailer. In particular, in some embodiments, the skirt system 12 extends generally between a landing gear 24 and a rear wheel assembly 22 of the trailer 10. However, the skirt systems described herein may be modified to extend along a greater or a lesser length of the trailer 10 than what is illustratively shown in the figures. In other words, the skirt systems disclosed herein may be modified to extend along the entire, or substantially the entire, length of the trailer 10 or may be modified to extend along only a small portion of the length of the trailer 10. Further, any of the skirt systems disclosed herein may be for structural and/or aerodynamic purposes.

As shown in FIG. 1, the trailer 10 includes side walls 14, a front end wall 16, a rear end wall 18, and a roof 20 defining an inside storage portion (not shown) able to store various articles or good therein. The trailer 10 further includes the rear wheel assembly 22 and the front support or landing gear 24 each coupled to a bottom wall or floor assembly 26 of the trailer 10. Illustratively, the floor assembly 26 of the trailer 10 includes various laterally-extending cross members 40 and right and left base rails 28 coupled to the cross members 40 and extending along a length of the trailer 10. The front end of the trailer 10 is configured to be coupled to a tractor (not shown) for towing the trailer 10 thereon, thus providing a tractor-trailer assembly. As shown in FIG. 1, the skirt system 12 is coupled to the floor assembly 26 of the trailer 10 to extend downwardly from the base rail 28 of the trailer 10. Illustratively, the side skirt system 12 is positioned between the rear wheel assembly 22 and the front support 24 in order to prevent air from flowing laterally under the floor assembly 26 of the trailer 10 as the trailer 10 is towed by a tractor. It should be understood that while the aerodynamic side skirt system 12 is shown for use with a trailer 10, the side skirt system 12 may be coupled to any vehicle to reduce the drag thereon. Still further, while the embodiments disclosed herein are shown as being utilized with trailers, any of the embodiments disclosed herein may be coupled to any vehicle.

Illustratively, the trailer 10 includes two aerodynamic skirt systems 12. In particular, one system 12 is coupled to one side of the floor assembly 26 of the trailer 10 to extend downwardly from the floor assembly 26 generally parallel to the corresponding side wall 14 of the trailer 10 while the other system 12 is coupled to the other side of the floor assembly 26 to extend downwardly from the floor assembly 26 generally parallel to the corresponding side wall 14 of the trailer 10. For purposes of the description herein, however, only one skirt system 12 will be described herein. However, it should be understood that the two skirt systems 12 of the trailer 10 are identical in configuration and function. Also, while the skirt systems 12 are shown as being parallel to the corresponding side walls 14, the skirt systems 12 may be angled inwardly at forward (toward the tractor) ends thereof.

As shown in FIGS. 1 and 2, each skirt system 12 includes a side skirt wall 30 having three wall panels 32 coupled to each other by an H-member 41, shown in FIGS. 2 and 3. Illustratively, the H-member 41 is generally H-shaped when viewed in cross-section to define two channels such that adjacent wall panels 32 are each received within one of the channels of the H-member 41. The wall panels 32 are further secured to each other and to the trailer 10 by a mounting bracket assembly 34. For example, the mounting bracket assembly 34 may be similar in structure and function to that described in U.S. Pat. No. 8,162,384, the entire content of which is incorporated herein by reference.

Illustratively, a first mounting bracket assembly 34 is positioned between and coupled to the middle and rear-most wall panels 32 while a second mounting bracket assembly 34 is positioned between and coupled to the middle and front-most wall panels 32. A third mounting bracket assembly 34 is coupled to the rear-most wall panel 32 while a fourth mounting bracket assembly 34 is coupled to the front-most wall panel 32. Illustratively, while the skirt system 12 includes four mounting bracket assemblies 34 and three wall panels 32, it is within the scope of this disclosure to provide a skirt system 12 having any number of mounting bracket assemblies 34 and any number of wall panels 32. Further, it is within the scope of this disclosure for the skirt system 12 to include a single, unitary wall panel 32.

Generally, the mounting bracket assemblies 34 are configured to couple the wall portions 32 of the skirt system 12 to the floor assembly 26 of the trailer 10. Furthermore, the mounting bracket assemblies 34 may allow the skirt system 12 to tilt laterally both inwardly and outwardly relative to the floor assembly 26 of the trailer 10. The ability of the skirt wall 30 to tilt bi-laterally relative to the cross member 40 (i.e., to tilt both inwardly and outwardly relative to the cross member 40) may allow the skirt wall 30 to potentially avoid damage when the trailer 10 traverses into or over a fixed, immovable obstacle, for example, and thus runs laterally into the obstacle, for example. It should also be understood, however, that the skirt system 12 be sufficiently rigidly mounted to the floor assembly 26 such that the skirt system 12 is generally prevented from tilting under normal wind and road air forces.

Illustratively, each wall panel 32 is made of a composite material. For example, the composite material may include a plastic core and metal outer skins coupled to the plastic core. Such a composite material provides a rigid, but lightweight and durable material. Illustratively, for example, each wall panel 32 may be made of a DURAPLATE® composite panel provided by Wabash National Corporation of Lafayette, Ind. DURAPLATE® composite panels are constructed of a high-density polyethylene plastic core bonded between two high-strength steel skins. It should be understood that other suitable composite materials may alternatively or additionally be used. For example, the wall panels 32 may be made of a sandwich composite including a honeycomb core and metal or plastic outer sheets, or the wall panels 32 may be made of a fiber-reinforced plastic composite. Further, the wall panels 32 may be of any number of suitable, non-composite materials such as metals, metal alloys, and/or plastics, for example.

As shown in FIG. 2, the skirt system 12 further includes a flexible flap 36 coupled to the bottom edge of the wall panels 32. Illustratively, the flexible flap 36 is made of plastic or rubber. However, other suitable materials may be used. As is discussed in greater detail below, the flexible flap 36 further operates to resist airflow and may prevent damage to the skirt wall 30 from forces applied vertically such as in situations where the trailer 10 may traverse over a curb or railroad track where the road surface is not flat. In such instances, for example, the flap 36 is configured to bend, or flex to prevent damage to the skirt wall 30.

As shown in FIG. 2, the skirt system 12 includes a single, unitary flap 36 coupled to the three wall panels 32. However, it is within the scope of this disclosure to include any number of flexible flaps 36. Further illustratively, the wall panels 32 make up approximately 70% of the total height of the skirt wall 30 while the flap 36 makes up approximately the lower 30% of the total height of the skirt wall 30. Of course, it is within this disclosure to include wall panels and/or flaps having other suitable heights.

In some embodiments, the above skirt system 12 may be structurally reinforced to provide additional side protection that may reduce the risk of an automobile underriding the trailer 10. For example, the skirt system 12 may be combined with a rigid and/or compressible support system 54 positioned underneath the trailer 10 and between the side skirt walls 30. As shown in FIGS. 4-8, a compressible support system is provided under the floor assembly of the trailer to form a side underride system 56. This combination skirt system 12 and support system 54 can thus provide dual functions of potentially improving aerodynamic efficiency and providing side underride protection.

The support system 54 may be retrofit into existing skirt systems 12 or installed with new skirt systems 12 or additional aerodynamic systems other than what is herein described. Alternatively, the support system 54 alone (that is, without a skirt system) may form the side underride system 56. In other words, the support system 54 may be an OEM side underride system design (that is, not for use as a retrofit with an existing skirt system) or, alternatively, may be used as a retrofit with existing skirt systems. For example, the support system 54 alone may potentially improve aerodynamic efficiency (i.e., by reducing air flow under the trailer 10) and may provide side underride protection. In particular, side underride systems may be contemplated within the scope of this disclosure to include side skirts or any other structures of any configuration and shape to provide a first outer surface positioned below the trailer 10 near the first side wall 14 and a second outer surface positioned below the trailer 10 near the second side wall 14 to reduce airflow under the trailer, where the surfaces permit any of the structures described herein to be positioned therebetween to potentially provide side underride protection.

Generally, the support system 54 of FIGS. 4-8 may include a compressible structure 58. The compressible structure may be configured to compress into itself in response to lateral forces, such as when the side skirt walls 30 push laterally inwardly during a side impact collision with a vehicle, for example. The compressible structure 58 may help absorb such forces and may reduce the chances of the vehicle from underriding the trailer 10. Further, the compressible structure 58 may operate to absorb some of the force and energy of any impact thereto to potentially decrease any forces on the passengers within the vehicle during impact.

The compressible structure 58 may be solid, such as a solid foam structure, or holed, such as a holed foam structure, a plastic or metal honeycomb structure, or a truss-like structure. Furthermore, the compressible structure 58 may include a single structure or multiple discrete structures, such as a plurality of gas- or air-filled containers or components. The compressible structure 58 may further include any other type of material or structure capable of compressing. According to one example, as shown in FIGS. 7-8, the compressible structure 58 may be a foam structure with one or more through holes 62. Alternatively, the foam structure may include one or more blind holes. The support system 54 may be substantially resilient and also, in some embodiments, may include an additional material (not shown) wrapped around or surrounding the compressible structure 58. The additional material may protect the compressible structure 58 from the elements (e.g., the additional material may be water resistant and/or substantially resistant to degradation from the elements) and, in some embodiments, may enhance the aerodynamic efficiency of the system 54.

Figure 5:
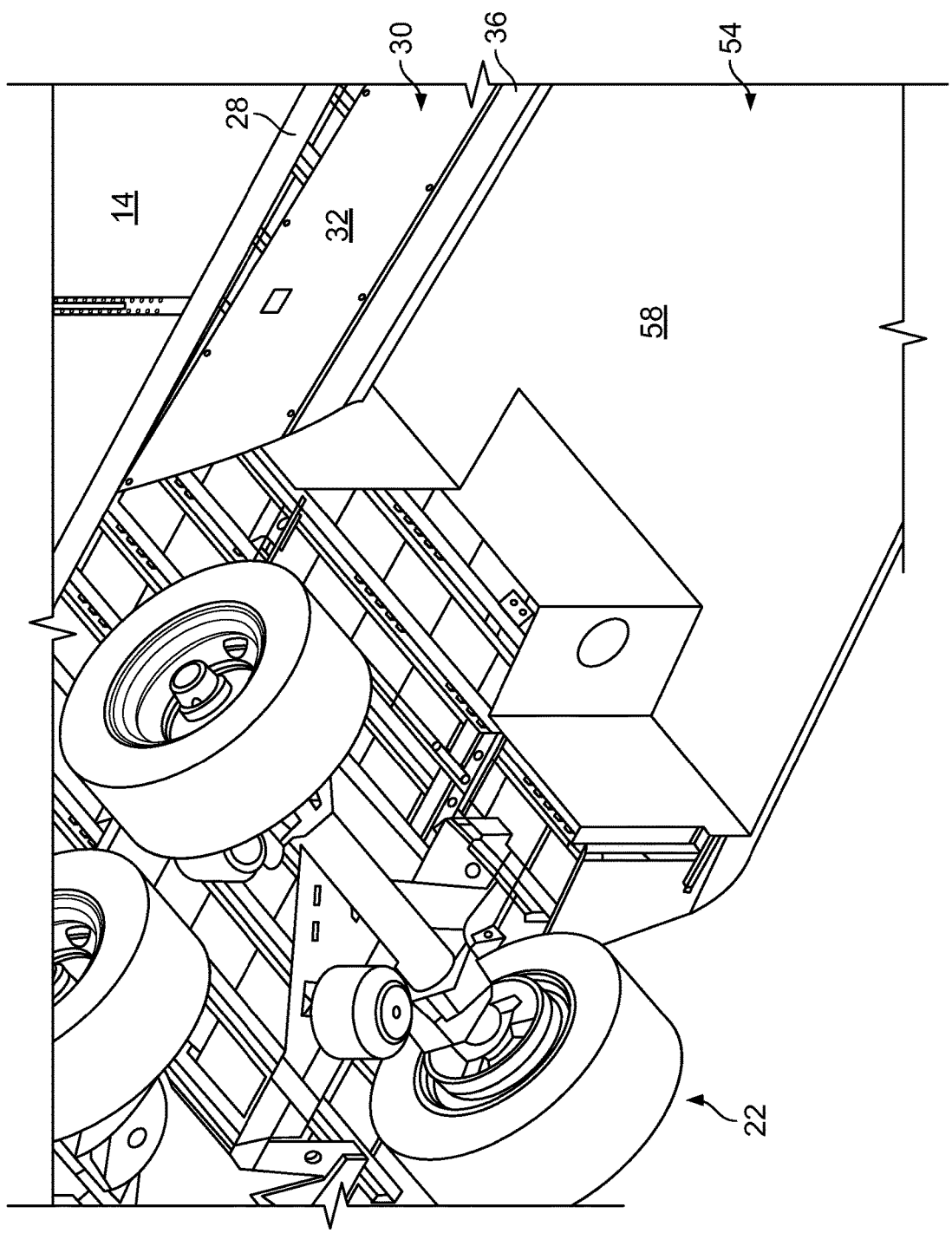
FIG. 5 is a perspective, underside, rear view of the trailer, the aerodynamic side skirt system, and the side underride system of FIG. 4.
Figure 6:
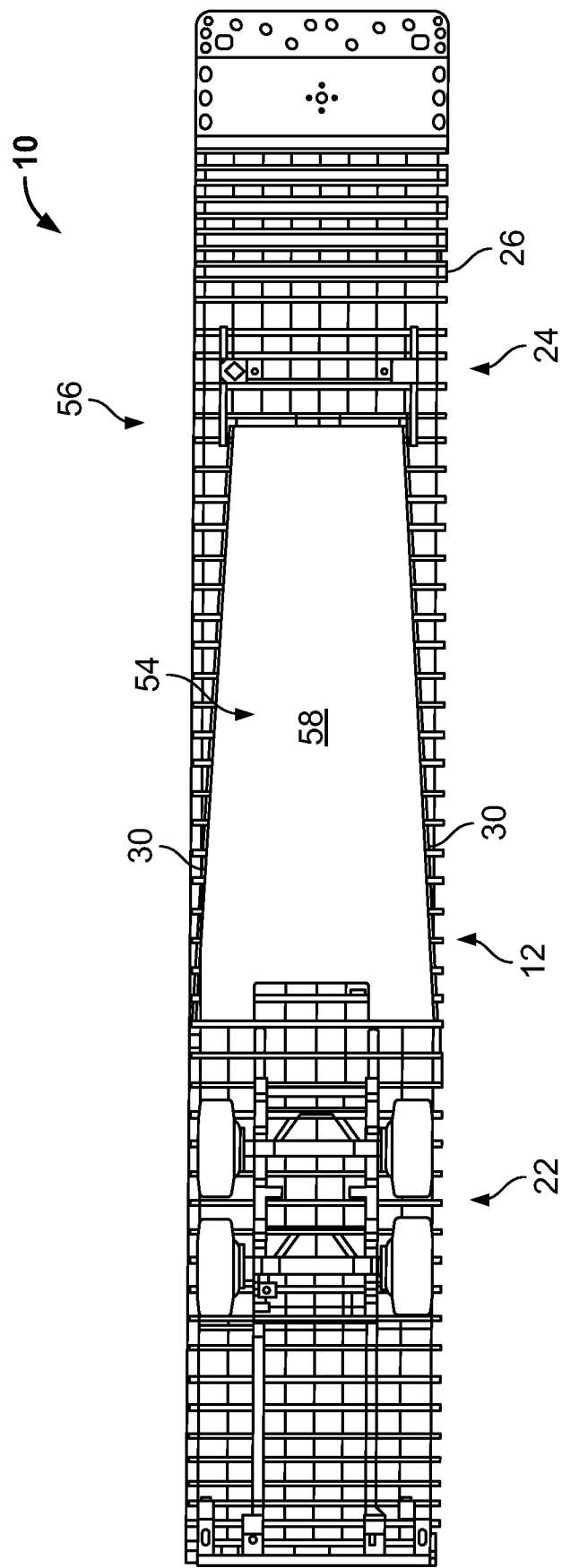
FIG. 6 is an underside view of the trailer, the aerodynamic side skirt system, and the side underride system of FIG. 4.

As described above, the compressible structure 58 may span a width of the trailer 10, filling a space defined between the side skirt walls 30, as shown in FIGS. 4-6. Illustratively, the compressible structure may also follow angled or curved profiles of the side skirt walls 30, as shown in FIGS. 6 and 7. Alternatively, the compressible structure 58 may be substantially rectangular in shape with end walls 60 perpendicular to the side walls 14 of the trailer 10. The compressible structure 58 may also include one or more cutouts 64 on the end walls 60 to accommodate mounting bracket assemblies 34 of the skirt system 12 and/or other components of the trailer 10 or the skirt system 12, as shown in FIGS. 5, 7, and 8. Further, while the compressible structure 58 is shown with a skirt system 12, it is within the scope of this disclosure to provide such compressible support structures on a trailer without the use a skirt structure as well.

Illustratively, the compressible structure 58 may span a length of the trailer 10 substantially equal to or less than the length of the side skirt walls 30. For example, the compressible structure 58 may span substantially the entire length of the side skirt walls 30 (e.g., from the landing gear 24, as shown in FIG. 4, to the rear wheel assembly 22, as shown in FIG. 5), a portion of the length of the side skirt walls 30, or discrete, spaced-apart portions of the length of the side skirt walls 30. For example, FIGS. 4-6 show the compressible structure 58 spanning a portion of the length of the side skirt walls 30, wherein the side skirt walls 30 extend farther forward and rearward than the compressible structure 58. However, it should be understood that the compressible structure 58 may extend farther forward and/or rearward or substantially in line with the side skirt walls 30. The compressible structure 58 may also extend downwardly from the floor assembly 26 a height less than, equal to, or more than a height of the skirt system 12. For example, the compressible structure 58 may extend downward from the side walls 14 a height equal to the side skirt walls 30 (stopping before the flexible flaps 36). In another example, the compressible structure 58 may extend a height past the wall panels 32, but not past the flexible flap 36. As a result, the compressible structure 58 may be of sufficient height to provide clearance when the trailer 10 traverses obstacles, such as a curb or railroad track where the road surface is not flat.

The compressible structure 58 may be coupled to the trailer 10 and/or the skirt system 12 in any suitable manner. In illustrative embodiments, the support system 54 may include one or more connectors (not shown) configured to couple the compressible structure 58 to the trailer 10 and/or the skirt system 10. For example, the compressible structure 58 may be coupled to an underside of the floor assembly 26, such as to one or more cross members 40. Additionally, or alternatively, the compressible structure 58 may be coupled to inner surfaces of the side skirt walls 30 and/or the mounting bracket assemblies 34.

Figure 9:
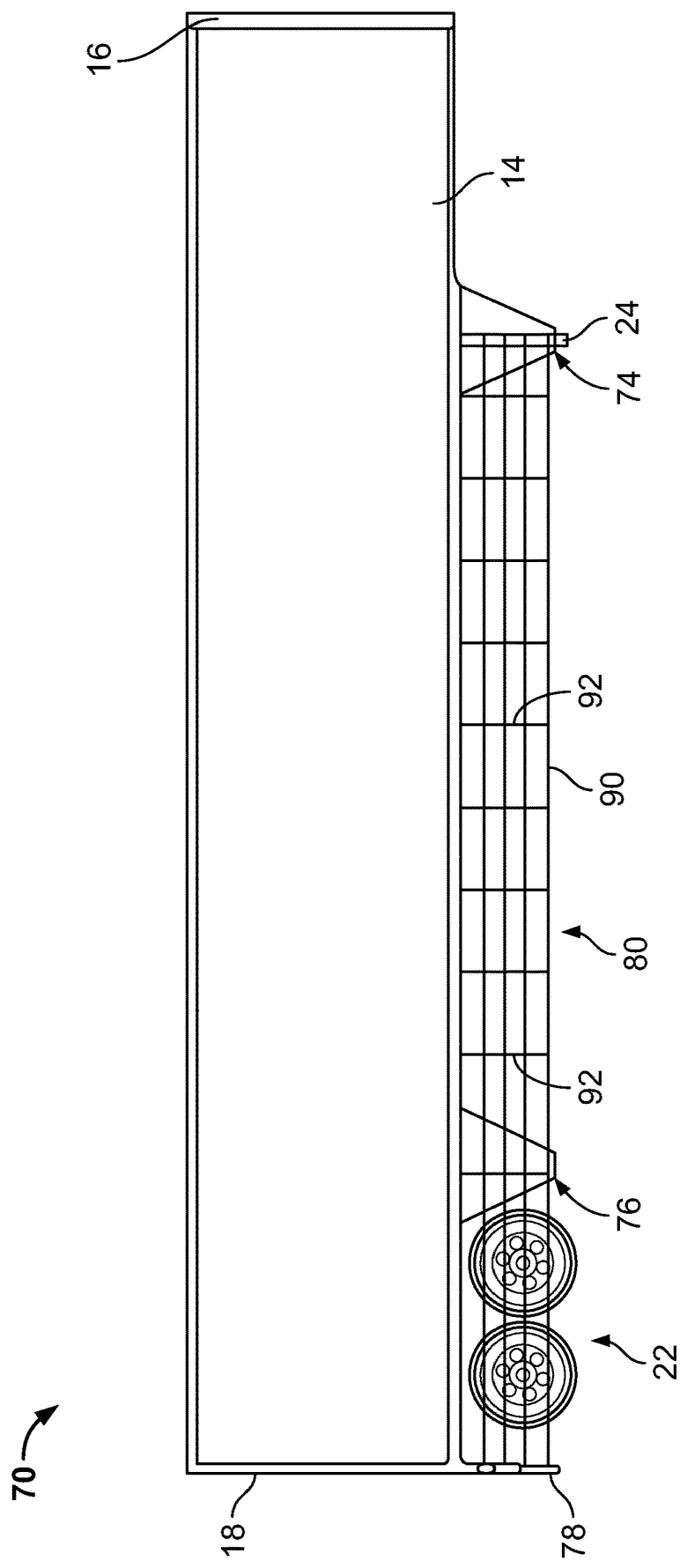
FIG. 9 is a side view of a trailer including a side underride cable system coupled thereto in order to reduce the risk of vehicles intruding laterally under a floor assembly of the trailer in a side impact collision, for example.

Looking now to FIGS. 9-14, in another illustrative embodiment, a trailer 70 includes another side underride system 72 coupled to the floor assembly 26 of the trailer 70. As is discussed in greater detail below, the side underride system 72 extends below and generally along the side walls 14 of the trailer 70 (shown in FIG. 9) in order to reduce the risk of an automobile riding under the trailer 70 in the event of a side impact collision, for example. Illustratively, the side underride system 72 includes front, intermediate, and rear mounting bracket assemblies 74, 76, 78 coupled to the floor assembly 26 of the trailer 70 and a cable system 80 extending therebetween. As shown in FIG. 9, the front assembly 74 is positioned near—and/or coupled to—the landing gear 24 of the trailer 70, the intermediate assembly 76 is positioned near and forward from the rear wheel assembly 22, and the rear assembly 78 is positioned behind the rear wheel assembly 22. It should be understood, however, that the mounting bracket assemblies 74, 76, 78, as well as any other mounting bracket assemblies disclosed herein, may alternatively be coupled to the trailer 70 at other locations along the length of the trailer 70. In particular, the mounting bracket assemblies 74, 76, 78 may be coupled to the trailer 70 and positioned in spaced-apart relation to each other so that a cable system 80, as well as any other cable system disclosed herein, extends along the entire, or substantially the entire, length of the trailer 70. Alternatively, the mounting bracket assemblies 74, 76, 78 may be coupled to the trailer 70 and positioned in spaced-apart relation to each other such that the cable system 80 extends along only a small portion of the length of the side of the trailer 70. Still further, any suitable number of bracket assemblies may be utilized.

Figure 10:
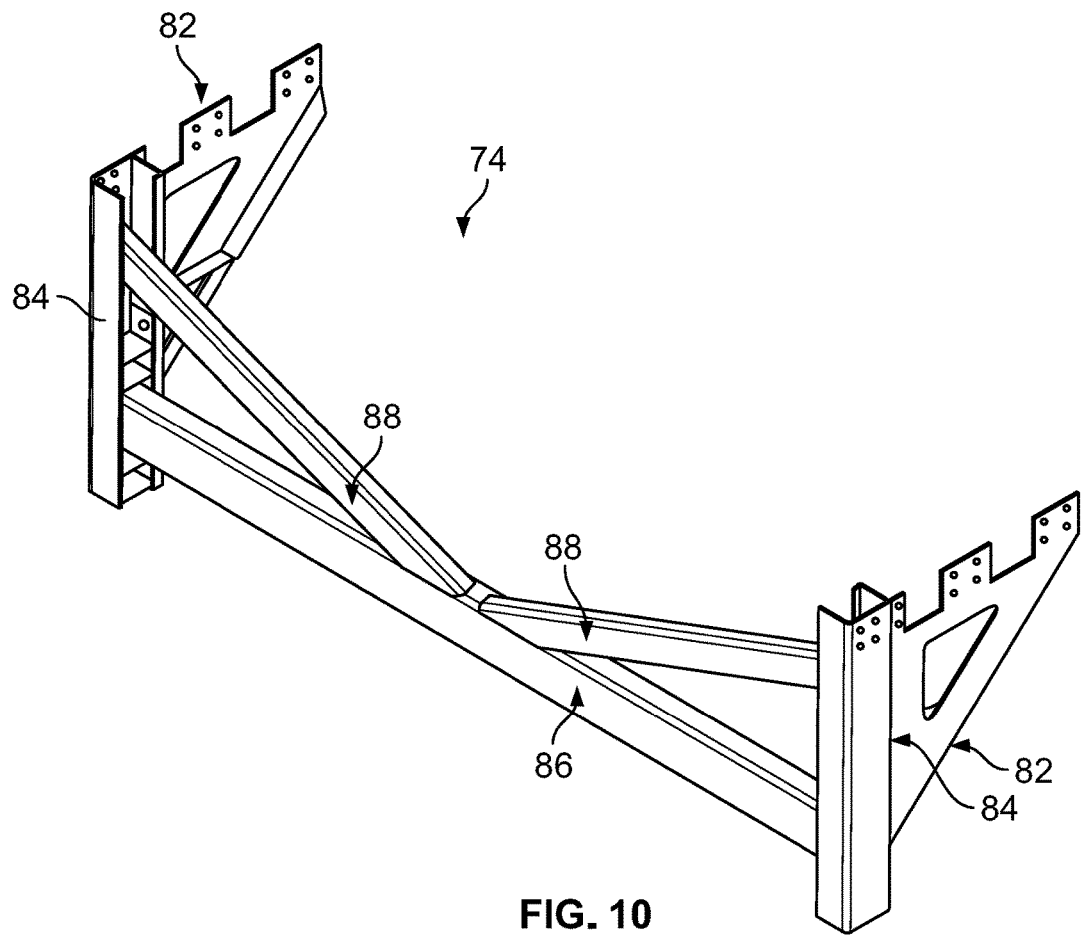
FIG. 10 is a perspective view of a mounting bracket assembly for use with the side underride cable system of FIG. 9.

The front mounting bracket assembly 74 is shown in FIG. 10 and includes side flange members 82 configured to be coupled to the base rail 28 (shown in FIG. 9) of the trailer 70, a vertical corner post 84 coupled to each side flange member 82, a cross-brace 86 coupled to and extending between the corner posts 84, and support braces 88 each coupled at one end to a respective corner post 84 and at an opposite end to the cross-brace 86. Illustratively, the flange members 82 are generally triangular in shape and are each welded to the adjacent corner posts 84; however, it is within the scope of this disclosure to couple the flange members 82 and the posts 84 together using fasteners such as rivets, bolts, screws, etc. Similar to the flange members 82, the corner posts 84 are each configured to be coupled to the base rail 28 of the trailer 70 using a fastener such as a rivet, screw, bolt, or another suitable connection. Illustratively, while only the front mounting bracket assembly 74 is shown and described in detail herein, it should be understood that the intermediate and/or rear mounting bracket assembly 76, 78 is the same as or substantially similar to the front mounting bracket assembly 74. Accordingly, the intermediate and rear mounting bracket assemblies 76, 78 also include side flange members and/or vertical posts configured to be coupled to the base rail 28 of the trailer 70.

As shown in FIG. 9, the side underride system 72 further includes the cable system 80 including one or more cables 90 extending at least partially along a length each of the right and left sides of the trailer 70 from the front mounting bracket assembly 74 to the rear mounting bracket assembly 78. The cable system 80 includes three, four, or five cables 90 that are each coupled to and terminate in a bottom portion of the corner post 84 of respective mounting bracket assemblies 74, 76, 78. Illustratively, the cables 90 may be steel cables and may be approximately three-eighths to ½ inch in diameter. In the case of fewer cases, for example a single cable, the steel cable(s) may be great in diameter, for example, about ¾ inch in diameter. Of course, it is within the scope of this disclosure to include any number of cables made from other suitable materials including composite rope, composite fibers, and other suitable high strength, low stretch materials, and having other suitable diameters. Further, the cables 90 may be covered in ballistic nylon or canvas to improve aerodynamic drag reduction thereon.

Cable terminals (not shown) may be used to receive an end of each of the cables 90 therein. Such cable terminals may be formed in and/or coupled to the corner post 84 to secure the cables 90 thereto. Other suitable fasteners may be used to couple the cables 90 to the mounting bracket assemblies 74, 76, 78, as further described below. In use, the cables 90 are taut and operate as a protective system to reduce the risk of automobiles intruding under the floor assembly 26 of the trailer 70 during a side impact accident. Further, the cables 90 retain some flexibility and thus operate to absorb some of the force and energy of any impact thereto to potentially decrease any forces on the passengers within the automobile that is in the accident with the trailer 70.

Figure 11:
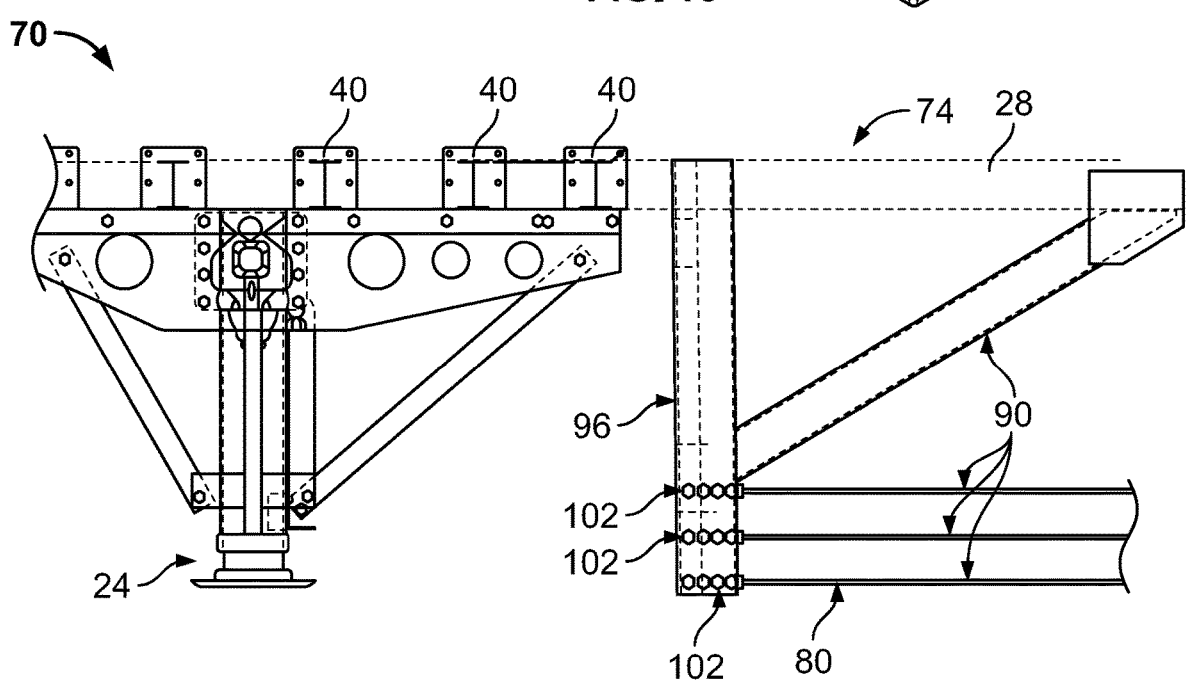
FIG. 11 is a side view of a portion of another mounting bracket assembly for use with the side underride cable system of FIG. 9.

As shown in FIG. 9, the cable system 80 includes four cables 90 running in parallel to each other at least partially along a length of the trailer 70 to provide the side underride protection. Illustratively, the cable system 80, as well as other cable systems described herein, may be modified to extend along a greater or a lesser length of the trailer than what is illustratively shown in the figures. The cables 90 may be approximately four to six inches apart from each other. However, the cable system 80 of the side underride system 72 may include any number of cables 90 spaced any distance apart from each other. For example, the cable system 80 may include three cables 90, as shown in FIG. 11. Such cables 90 may be attached to the corner posts 84 and/or the flange members 82 of the mounting bracket assemblies 74, 76, 78.

The intermediate mounting bracket assembly 76 may serve to prevent the cable system 80 from swaying laterally inwardly or outwardly and may operate to prevent the cables 90 from drooping and to assist the cables 90 in working together to take loading from a vehicle impact and reduce the extent to which such a vehicle can intrude under the side or ends of the trailer 10. In particular, the intermediate mounting bracket assembly 76 may serve to prevent the cable system 80 from swaying laterally inwardly and contacting the rear wheel assembly 22.

Furthermore, the side underride system 72 may also include cable supports 92 (shown in FIG. 9) to support the cables 90 along the length of the trailer 70 between the front and rear mounting bracket assemblies 74, 78. As shown diagrammatically in FIG. 9, the cable supports 92 include a plurality of vertical support members coupled to each of the four horizontal cables 90. The vertical support members are spaced-apart from each other along the length of the cables 90 and operate to provide increased stability and rigidity to the cable system 80. Illustratively, each vertical support 92 may include a flexible connection such as a chain, cable, or fabric strap extending from the top cable 90 to the bottom cable 90 such that each of the four cables 90 is threaded through one of the links of the chain. Alternatively or additionally, the vertical support 92 may include a rigid structure, such as a beam, bar, or other structure, having four apertures along a length thereof to receive a respective one of the four horizontally-extending cables 90 therethrough. For example, the rigid structure include plastic, metal, or a composite material. Each of the vertical supports may be coupled to the floor assembly 26 of the trailer 70. In particular, the cable supports 92 may be coupled to the base rail 28 and/or the cross members 40 of the trailer 70 and may operate to prevent the cables 90 from drooping and to assist the cables 90 in working together to take loading from a vehicle impact and reduce the extent to which such a vehicle can intrude under the side or ends of the trailer 70.

As described above and shown in FIG. 9, the cable system 80 includes cables 90 that run along a length of the trailer 70 from the rear mounting bracket assembly 78, through the intermediate mounting bracket assembly 76, to the front mounting bracket assembly 74 along each of the right and left sides of the trailer 70. However, the cable system 80 may also include cables 90 that run across a width of the trailer 70 from one vertical post 84 of one of the mounting bracket assemblies 74 or 78, to the other vertical post 84 of the same mounting bracket assembly 74 or 78, as shown in the alternative mounting bracket assemblies 94 of FIGS. 11-14, for example. In particular, the mounting bracket assemblies 94 are similar to the mounting bracket assemblies 74, 76, 78; as such, like reference numbers are used to denote the same or similar components. However, the mounting bracket assemblies 94 shown in FIGS. 11-14 include alternative vertical corner posts 96.

Figure 12:
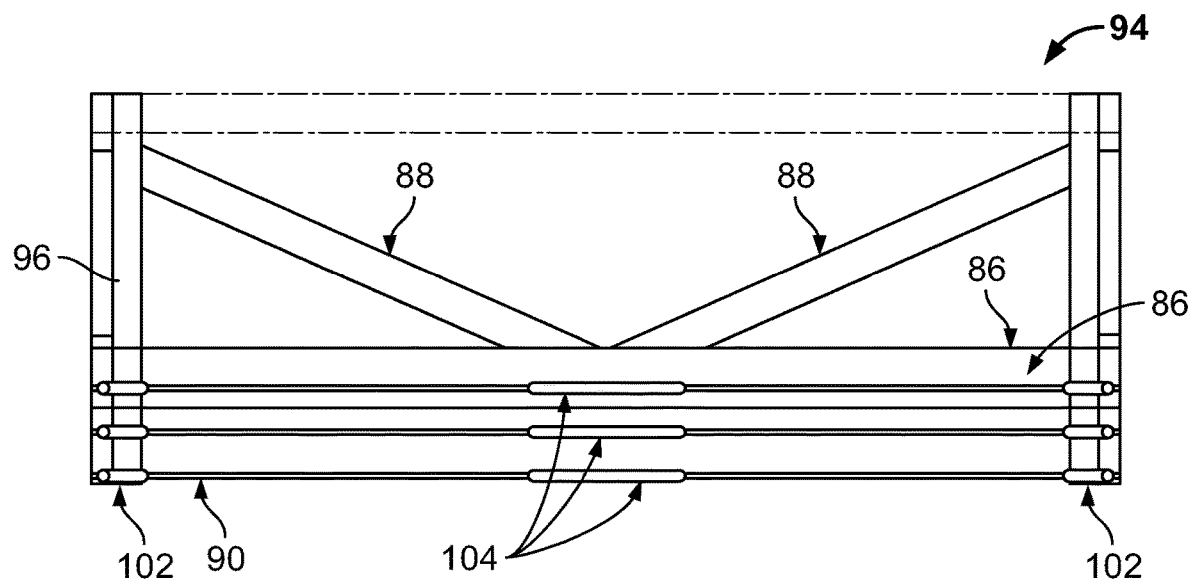
FIG. 12 is an end view of the mounting bracket assembly of FIG. 11 showing lateral cables extending across a width of the trailer.
Figure 13:
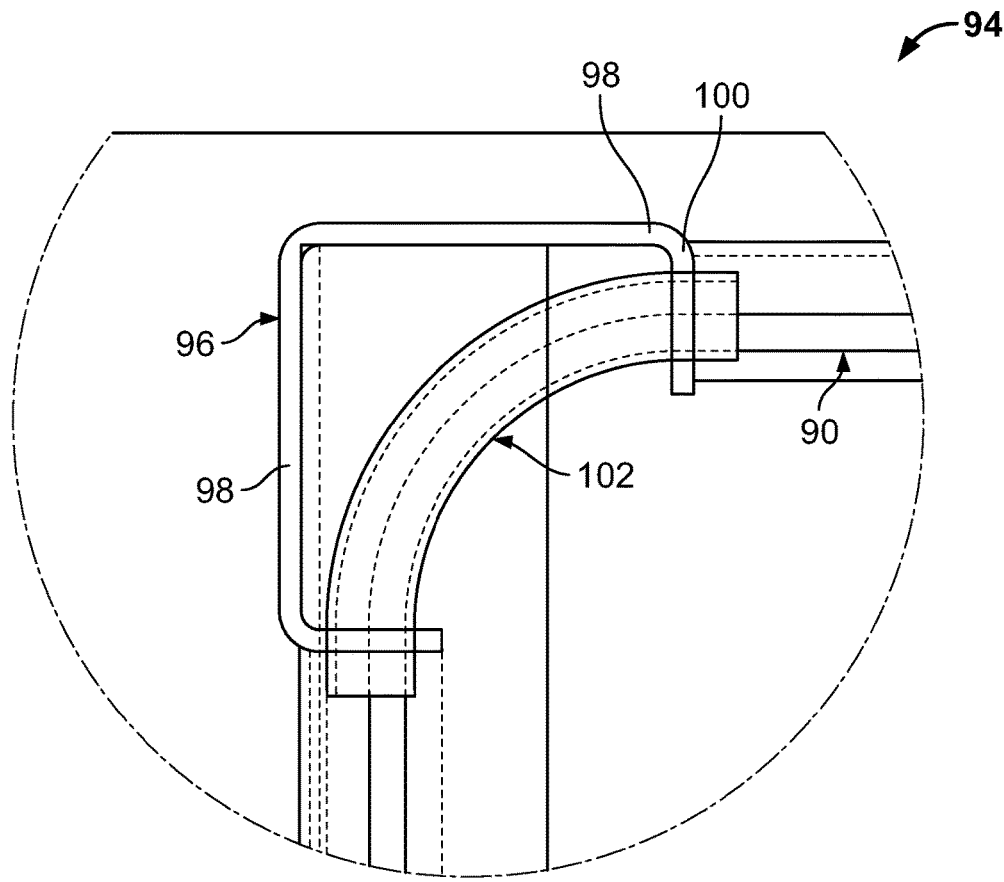
FIG. 13 is a plan view of a portion of the mounting bracket assembly of FIG. 11 showing a corner cable guide for threading cable therethrough.

Illustratively, each post 96 includes first and second adjacent side walls 98 and shortened end walls 100 each coupled to one of the side walls 98, as shown in FIG. 13. The cross-section of each corner post 96 defines a partially-formed square tube. The corner posts 96 further include rounded cable guides 102 coupled to each of the end walls 100 in order to guide a cable 90 therethrough to make a 90-degree bend. As shown in FIGS. 12 and 13, the end of each cable guide 102 is received through an aperture in one of the end walls 100 of the post 96. Illustratively, the cable system 80 shown in FIGS. 11-14 includes three cables 90; thus, the post 96 includes three cable guides 102. Accordingly, the cable system 80 coupled to the mounting bracket assemblies 94 of FIGS. 11-14 may include continuous strands of cables 90 extending along a first side of the trailer 70 from the front mounting assembly 94, to the rear mounting assembly (not shown), across the rear width of the trailer 70 (and thus across the rear mounting assembly), along a second side of the trailer 70 from the rear mounting assembly 94 to the front mounting assembly 94, and across the front width of the trailer 70 (and thus across the front mounting assembly 94). Further, the cable system 80 may include turn buckles 104 coupled to each individual cable 90, as shown in FIG. 12, in order to tension the cable 90 as desired. Of course, it should be understood that other suitable tensioning devices may be used and positioned along any portion of the cable system 80 in order to tension the cables 90 as desired.

While the front and rear mounting bracket assemblies 74, 78 are depicted as being independent structures, it is within the scope of the present disclosure to incorporate the concepts described herein as part of or an attachment to any portion of the landing gear or any portion of a rear impact guard, which is attached to a rear end of the trailer, respectively.

Figure 15:
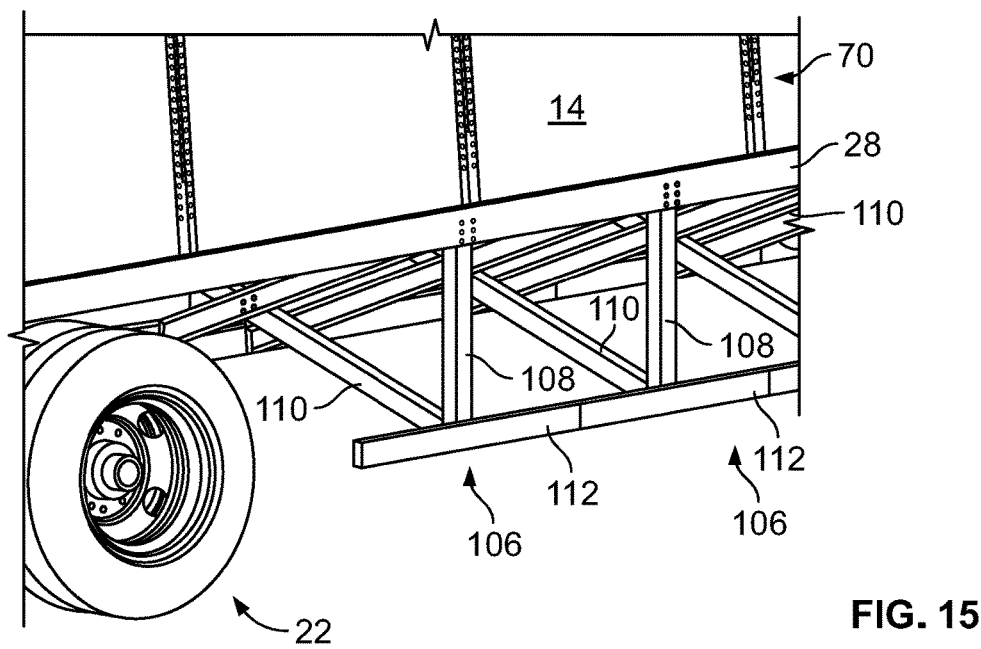
FIG. 15 is a perspective view of another side underride guard.
Figure 16:
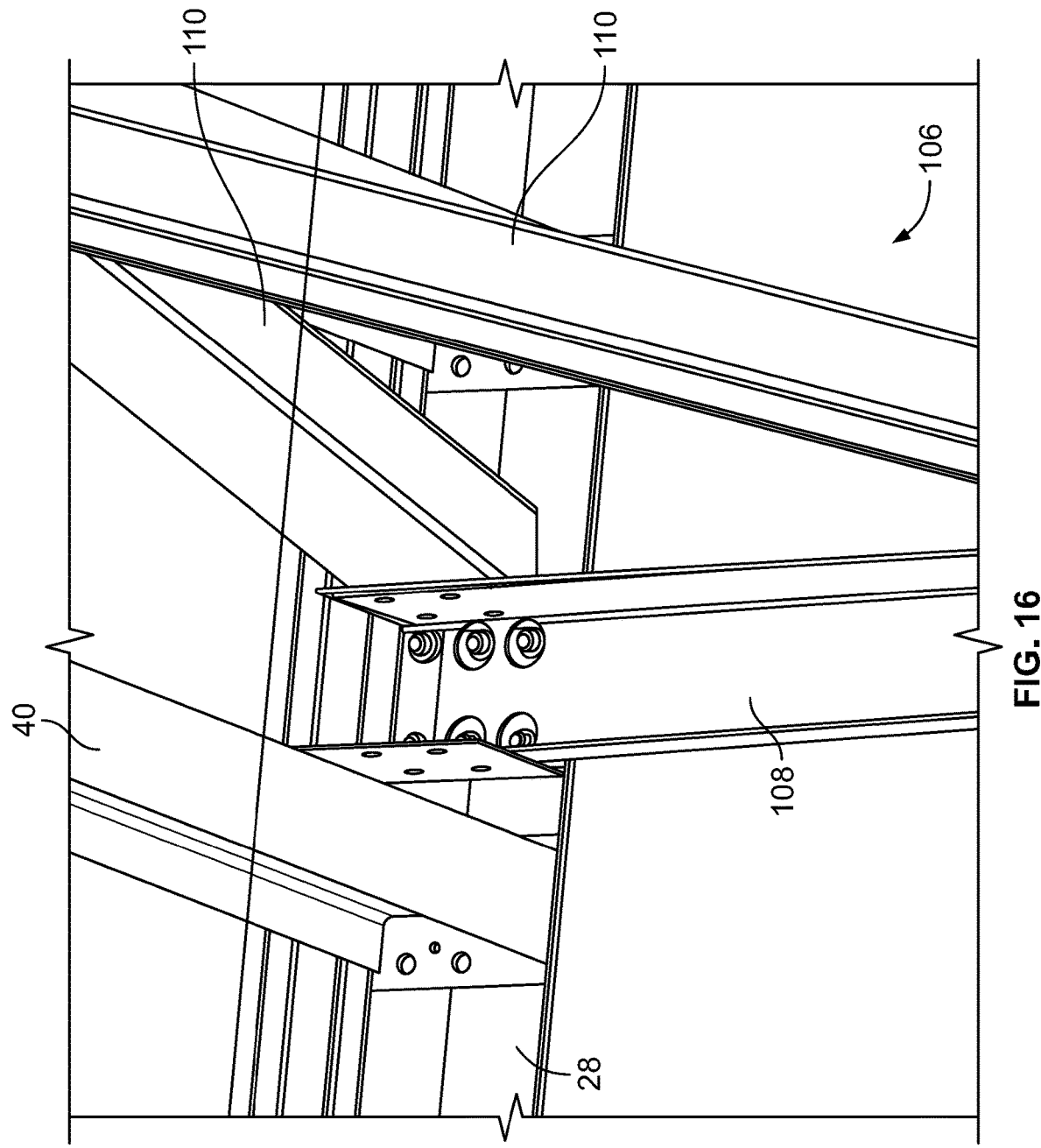
FIG. 16 is a perspective underside view of a portion of the side underride guard of FIG. 15.

Illustratively, front, intermediate, and rear mounting bracket assemblies 74, 76, 78, 94 are described herein. However, it is within the scope of this disclosure to include fewer or more mounting brackets or incorporate additional supports for the cable systems described herein. For example, FIG. 15 illustrates a side underride guard including a plurality of bracing assemblies 106 spaced from one another across the length of the trailer 70. As shown in FIGS. 15-16, the bracing assemblies 106 may include vertical posts 108, cross braces 110 coupled to and extending between the vertical posts 108, and rail members 112 coupled to and extending perpendicular from a lower edge of each vertical post 108 to form a support structure.

Illustratively, the vertical posts 108 are each configured to be coupled to the base rail 28 (or any other suitable component), for example, between the cross members 40 of the floor assembly 26 (and not directly connected to the floor assembly 26) of the trailer 70 using a fastener such as a rivet, screw, bolt, or another suitable connection, as shown in FIG. 16. The cross braces 110 are each welded to the adjacent vertical posts 108; however, it is within the scope of this disclosure to couple the cross braces 110 and the vertical posts 108 together using fasteners such as rivets, bolts, screws, or another suitable connection. Further, in some embodiments, the cross braces 110 may be coupled to the floor assembly 26 (such as to the base rail 28 or the cross members 40) instead of, or in addition to, the vertical posts 108. Illustratively, two cross braces 110 are oriented relative to each other and the vertical posts 108 so that the cross braces 110 cross each other at a point between the vertical posts 108. The cross braces 110 may be coupled to each other at this point, such as with rivets, bolts, screws, or another suitable connection, to further reinforce and strengthen the bracing assembly 106. Optionally, as shown in FIG. 16, the bracing assembly 106 may further include another cross brace 110 coupled between the vertical posts 108 in a substantially horizontal orientation directly below the floor assembly 26 or spaced downwardly from the floor assembly 26 (for example, between lower edges of each of the cross braces 110). Furthermore, rail members 112 may be welded or otherwise coupled to a lower edge of each vertical post 108 forming a "T" connection, as shown in FIG. 15. Each rail member 112 of the bracing assemblies 106 may be spatially separated from an adjacent rail member 112, or each rail member 112 may touch or be coupled to adjacent rail members 112 to further reinforce the side underride system 72.

While a specific number of bracing assemblies 106 (i.e., vertical posts and cross braces 110) are depicted, any suitable number of bracing assemblies 106 may be utilized. Further, although uniform spacing is utilized between adjacent bracing assemblies 106, the spacing between adjacent bracing assemblies 106 may not be uniform. In an illustrative example, the spacing between adjacent bracing assemblies 106 may be greater toward a center of the trailer and less toward the landing gear (and front rear wheel assembly) and the rear wheel assembly.

Figure 19:
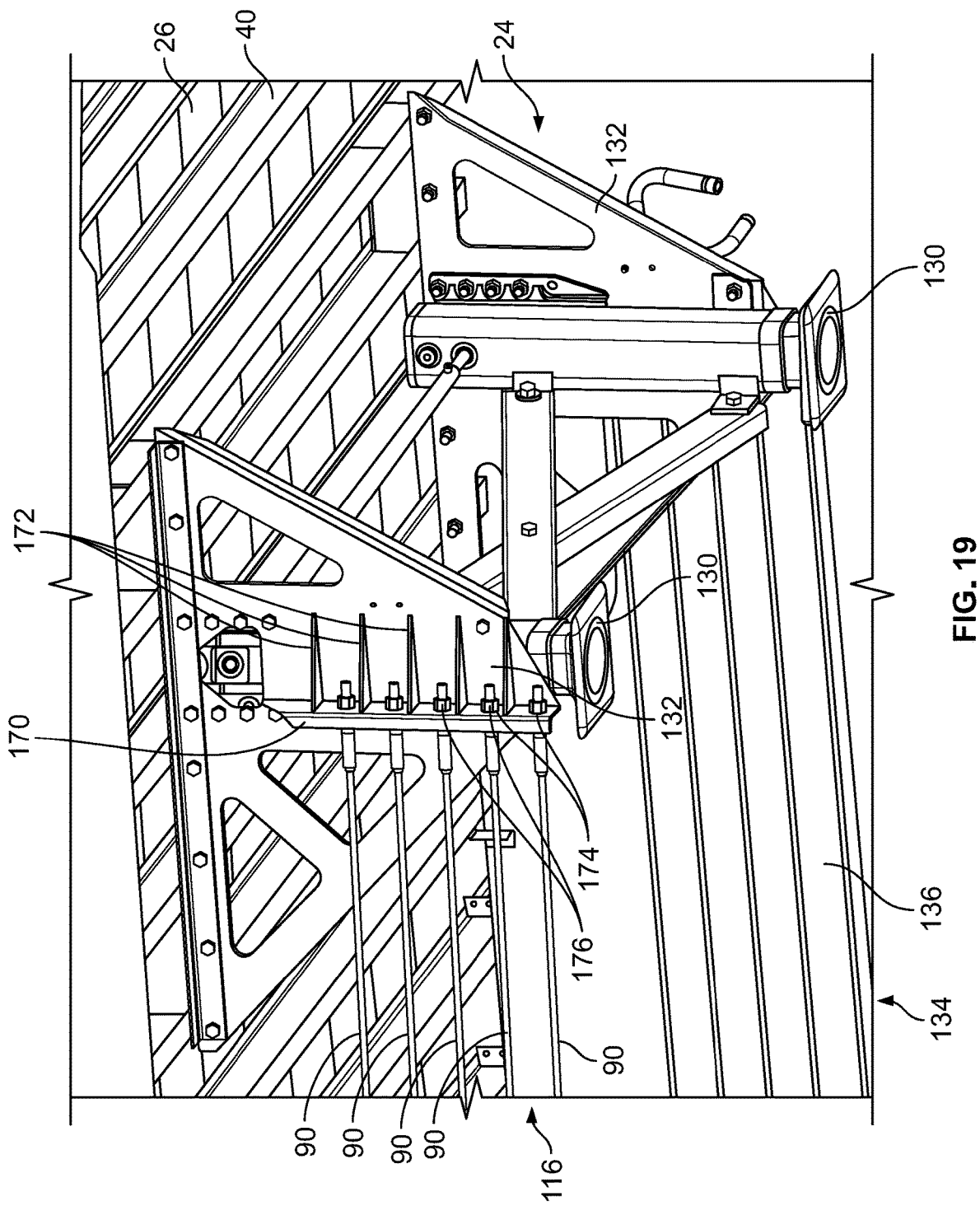
FIG. 19 is a perspective, underside, front view of the side underride system of FIG. 17.
Figure 20:
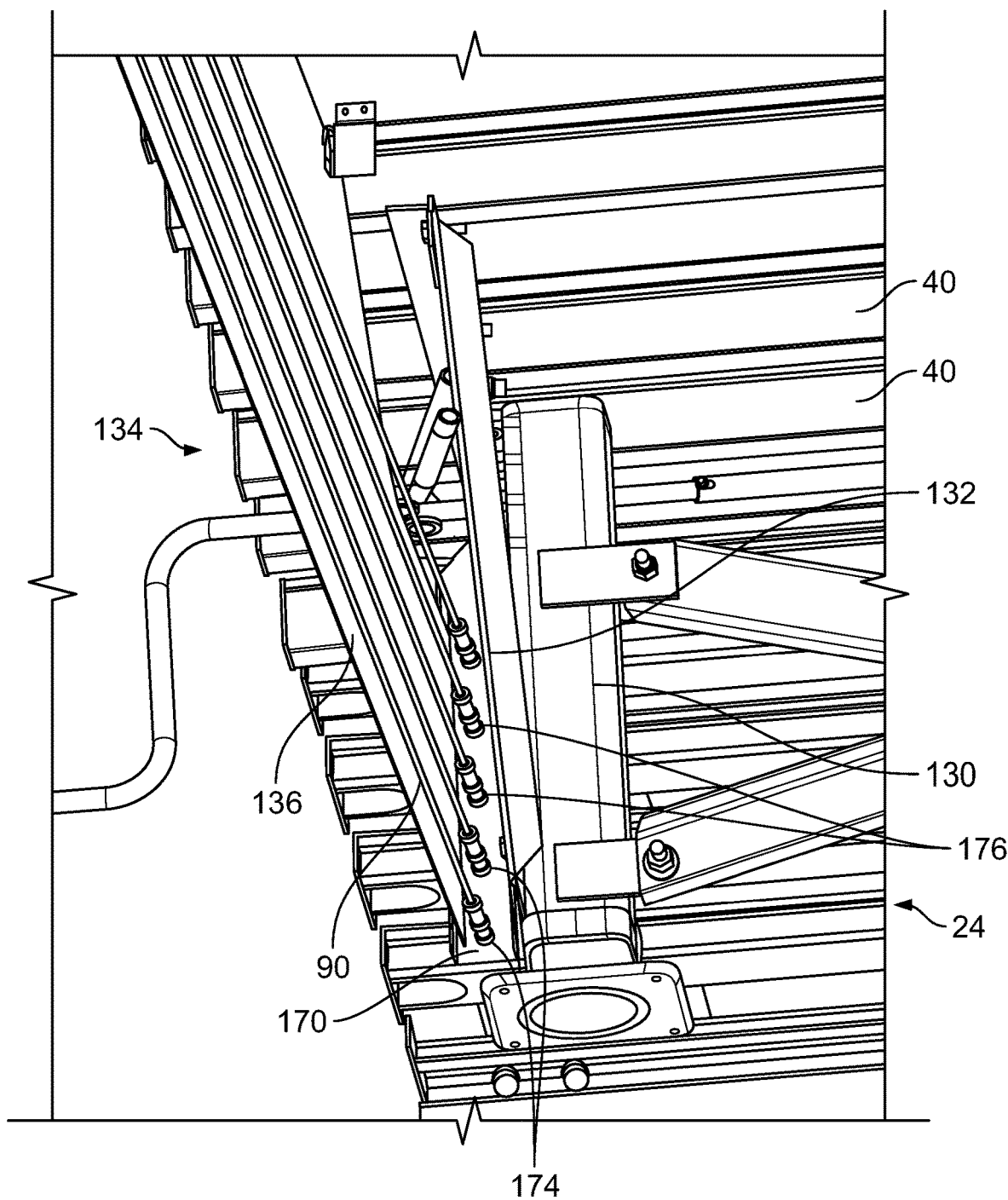
FIG. 20 is another perspective, underside, front view of the side underride system of FIG. 17.

One or more of the bracing assemblies 106 (and, more specifically, the vertical posts 108 and the rail members 112) may support a cable system 80, a skirt system 12, or any other portions of a side underride guard system and/or aerodynamic skirt system. More particularly, any of the cable systems disclosed herein may be utilized in combination with the bracing assembly 106. In an illustrative embodiment, a first end of a cable forming the cable system 80 (or any other cable system disclosed herein) may extend from and be coupled to a rearmost vertical post 108 and/or cross brace 110 or may extend from and be coupled to a rear portion of the rail members 112. A second end of the cable may be coupled rearward of the rear wheel assembly, for example, to a rear impact guard of the trailer. A second cable may be attached on the opposite side of the trailer in the same manner. In some embodiments, the cable system 80 may further include cables with first ends extending from and coupled to a front-most vertical post 108 and/or cross brace 110 or may be extend from and be coupled to a front portion of each of the rail members 112. Second ends of the cables may be coupled to a front portion of the trailer, for example, to the landing gear or a structure coupled to the landing gear (for example, as seen in FIGS. 19 and 20).

Alternatively, the bracing assemblies 106 alone may form a side underride system. As such, the bracing assemblies 106 may be an OEM side underride system design (that is, not for use as a retrofit with an existing skirt system) or, alternatively, may be used as a retrofit with existing skirt systems. As the bracing assemblies 106 are attached directly to the base rail 28, for example rather than the floor assembly 26, an installer may make such connections from beside the trailer 70 rather than underneath the trailer 70, thus potentially permitting easier installation. However, it is also within the scope of this disclosure to couple the bracing assemblies 106 to the floor assembly 26 of the trailer 70, such as to the cross members 40.

As described above, it is within the scope of this disclosure to include fewer or more mounting brackets 74, 76, 78, 94 or incorporate additional supports for the cable systems described herein. For example, FIGS. 17-20 illustrate another side underride system 114 for a trailer 115. The side underride system 114 may include a cable system 116, like that described above, that extends along the entire, or substantially the entire, length of the trailer 115. Alternatively, the cable system 116 may extend along only a small portion of the length of the side of the trailer 115. In one specific example, the cable system 116 extends from a rear impact guard 118, through an intermediate bracing assembly 120, to the landing gear 24. In other words, the side underride system 114 may utilize the existing rear impact guard 118 and landing gear 24 of the trailer 70. However, it is within the scope of this disclosure for the side underride system 114 to utilize one or more mounting bracket or bracing assemblies described above in addition to or instead of the RIG 118 and landing gear 24.

The rear impact guard (RIG) 118 is a system installed on or near the rear of the trailer 115 so that when the trailer 115 is struck from the rear by a vehicle, the RIG 118 potentially limits a distance that a striking vehicle's front end slides under the rear end of the trailer 115. The RIG 118 thus typically includes sufficient strength and structure to prevent rear vehicle underride. As such, the RIG 118 may be used to provide strength and structure to support to the cable system 116 for preventing side vehicle underride.

Figure 17:
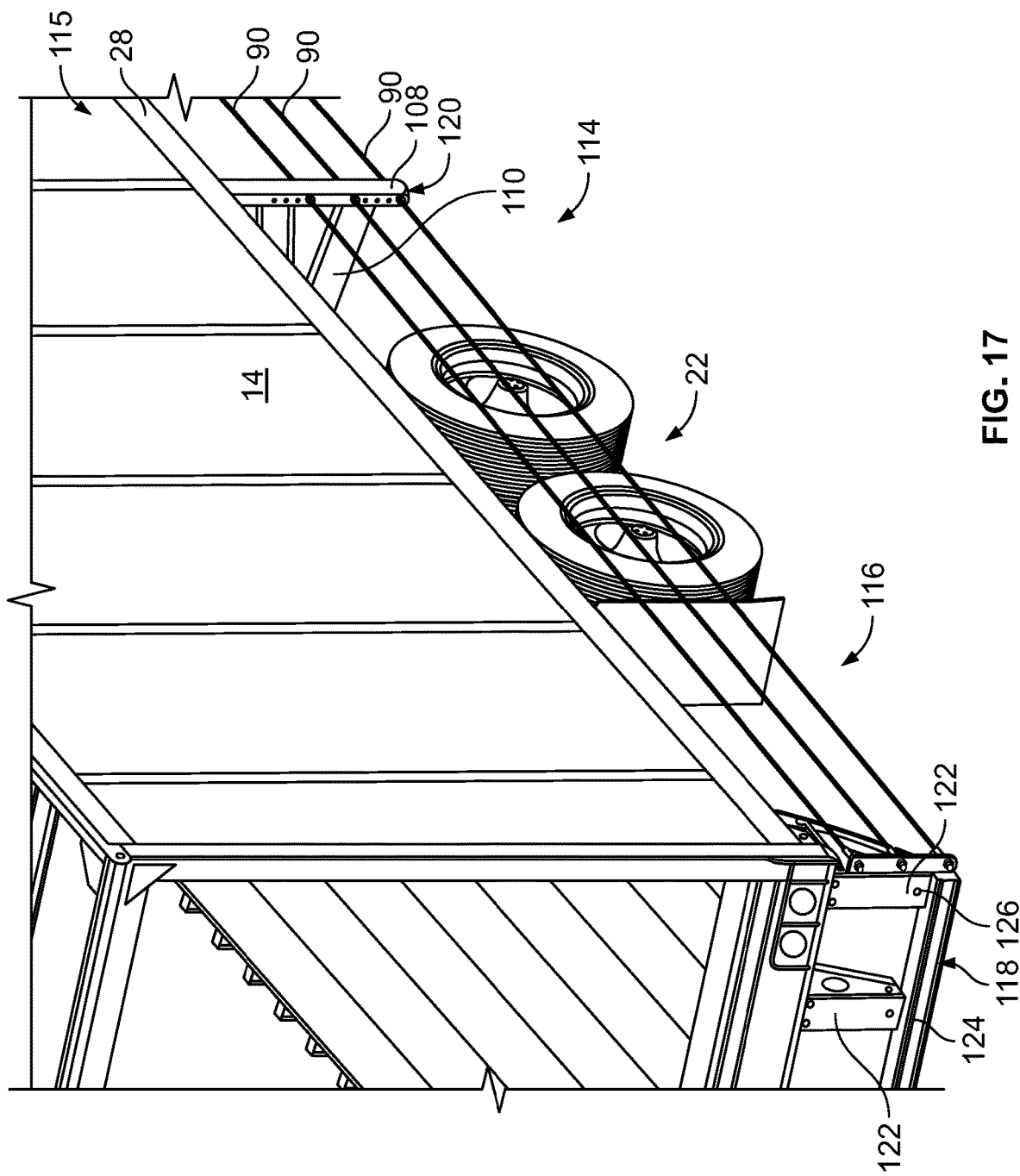
FIG. 17 is a perspective rear view of a trailer with another side underride system.
Figure 18:
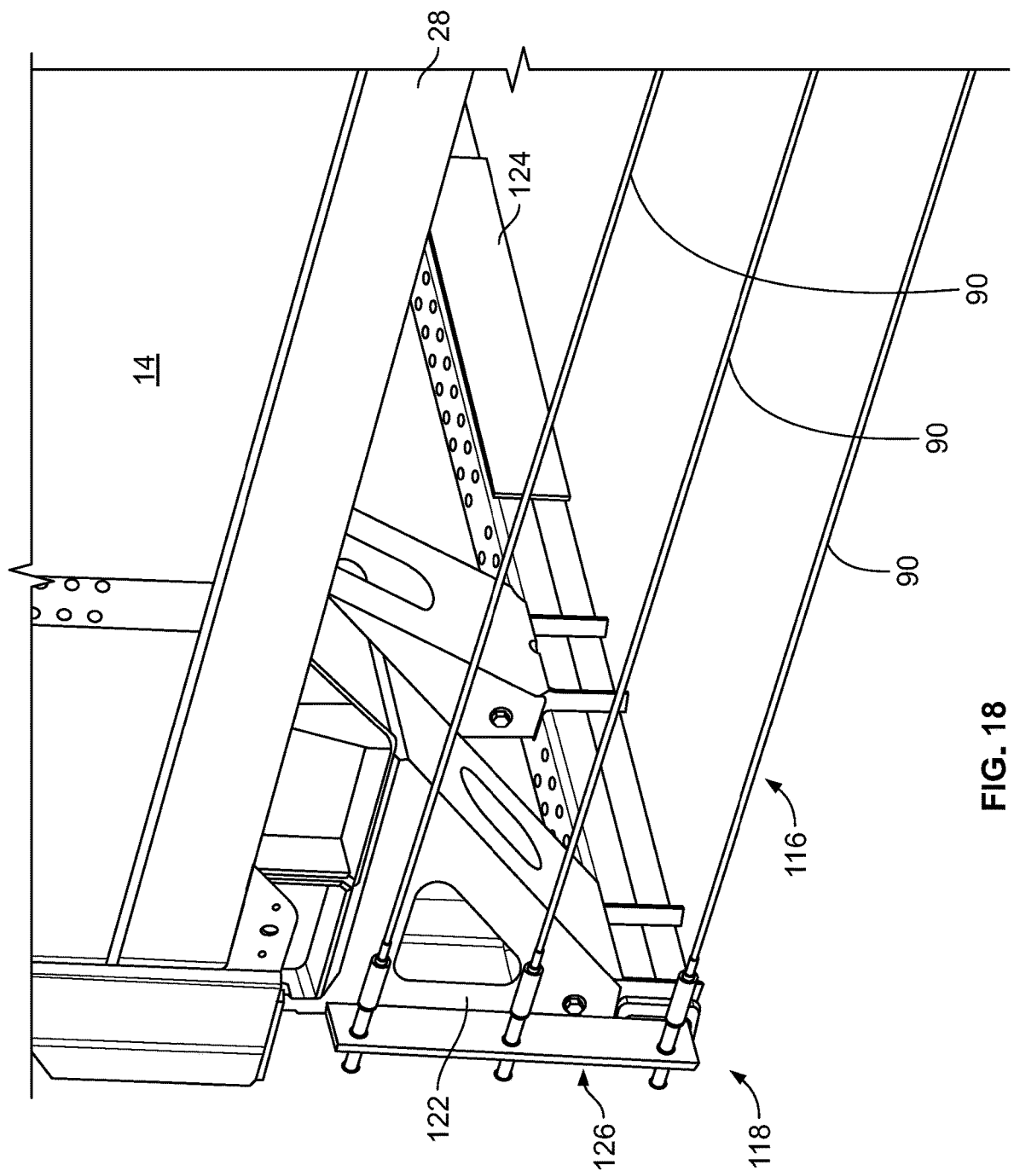
FIG. 18 is another perspective rear view of the side underride system of FIG. 17.

Illustratively, the RIG 118 may include one or more bumper support members 122 and a bumper 124. As shown in FIGS. 17 and 18, the bumper support members 122 may be coupled to the floor assembly 26 at the rear of the trailer 115 (e.g., extending downward from the rear end wall 18) and the bumper 124 is coupled across a bottom of the bumper support members 122, thus extending across a width of the rear of the trailer 115. One or more cables 90 of the cable system 116 may be coupled to a plate 126 coupled to or integral with an outer bumper support member 122 (e.g., by welding, fasteners, or other suitable coupling methods). Alternatively, an existing RIG 118 without a vertical support at its outer end may be modified to couple an additional bracket, or bumper support member, to the outer end of the bumper 124.

The cables 90 may be permanently or removably coupled to the plate 126 by any suitable means. Alternatively, the cables 90 may be coupled to other portions of the RIG 118 (such as forward or rear surfaces of the bumper support member 122, for example). Additionally, while three cables 90 are shown in FIGS. 17-20, it is within the scope of this disclosure to provide the cable system 116 with more or less cables 90, such as one, two, three, four, or five cables 90. As described above, the RIG 118 has sufficient strength to provide a suitable anchor point for the cable system 116. Further, using the RIG 118 as an anchor point for the cable system 116 may eliminate the need for a rear bracing system, thus potentially minimizing additional weight (and cost) that the side underride system 114 may add to the trailer 115.

From the RIG 118, the cables 90 may extend forward and through the intermediate bracing assembly 120. Illustratively, the intermediate bracing assembly 120 may be similar in structure and function to the bracing assemblies 106 described above; as such, like reference numbers are used to denote the same or similar components. As shown in FIG. 17, the cables 90 may be routed through cable guides or apertures of a vertical post 108 of the intermediate bracing assembly 120. Like the intermediate mounting bracket assembly 76 of FIG. 9, the intermediate bracing assembly 120 may serve to prevent the cable system 116 from swaying laterally inwardly or outwardly and may operate to prevent the cables 90 from drooping and to assist the cables 90 in working together to take loading from a vehicle impact and reduce the extent to which such a vehicle can intrude under the side or ends of the trailer 115. In particular, the intermediate bracing assembly 120 may serve to prevent the cable system 116 from swaying laterally inwardly and from contacting the rear wheel assembly 22 (e.g., so that the cables 90 do not rub against the tires of the rear wheel assembly 22 during normal operation).

Additionally, in some embodiments, the intermediate bracing assembly 120 (and/or the cable connections at the intermediate bracing assembly 120, the landing gear 24, or the rear wheel assembly 22) may be positioned so that the cables 90 are angled or curved relative to the side walls 14 of the trailer 115. For example, the intermediate bracing assembly 120 may extend outward past the plane of the side wall 14 to further ensure that the cables 90 bow outwardly from the front end of the trailer 115 to the back end of the trailer 115 so that the cables 90 do not rub against the tires of the rear wheel assembly 22. In some embodiments, the cables 90 may also be angled inward at the front of the trailer 115. Also, a bottom cable 90 may generally angle upwardly from the intermediate bracing assembly 120 to the RIG 118, for example when the RIG 118 is not positioned as low (or close to the ground) as the landing gear 24.

From the intermediate bracing assembly 120, the cables 90 may extend forward and to the landing gear 24, as shown in FIGS. 19-20. As all trailers include landing gear assemblies, using the landing gear 24 as an anchor point for the cable system 116 may eliminate a need for a front bracing system, thus potentially minimizing additional weight (and cost) that the side underride system 114 may add to the trailer 115. Illustratively, the landing gear 24 includes legs 130 and side braces 132 coupled to the floor assembly 26. The cables 90 may be permanently or removably coupled to the side braces 132. However, it is within the scope of this disclosure for the cables 90 to be coupled to the legs 130.

As seen in FIGS. 19-20, the landing gear 24 may include a transverse brace or bracket 170 that is generally perpendicular to the side braces 132 and a direction of travel of the trailer 115. The transverse brace 170 may include a plurality of fins 172 coupled, for example, integrally coupled or coupled by welding or in any other suitable manner, between the transverse brace 170 and the side brace 132. The fins 172 provide support to the traverse brace 132 to reduce stress on the transverse brace 132 in a direction of travel of the trailer 115. While fins 172 are only shown on a forward side of the transverse brace 132, fins could additionally or alternatively be utilized on a rearward side of the transverse brace 132. Further, while the fins 172 as shown as being spaced between each of the cables 90, any suitable number of fins 172 may be utilized with any suitable spacing.

Still referring to FIGS. 19-20, a plurality of apertures 174 extend through the transverse brace 170. Each of the cables 90 extends through a respective aperture 174 and a nut, bolt, or other suitable fastener 176 is attached to an end of the each cable 90 to attach the cables 90 to the transverse brace 170 and the prevent the cables 90 from being pulled through the aperture 174, while still allowing a user to uncouple the cables 90 from the transverse brace 170. While one particular manner of coupling the cables 90 to the transverse brace 170 is shown, the cables 90 may be coupled to the transverse brace 170 in any other suitable manner.

In some embodiments, the landing gear 24 may be reinforced to further support the side underride system 114. For example, current landing gear assemblies are structured to support the weight of the trailer 115 (i.e., downward forces), wherein the side braces 132 act to maintain the legs 130 in a vertical orientation under heavy loads. Accordingly, in some embodiments, the landing gear 24 may be reinforced to better accommodate lateral loads, such as forces caused by a side collision. Such reinforcement may be accomplished through additional cross-bracing or other methods.

Illustratively, the above-described side underride system 114 may extend below a side wall 14 of the trailer 115 along substantially the entire length of the trailer 115. Accordingly the side underride system 114 may provide side underride protection along the entire length of the trailer 115, including from the rear wheel assembly 22 to the RIG 118. Further, the side underride system 114 may also act as a deflection mechanism for protecting the rear wheel assembly 22. For example, when a vehicle drifts across its lane toward the trailer 115, the vehicle may strike the cables 90 before striking the rear wheel assembly 22. Additionally, although the cable system 116 extends to the rear of the trailer 115, a driver may still inspect and access the rear wheel assembly 22 between the cables 90. As further described below, the cables 90 may also be removable from the RIG 118 to permit better access to the rear wheel assembly 22, if necessary. Still further, a tension in the cables 90 may be adjustable. It is also to be understood that the side underride system 114 may extend a shorter length along the trailer 115.

The side underride system 114, or any of the other described side underride systems, may be utilized in combination with an aerodynamic skirt assembly, such as the skirt assembly 12 of FIGS. 1-2. As a result, the side underride systems may be retrofit on trailers with existing aerodynamic skirt systems and may be spaced apart from or coupled to the skirt systems. Alternatively, the side underride system 114 (or any of the other described side underride systems) may incorporate its own aerodynamic skirt system 134, as shown in FIGS. 19-23. Illustratively, the side underride system 114 may provide primary support for the skirt system 134, thus potentially reducing the need, cost, and weight of a dedicated skirt system support structure while still providing aerodynamic functions.

Figure 21:
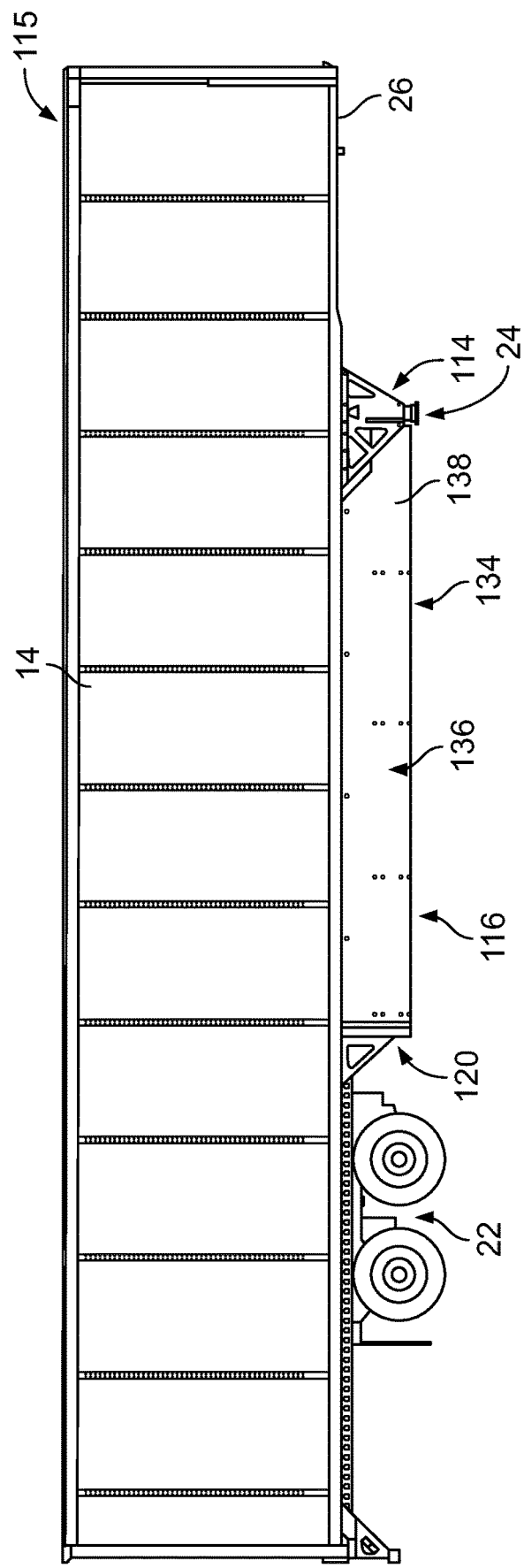
FIG. 21 is a side view of a side underride system with a cable system and also including an aerodynamic skirt system.

For example, as shown in FIG. 21, the skirt system 134 may include a side skirt wall 136 that extends from the landing gear 24 to the intermediate bracing assembly 120. However, it should be understand that the side skirt wall 136 may extend shorter or longer lengths along the side underride system 114. The side skirt wall 136 may include a single wall panel 138, as shown in FIG. 21, or multiple wall panels coupled together (e.g., in a similar manner to that described above with respect to the wall panels 32 of FIGS. 1-3). The side skirt wall 136 may be substantially rigid or flexible. Further, the side skirt wall 136 (and, more specifically, the wall panel 138) may include suitable composite materials, such as that described above with respect to the wall panels 32, or any number of suitable, non-composite materials such as metals, metal alloys, plastics, and/or fabrics, for example.

Figure 22:
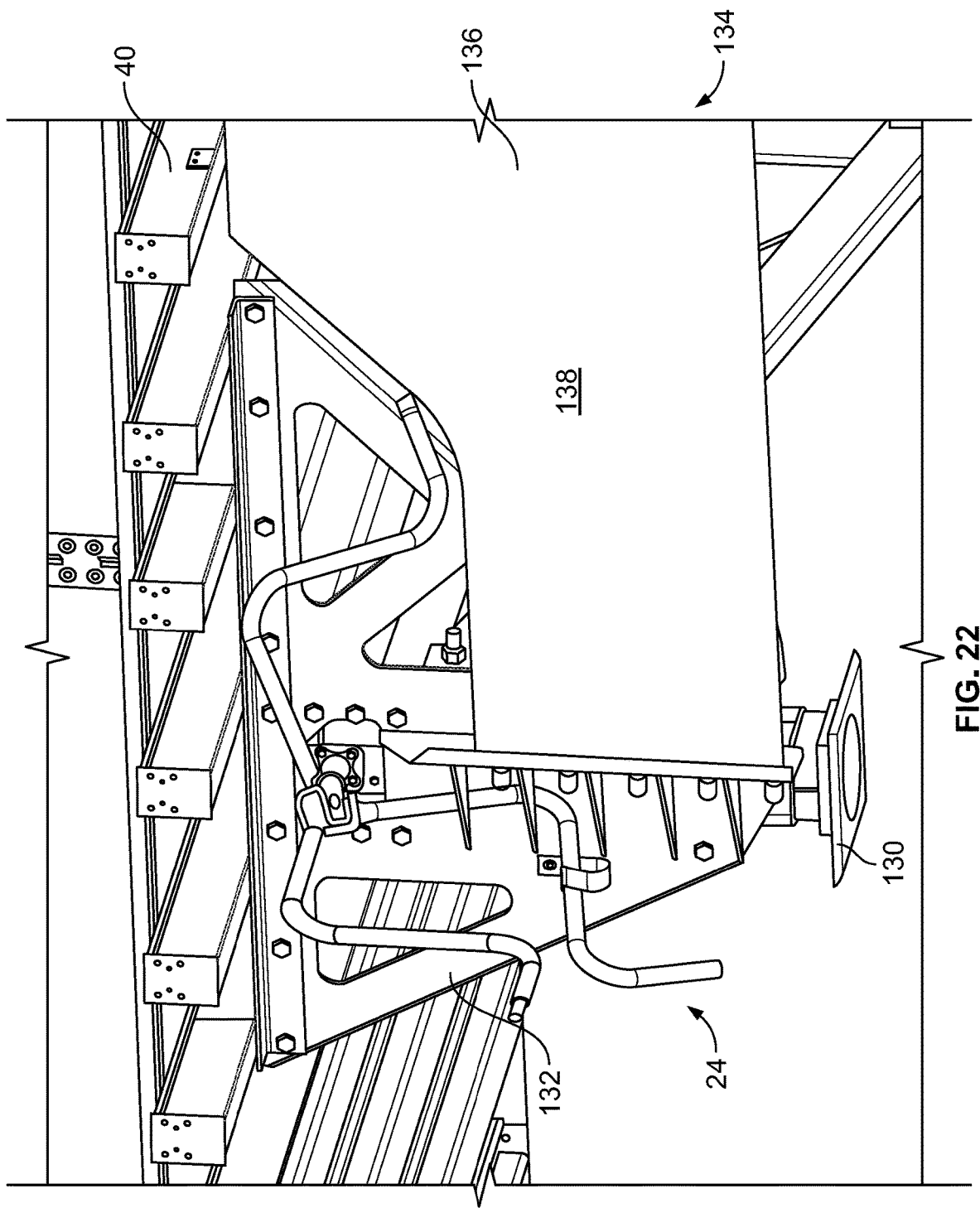
FIG. 22 is a perspective partial side view of the side underride system and the aerodynamic skirt system of FIG. 21.
Figure 23:
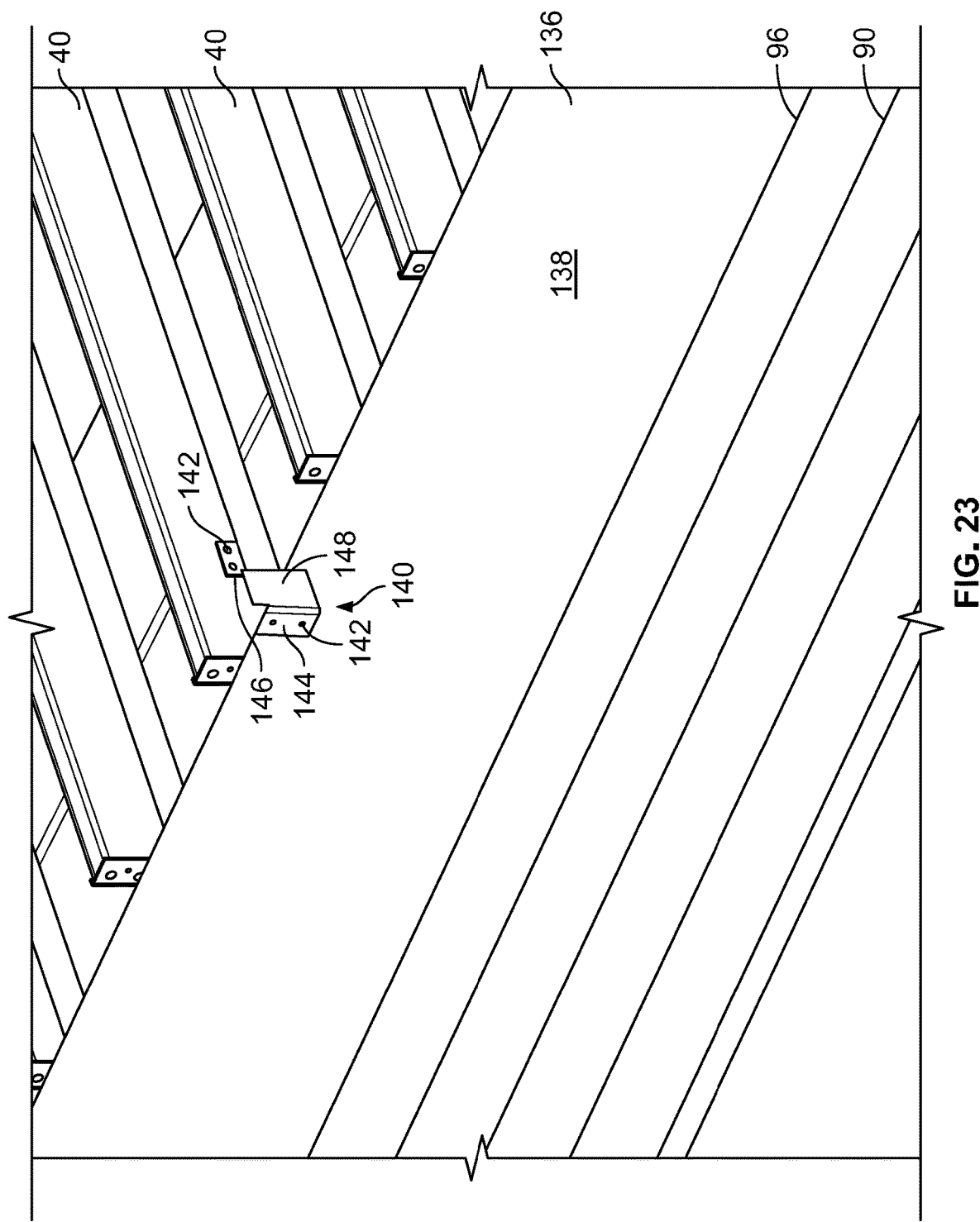
FIG. 23 is a perspective underside view of a side skirt wall of the aerodynamic skirt system of FIG. 21.

Illustratively, the side skirt wall 136 may be coupled to the floor assembly 26, the bracing assembly 120, and the landing gear 24. For example, as shown in FIGS. 19, 20, 22, the side skirt wall 136 may be coupled to the side braces 132 of the landing gear 24 and positioned laterally outward from the cable system 116. However it is with the scope of this disclosure to position the side skirt wall 136 laterally inward from the cable system 116. As shown in FIG. 23, the side skirt wall 146 may be coupled to the cross members 40 of the floor assembly 26 via mounting brackets 140 and fasteners 142, such as rivets, screws, etc.

Illustratively, each mounting bracket 140 may include a first coupling surface 144 and a second coupling surface 146 separated by an intermediate portion 148. The first coupling surface 144 may be configured to press against and be coupled to an inner surface of the side skirt wall 136 by the fasteners 142. The second coupling surface 146 may be oriented perpendicular relative to the first coupling surface 144 and configured to press against and be coupled to a vertical section of the cross member 40 by the fasteners 142. The intermediate portion 148 may be configured to attach the first coupling surface 144 and the second coupling surface 146. Furthermore, the intermediate portion 148 can at least partially press against a lower edge of the cross member 40 to provide additional stability to the mounting bracket 140. Other mounting brackets with different configurations and attachment mechanisms may also be used. Furthermore, it should be understood that, while the side skirt wall 136 is shown and described herein as being coupled to the side braces 132 and the cross members 40, it is within the scope of this disclosure to include a side skirt wall 136 coupled to any component of the floor assembly 26, the base rail 28, the bracing assembly 120, the landing gear 24, and/or the RIG 118.

Generally, the mounting brackets 140 may help support the weight of the side skirt wall 136. And the landing gear 24, the intermediate bracing assembly 120, and/or the RIG 118 may help maintain the side skirt wall 136 in a substantially vertical orientation (i.e., parallel to the trailer side wall 14) for effective aerodynamic function. Furthermore, optionally, the side skirt wall 136 may be coupled to the cables 90 at one or more locations between the landing gear 24, the intermediate bracing assembly 120, and/or the RIG 118 for additional support. While the described connections may hold the side skirt wall 136 substantially rigid, the side skirt wall 136 may be of a height that provides sufficient aerodynamic function while also providing sufficient clearance over obstacles or uneven roads. Also, it is contemplated within this disclosure that the side skirt wall 136 may be coupled in a manner to permit the side skirt wall 136 to tilt laterally inwardly and/or outwardly to potentially avoid damage when the trailer 115 traverses into or over obstacles. Accordingly, the above side underride system 114 may provide both side underride protection as well as aerodynamic functionality.

Looking now to FIGS. 24-31, in another illustrative embodiment, a further side underride system 152 is shown, which may provide dual functions of preventing automobile underride as well as improving the aerodynamic efficiency of the trailer 154 by reducing drag and wind flow under the trailer 154. Illustratively, the side underride system 152 extends below and generally parallel to the side walls 14 of a trailer 154 in order to prevent an automobile from riding under the trailer 152 in the event of a side impact collision.

Illustratively, the side underride system 152 may include a skirt assembly including a skirt system 12 in the form of a tarp assembly 156. The side underride system 152 may further include a cable system 158. As further described below, the tarp assembly 156 and the cable system 158 may extend at least partially along discrete or overlapping lengths of the trailer 154. For example, the tarp assembly 156 may extend a first length from the front area of the trailer 154 near the landing gear 24 toward the rear wheel assembly 22, while the cable system 158 may extend a second length from an area forward of the rear wheel assembly 22 to the rear of the trailer 154, for example, to a rear impact guard 118.

Illustratively, the tarp assembly 156 may include a tarp member 160 made of a flexible material and one or more belts 162a, 162b. The material may be tarpaulin material, or any other type of cloth, fabric, canvas, plastic, sheeting, or webbing material. The material may be reinforced to withstand tensile forces, for example, permitting the material 160 to stretch or flex under such forces. To further reinforce the tarp member 160, and add structure and support to the tarp assembly 156, one or more belts 162a, 162b may be stitched onto or into, or otherwise coupled to or positioned relative to the material 160. For example, one or more horizontal belts 162a may be coupled to the tarp member 160 and extend along a length of the material 160, while one or more vertical belts 162b may be coupled to the material 160 and extend along a height of the material 160, thus crossing over, under, or weaving between the horizontal belts 162a and creating a matrix of belts 162a, 162b across the tarp member 160.

In other embodiments, the skirt assembly, including specifically the material of the tarp member 160, may include a generally rigid material (i.e., having some flexibility), for example, DURAPLATE® composite panel provided by Wabash National Corporation of Lafayette, Ind. DURAPLATE® composite panels are constructed of a high-density polyethylene plastic core bonded between two high-strength steel skins. It should be understood that other suitable composite materials may alternatively or additionally be used. For example, the material of the tarp member 160 may be made of a sandwich composite including a honeycomb core and metal or plastic outer sheets, or the material of the tarp member 160 may be made of a flexible, rigid, or semi-rigid fiber-reinforced plastic composite. Further, the material of the tarp member 160 may be of any number of suitable, non-composite materials such as metals, metal alloys, and/or plastics, for example. This skirt or tarp material may be both rigid and flexible, or able to bend without deformation, such that it is semi-rigid. If the material of the tarp member 160 is a rigid or semi-rigid material, one or more horizontal and/or vertical belts 162a, 162b may be utilized or no belts may be utilized.

Figure 25:
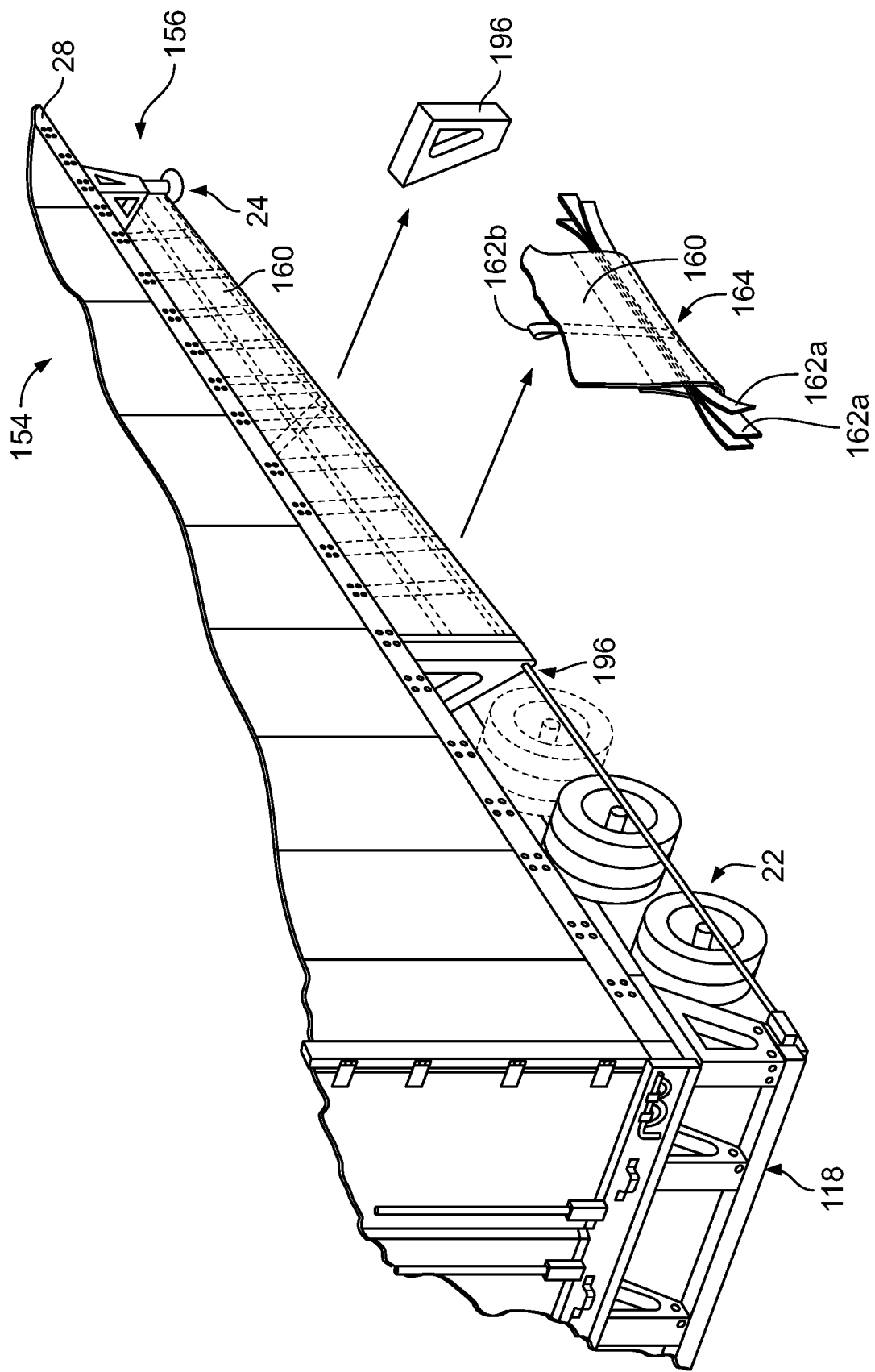
FIG. 25 is another perspective view of the trailer and the side underride system of FIG. 24.
Figure 29:
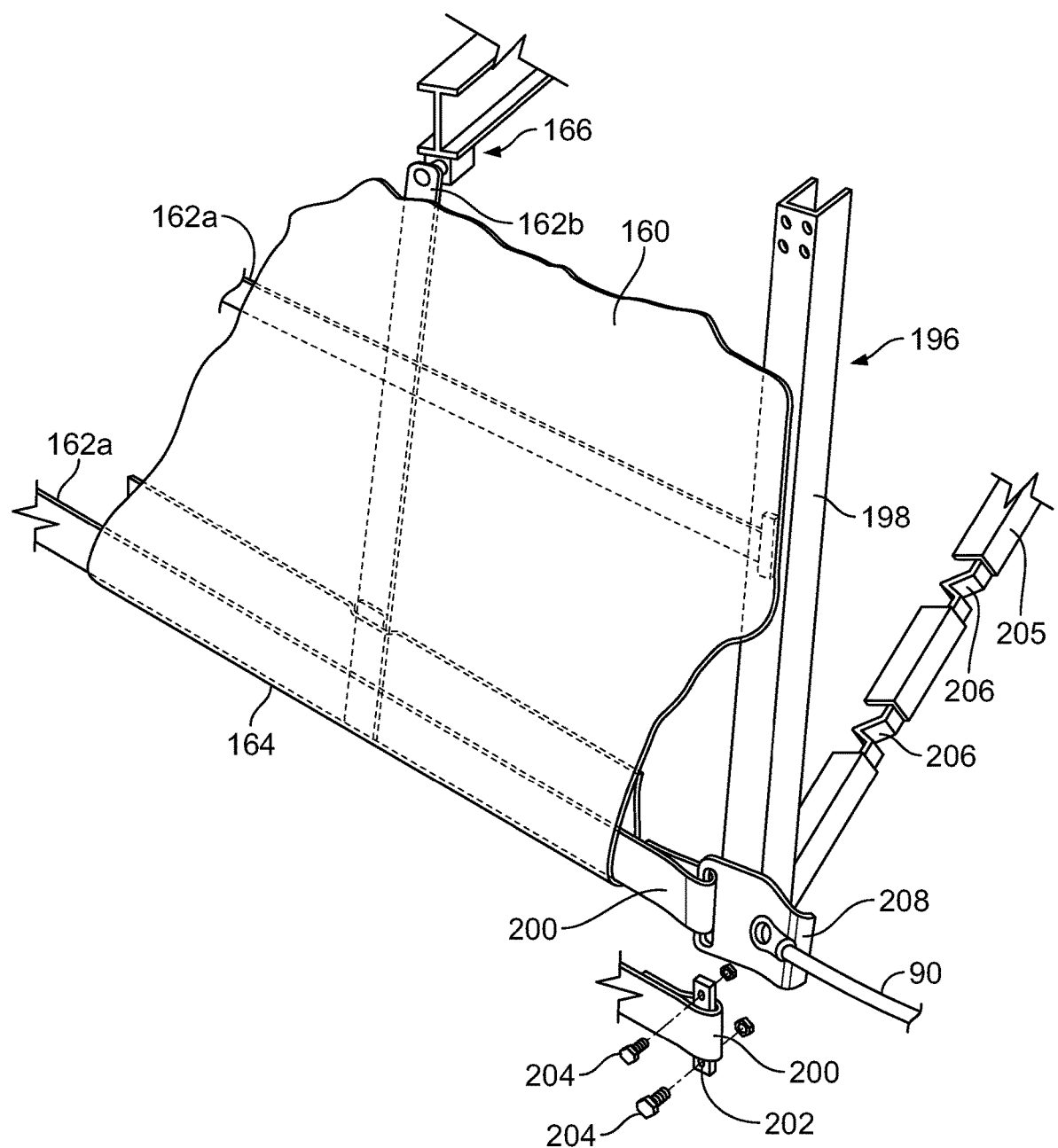
FIG. 29 is a partial perspective view of a tarp assembly of the side underride system of FIG. 24 coupled to the trailer via a mounting bracket.

In one example, as shown in FIG. 29, the tarp assembly 156 may include a first horizontal belt 162a and a second horizontal belt 162a. The first horizontal belt 162a may be stitched into or otherwise coupled to, the material of the tarp member 160 across a midsection of the tarp member 160 (e.g., between the base rail 28 and a lower edge of the tarp member 160). The second horizontal belt 162a may be stitched into, or otherwise coupled to, the tarp member 160 across the lower edge of the tarp member 160. Alternatively, the lower edge of the tarp member 160 may be folded up and stitched to itself to create a loop 164, as shown in FIG. 25, and the second horizontal belt 162a may be routed through the loop 164. As a result, the tarp member 160 and the second horizontal belt 162a may freely move forwardly and rearwardly relative to each other. The belts 162a may alternatively include cables or other suitable structures.

Additionally, the tarp assembly 156 may include a plurality of vertical belts 162b spaced apart across the length of the tarp member 160. The vertical belts 162b may be stitched into or otherwise coupled to the tarp member 160 and/or the horizontal belts 162a. For example, the vertical belts 162b may be stitched into or looped around the second horizontal belt(s) 162a. Additionally, the vertical belts 162b may be equally spaced apart or spaced apart at varying distances. In one example, the vertical belts 162b may align with one or more cross members 40 of the floor assembly 26. As a result, the tarp assembly 156 may be coupled to the cross members 40 via the vertical belts 162b, as further described below.

While the belts 162a, 162b are described as being coupled to the tarp member 160, it is within the scope of the present invention to have one or more tarp members 160 and belts 162a and/or 162b that work independently of one another. In other words, the belts 162a and/or 162b may not be coupled to the respective tarp member 160. The belts 162a, 162b may be of any size or material, as described below.

The belts 162a, 162b may include nylon, metal, plastic, fabric, rope, cables, webbing, and/or another suitable material. The belts 162 may stretch or flex under tensile forces, for example with 20,000 lb. to 30,000 lb. breaking capacity. In one specific example, each belt 162 may be a four-inch nylon belt. Also, in some embodiments, the second horizontal belt 162a may incorporate a plurality of belts 162a, as shown in FIG. 25, which may provide additional strength and support to the tarp assembly 156. One or more of the other horizontal belts 162a or the vertical belts 162b may also incorporate multiple belts along the same length or height, respectively.

In use, each of the tarp assembly 156 (i.e., the belts 162 and the tarp member 160) and the cable system 158 is taut and operates as a protective system to reduce the risk of automobiles intruding under the floor assembly 26 of the trailer 154 during a side impact accident. Further, the belts 162a, 162b, the tarp member 160 may retain some flexibility and thus may operate to absorb some of the force and energy of any impact thereto to potentially decrease any forces on the passengers within the automobile during impact. Accordingly, the belts 162a, 162b and the tarp member 160 perform a similar function as the cables of the side underride systems described herein. Further, while the tarp assembly 156 is illustrated and described herein as not including cables, it is within the scope of this disclosure to include a tarp assembly 156 with cables in conjunction with or as an alternative to the belts 162a, 162b. For example, the tarp member 160 may include vertically-spaced pockets sewn into it through which cables may be threaded (e.g., in place of or in addition to the vertical belts 162b). Additionally, the tarp assembly 156 (e.g., the tarp member 160) may have aerodynamic properties, thus performing a similar function as the side skirt systems described herein. As such, the system 152 may be an OEM design (that is, not for use as a retrofit with an existing skirt system) or, alternatively, may be used as a retrofit with existing skirt or side underride guard systems. In the case where a current trailer includes a side underride guard or skirt system, one or both of the tarp assembly 156 and the cable system 158 could be coupled thereto. If only a cable system 158 is to be retrofit to an existing side underride guard and/or a skirt, the cable system 158 may be coupled to one or more portions of the side underride guard and/or skirt and/or one or more mounting brackets (as detailed below with regard to at least FIG. 25).

Illustratively, the tarp assembly 156 may be coupled to the trailer 154 to generally extend between the landing gear 24 and the rear wheel assembly 22. As some trailers 154 include sliding suspensions, thereby allowing the rear wheel assembly 22 to be moved between a rearward position and a forward position, the tarp assembly 156 may extend from the landing gear 24 to the forward-most position of the rear wheel assembly 22. In one specific application, this length may be about 27 feet. However, the tarp assembly 156 may extend along a greater or a lesser length of the trailer 154 than what is illustratively shown in the figures. In other words, the tarp assemblies disclosed herein may be modified to extend along the entire, or substantially the entire, length of the trailer 154 or may be modified to extend along only a small portion of the length of the trailer 154.

The tarp assembly 156 may be coupled to the trailer 154 along one or more cross members 40, the landing gear 24, one or more bracing assemblies, and/or the base rail 28. For example, the tarp assembly 156 may be coupled to one or more cross members 40 with clip assemblies 166, as shown in FIGS. 26-28, or other mounting brackets. More specifically, as further described below, the clip assemblies 166 may couple vertical belts 162b to the cross members 40. Accordingly, the clip assemblies 166 (and the vertical belts 162b) may be positioned to correspond to each cross member 40 along a length of the tarp assembly 156, at every other cross member 40, or at even or uneven intervals of cross members 40.

As shown in FIGS. 27-28, each clip assembly 166 may include an L-shaped bracket 168 with an aperture 170, a bolt 172, a nut 174, and a clip 176. The clip 176 may include a base wall 178, a first side wall 180 with an aperture 182, a second side wall 184, and a front wall 186 with an opening 188 configured to receive a vertical belt 162b. As shown in FIG. 28, the first side wall 180 and the front wall 186 may each bend or fold downwardly along the illustrative dotted lines so as to be perpendicular with the base wall 178. The second side wall 184 may bend upwardly and inwardly so as to be parallel with the base wall 178 and form a hook shape.

Illustratively, the second side wall 184 is configured to engage an outer edge of a bottom flange of a cross member 40 so that the outer edge is sandwiched between an upper surface of the base wall 178 and a lower surface of the second side wall 184. Once the second side wall 184 is engaged with the bottom flange, the L-shaped bracket 168 may be positioned over an opposite outer edge of the bottom flange so that the apertures 170, 182 align and the opposite outer edge is sandwiched between the upper surface of the base wall 178 and a lower planar surface of the L-shaped bracket 168. Once the L-shaped bracket 168 is positioned, the bolt 172 may be routed through the apertures 170, 182 and the nut 174 may be tightened around the bolt to secure the L-shaped bracket 168 to the clip 176.

Each clip assembly 166 may be coupled to a respective cross member 40 at equal or varying lateral distances from the side wall 14. More specifically, each clip assembly 166 may be coupled to a respective cross member 40 at a distance "X" inward from the side wall 40, as shown in FIG. 26. The distance X may be between, for example, about 0 inches and about 10 inches from the side wall 40. However, it is within the scope of this disclosure to include other suitable distances. Furthermore, the distance X may be longer on cross members 40 located near the front of the trailer 154 compared to cross members 40 positioned near the rear of the trailer 154. As a result, the tarp assembly 156 may be substantially curved or angled from the front of the trailer 154 to the rear of the trailer 154 (similar to the angled profile of the side skirt walls 30 shown in FIG. 6) to enhance aerodynamic properties of the tarp assembly 156. Alternatively, the distance X may be zero inches at each cross member 40 so that the tarp assembly 156 is parallel to and generally co-planar with the side walls 14 of the trailer 156.

As described above, each clip assembly 166 may couple a vertical belt 162 to a respective cross member 40. For example, as shown in FIG. 26, a top of each vertical belt 162b may be folded over, then stitched or otherwise coupled to itself to form a loop 190. The loop 190 may be routed through the opening 188, a bolt 192 may be routed through the loop 190, and a nut 194 may be secured to the bolt 192. The weight of the tarp assembly 156 urges the vertical belt 162b back through the opening 188; however, the bolt 192 and the nut 194 may prevent the loop 190 from sliding through the opening 188, thus securing the vertical belt 162b to the clip assembly 166. Accordingly, the vertical belt 162b may be disconnected from the clip assembly 166 by unfastening the nut 194 from the bolt 192 and removing the bolt 192 from the loop 190, thereby allowing the loop 190 to slide through the opening 188. It should be understood that vertical belt 162b may be otherwise removably or permanently coupled to the clip assembly 166 without varying from the scope of this disclosure.

The clip assemblies 166 allow the vertical belt 162b (or optionally a cable or other connecting member) where the belt 162b is connected to the cross member 40 to be slid on the cross member 40 to keep the tarp assembly 156 from rotating and/or folding up upon impact. The bracket assemblies 166 may allow the tarp assembly 156 to slide inwardly when hit.

While the vertical belts 162b may be coupled to the clip assemblies 166, one or more of the horizontal belts 162a and/or the tarp member 160 may be coupled to and/or rest upon the one or more bracket or bracing assemblies, the landing gear 24 and/or the RIG 118. Generally, such couplings may help support the tarp assembly 156 in a substantially vertical orientation and prevent the tarp assembly 156 from swaying too far laterally inward or outward relative to the side wall 14.

Figure 24:
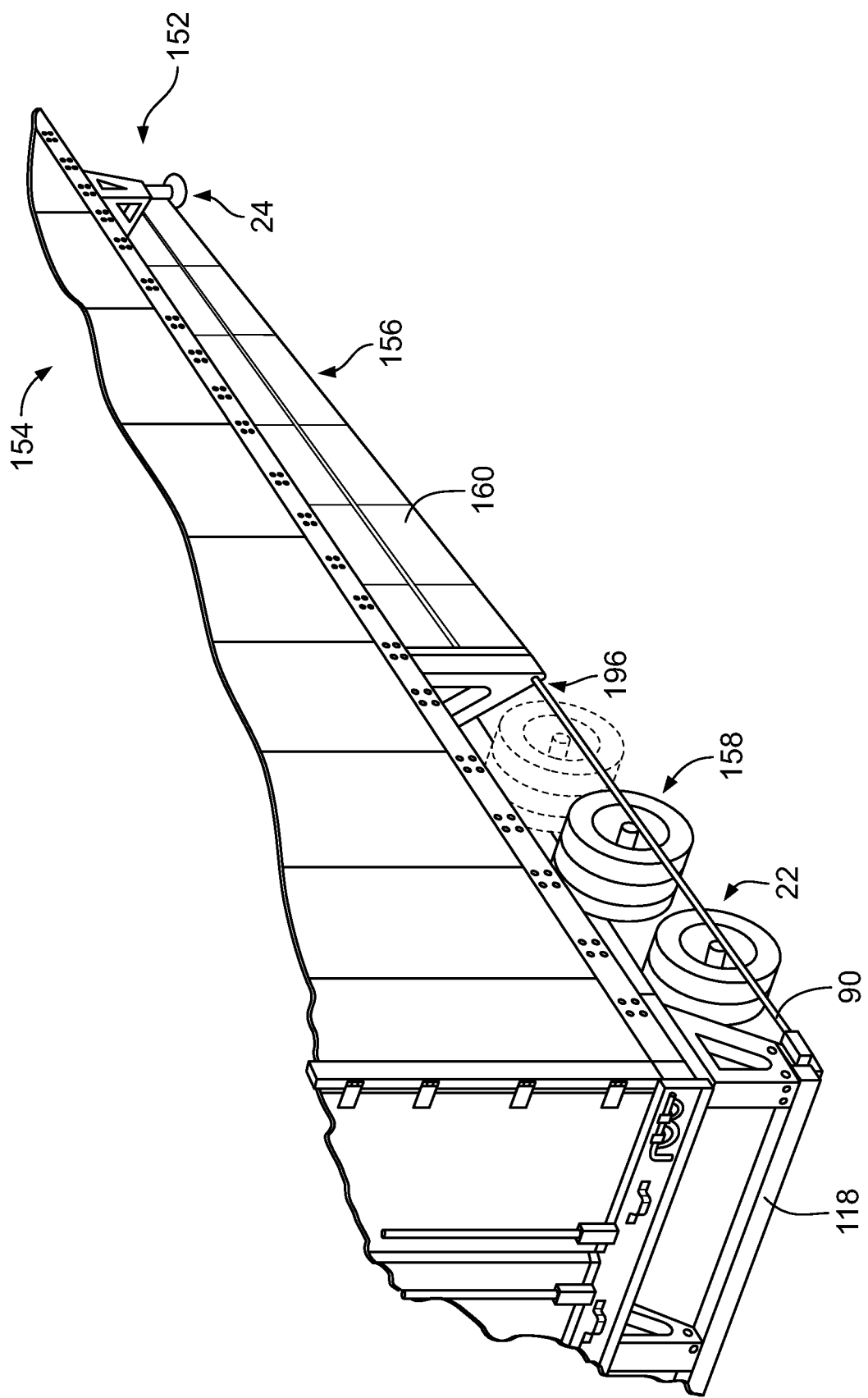
FIG. 24 is a perspective side view of a trailer and a side underride system coupled to the trailer between rear and front supports of the trailer.

The side underride system 152 may incorporate any of the mounting bracket assemblies or bracing assemblies described above. Alternatively, as shown in FIGS. 24 and 25, the side underride system 152 may include a mounting bracket 196 coupled to the base rail 28 or the floor assembly 26 of the trailer 154, and the tarp assembly 156 may extend between the landing gear 24 (or another front bracing or bracket assembly) and the mounting bracket 196. As shown in FIG. 25, the mounting bracket 196 may be coupled to the trailer 154 and include a triangular flange structure with a vertical post 198 (as shown in FIG. 29) configured to be coupled to the tarp assembly 156. Furthermore, as shown in FIG. 29 the mounting bracket 196 may include a cross-brace 205 with spring portions 206. The spring portions 206 may help the mounting bracket 196 compress and absorb forces from a vehicle side impact and reduce the extent to which such a vehicle can intrude under the side of the trailer 154.

As shown in FIGS. 24 and 25, the mounting bracket 196 may be coupled to the trailer 154 and positioned near the rear wheel assembly 22 (that is, forward of the rear wheel assembly 22). It should be understood, however, that the mounting bracket 196, as well as any other bracing or mounting bracket assemblies disclosed herein, may alternatively be coupled to the trailer 154 at other locations along the length of the trailer 154. Furthermore, as shown in FIG. 25, the side underride system 152 may include one or more additional mounting brackets 196 (or intermediate bracing assemblies 120) positioned between the landing gear and the rear-most mounting bracket 196.

FIG. 29 illustrates an example coupling between the tarp assembly 156 and the mounting bracket 196. Illustratively, side edges of the horizontal belts 162a may be folded over and stitched or otherwise coupled to themselves to form loops 200. A bracket 202 may be routed through each loop 200 and fasteners 204 may couple either end of the bracket 202 to the vertical post 198, thus preventing the bracket 202 from sliding out of the loop 200 and securing the horizontal belt 162a to the mounting bracket 196.

The horizontal belts 162a may be secured to the additional mounting bracket(s) 196, the landing gear 24, and/or the RIG 118 in a similar manner as described above. It should be also understood that horizontal belts 162a or the tarp member 160 may be otherwise removably or permanently coupled to components of the mounting bracket 196, or any other mounting bracket or bracing assembly, the RIG 118, or the landing gear 24, in any other manner without varying from the scope of this disclosure. In addition or alternatively to the above-described couplings, the tarp assembly 156 may be coupled directly to the side walls 14 of the trailer 154. In particular, the tarp assembly 156 may be coupled to the base rail 28.

As described above, the tarp assembly 156 may be coupled to the trailer 154 to extend vertically downwardly from the side walls 14. The tarp assembly 156 may extend a height longer than, equal to, or shorter than the height of the above-described wall panels 32 of the skirt assembly 12. For example, the height may be shorter than wall panels 32, thus allowing the tarp assembly 156 to clear obstacles. As such, lateral movement capabilities (i.e., to traverse such obstacles) may be unnecessary and the tarp assembly 156 may be substantially rigidly coupled to the trailer 154. However, it is within the scope of this disclosure for the tarp assembly 156 to have lateral tilting capabilities, like that described above with respect to the wall panels 32 of the skirt assembly 12. Furthermore, the tarp assembly 156 may include a flap (not shown), similar in structure and function to the flap 36 described above with respect to FIGS. 4-5. The flap may be coupled to a lower edge of the tarp assembly 156 and may provide additional aerodynamic properties to the system 154, while being flexible enough to bend or flex over obstacles.

Figure 14:
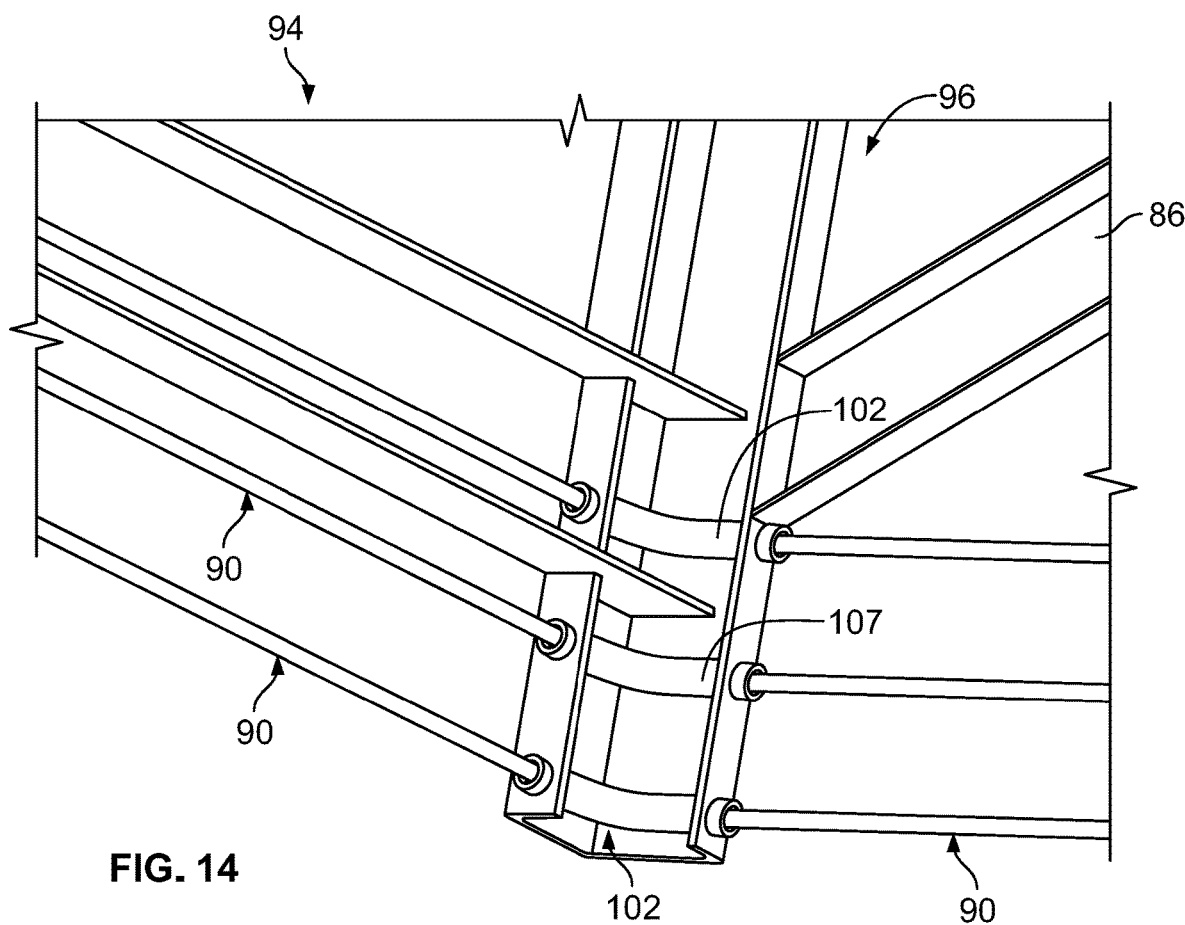
FIG. 14 is a perspective view of a corner portion of the mounting bracket assembly of FIG. 11 showing the corner cable guide.

Accordingly, the tarp assembly 156 may provide aerodynamic functionality (i.e., by way of the tarp member 160) as well as side underride protection (i.e., by way of the belts 162 and the mounting brackets 196). Furthermore, the cable system 158 may provide additional side underride protection and/or deflection functionality, for example, from the rear wheel assembly 22 to the rear of the trailer 154. The cable system 158 may include a single cable 90, as shown in FIGS. 14, 25, and 29. Alternatively, the cable system 158 may include more than one cable 90, such as two, three, four, five, or more cables 90.

Illustratively, the cable system 158 may extend a length that spans from a rear end of the tarp assembly 156 to the rear of the trailer 154. In one specific application, this length may be about 17 feet. However, the cable system 158 modified to extend along a greater or a lesser length of the trailer 154 than what is illustratively shown in the figures. In other words, the cable system 158 may be modified to extend along the entire, or substantially the entire, length of the trailer 154 (like that described above with respect to the side underride system 72) or may be modified to extend along only a small portion of the length of the side of the trailer 154.

For example, as shown in FIGS. 24 and 25, the cable system 158 may extend from the mounting bracket 196 to the RIG 118. Alternatively, additional mounting bracket or bracing assemblies may be incorporated to support the cable system 158. For example, in retrofit systems without RIGs, a rear mounting bracket assembly may be coupled to the trailer 154 to receive the cable system 158. The cable(s) 90 may be coupled to the mounting bracket 196 and/or the RIG 118 as described above with respect to the cable systems 80, 116. Alternatively, as shown in FIG. 29, the cable 90 may be coupled to the mounting bracket 196 via a bracket 208. More specifically, the bracket 208 may be coupled to the vertical post 198 and may also be coupled to or integral with the bracket 202 that supports the tarp assembly 156. The cable 90 may be coupled to the bracket 208 in any suitable manner, such as by clamping, welding, or with suitable fasteners.

Figure 30:
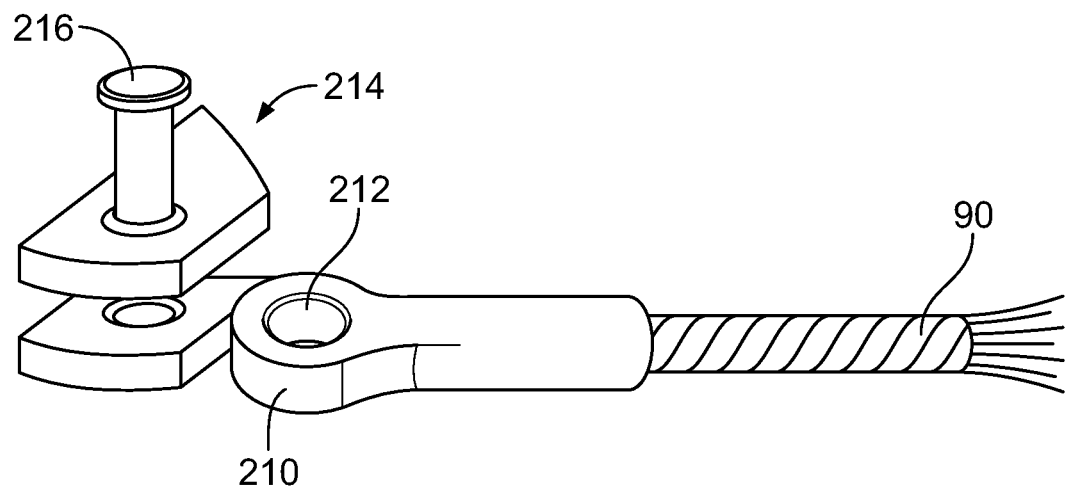
FIG. 30 is a perspective view of a drop-pin structure for use with the side underride system of FIG. 24.
Figure 31:
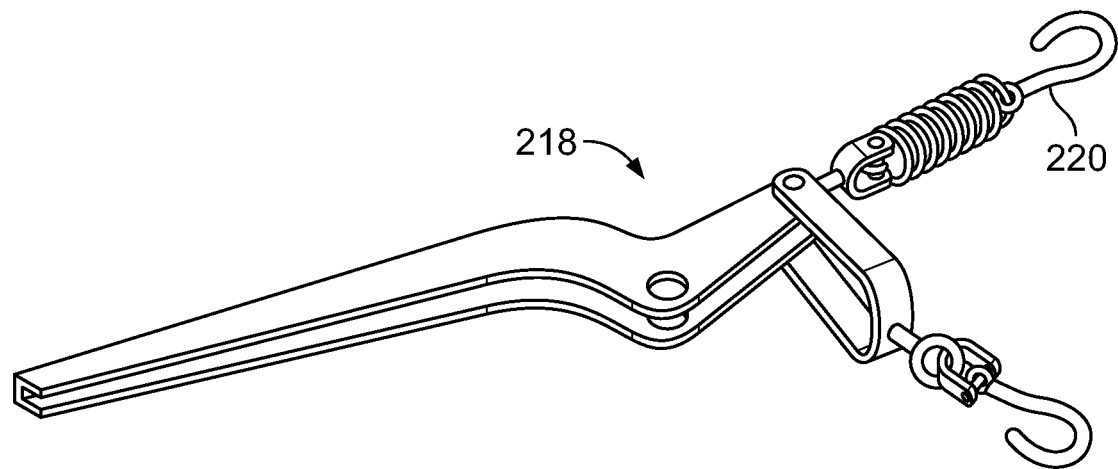
FIG. 31 is a perspective view of a load binder for use with the side underride system of FIG. 24.

Furthermore, the cable 90 may be coupled to the RIG 118 in a removable manner, for example to allow access to the rear wheel assembly 22 (e.g., to inspect the rear wheel assembly 22, and related bogie or suspension assembly, or to service a tire of the rear wheel assembly 22). For example, as shown in FIG. 30, a cable terminal 210 may be used to receive the end of the cables 90 therein and may include an aperture 212. A drop-pin structure 214 may be coupled to the RIG 118 and the cable terminal 210 may be releasably coupled to the drop-pin structure 214 (i.e., by inserting or releasing a pin 216 of the drop-pin structure 214 through the aperture 212). Alternatively, as shown in FIG. 31, a load binder 218 may be coupled to the RIG 118 and the cable terminal 210 may be releasably coupled to the load binder 218 (i.e., by inserting or releasing a hook 220 of the load binder 218 through the aperture 212).

Illustratively, the single cable 90 of the cable system 158 may be removably or non-removably coupled to the lower ends of the mounting bracket 196 and the RIG 118. However, it should be understood that the cable(s) 90 may be positioned at any height along the mounting bracket 196 and the RIG 118. For example, generally, the cable(s) 90 may be positioned at any height so as to be positioned laterally outwardly from the tires of the rear wheel assembly 22. Furthermore, the mounting bracket 196 may force the cable 90 outward to prevent the cable 90 from contacting the tires of the rear wheel assembly 22 during trailer operation. In particular, the mounting bracket 196 may help prevent the side underride system from swaying laterally inwardly (or outwardly) and contacting the rear wheel assembly 22. In one example, the mounting bracket 196 may force the cable 90 about two to three inches outward from the rear wheel assembly 22, though other lateral distances may be contemplated.

Referring again to FIGS. 24 and 25, in an illustrative embodiment, the tarp assembly 156 includes two opposing tarp members 160 made of a flexible material and first and second cables 162 are routed along lower edges of the tarp members 160. First ends of the first and second cables 162 (on first and second sides of the trailer) are coupled to a front portion of the trailer, for example, near the landing gear and second ends of the cables 162 (on first and second sides of the trailer) are coupled to the trailer forward of the rear wheel assembly 22, for example, to rigid mounting brackets or posts 196. The cable system 158 includes third and fourth cables 90 (on first and second sides of the trailer) with first ends coupled to the trailer forward of a forward-most position of the rear wheel assembly 22, for example, to rigid mounting brackets or posts, and second ends coupled to a rear end of the trailer, for example, to the rear impact guard or in any manner described herein or any other suitable fashion. In embodiments including mounting brackets 196, the first ends of the first and second cables 90 may be coupled to the mounting brackets 196. In other embodiments, the cables 90 may be coupled to any other suitable structure. The first and second cables 162 are separate and distinct from the third and fourth cables 90 such that the third and fourth cables 90 can be easily removed and replaced, for example, to access the rear wheel assembly 22.

In other illustrative embodiments, the tarp assembly 156 and the cable system 158 may only extend along one side of the trailer.

In another illustrative embodiment, similar to the one detailed immediately above and again referencing FIGS. 24 and 25, the tarp assembly 156 includes two opposing tarp members 160 made of a rigid material, such as DURA-PLATE®. The tarp assembly 156 may further, but need not, include first and second cables 162 routed along lower edges (or along any other suitable location) of the rigid material 180. First ends of the first and second cables 162 (on first and second sides of the trailer) are coupled to a front portion of the trailer, for example, near the landing gear and second ends of the cables 162 (on first and second sides of the trailer) are coupled to the trailer forward of the rear wheel assembly 22, for example, to a rear end of the tarp material or to rigid mounting brackets or posts 196. The cable system 158 includes third and fourth cables 90 (on first and second sides of the trailer) with first ends coupled to the trailer forward of a forward-most position of the rear wheel assembly 22 and second ends coupled to a rear end of the trailer, for example, to the rear impact guard or in any manner described herein or any other suitable fashion. In embodiments including mounting brackets 196, the first ends of the first and second cables 90 may be coupled to the mounting brackets 196. In other illustrative embodiments, the tarp assembly 156 and the cable system 158 may only extend along one side of the trailer.

As referenced above, the removable cables 90 allow for the cables 90 alone to be retrofit onto a trailer having a previously-installed skirt system and/or side underride guard (for example, those show in any of FIGS. 5-8 and 33-38 or any other side underride guard). In this manner, the skirt system 158 may provide side underride protection adjacent the rear wheel assembly for a trailer not previously protected in this area. The cables 90 may be attached to existing structures (e.g., the skirt system, side underride guard, rear impact guard, or any other suitable structure) or a structure, such as post or the mounting brackets 196 of FIG. 24, may be coupled to the trailer for coupling of the cables 90 thereto.

The cable system 158 may provide deflection functionality to deter impact with the rear wheel assembly 22 when a vehicle drifts toward the trailer 154 (i.e., during passenger compartment intrusion). More specifically, the cable system 158 may serve as an alert to the vehicle driver as the vehicle may contact the cable 90 before reaching the rear wheel assembly 22. Furthermore, the cable system 158 may include a plurality of cables 90 to provide additional side underride protection near the rear wheel assembly 22 and all the way to the rear of the trailer 154.

As described above, a trailer may be provided with a side skirt system including any number of mounting bracket assemblies. Further, a trailer may be provided with a side underride system including a variety of different tarp assemblies and cable systems having any number of cables and mounting bracket assemblies in addition to, or independent of, the side skirt systems. Any flexible members of the side underride systems described herein may also allow directional change of the continuous length of the side underride system so that the side underride system may angle, curve, or be positioned inwardly at the front end of the trailer, for example.

Illustratively, any of the above-described concepts may be used together to provide a trailer having both a side skirt system extending along the length of each side of the trailer and a side underride system also extending along the length of each side of the trailer. For example, any of the skirt systems, skirt assemblies, skirt panels, etc. disclosed herein may be combined with any of the cable systems, support systems, bracket systems, or any other features described herein. Illustratively, when a side skirt assembly and a side underride system are used together, the side underride system may be positioned laterally outwardly from the side skirt assembly in order to allow the side skirt assembly to tilt laterally inwardly a suitable amount. However, it is also within the scope of this disclosure to position the side skirt assembly laterally outwardly from the side underride system when mounting both to the same trailer. Illustratively, the cable system of the side underride system and the side wall of the side skirt assembly may be spaced any suitable distance apart from each other as each are mounted to the floor assembly portion of the trailer.

It should also be understood the side skirt and cable underride systems disclosed herein may be coupled directly to each other. For example, the side skirt of any one of the side skirt systems disclosed herein may be directly coupled to any one of the cable systems of the underride systems disclosed herein. Further, any one of the underride systems may be retrofit with existing skirt systems, may be added with new skirt systems, or may completely replace existing skirt systems. As such, any of the above-described underride system embodiments may be an OEM side underride system design (that is, not for use as a retrofit with an existing skirt system) or, alternatively, may be used as a retrofit with existing skirt systems. The above-described systems may provide underride protection to reduce the risk of passenger vehicle underride in the event of a side impact collision with a vehicle, as well as reduce the risk of pedestrians, bicyclists, motorcyclists, or objects from falling or sliding under the trailer, for example, between the landing gear and the rear wheel assembly or between the landing gear and the rear impact guard.

Figure 32:
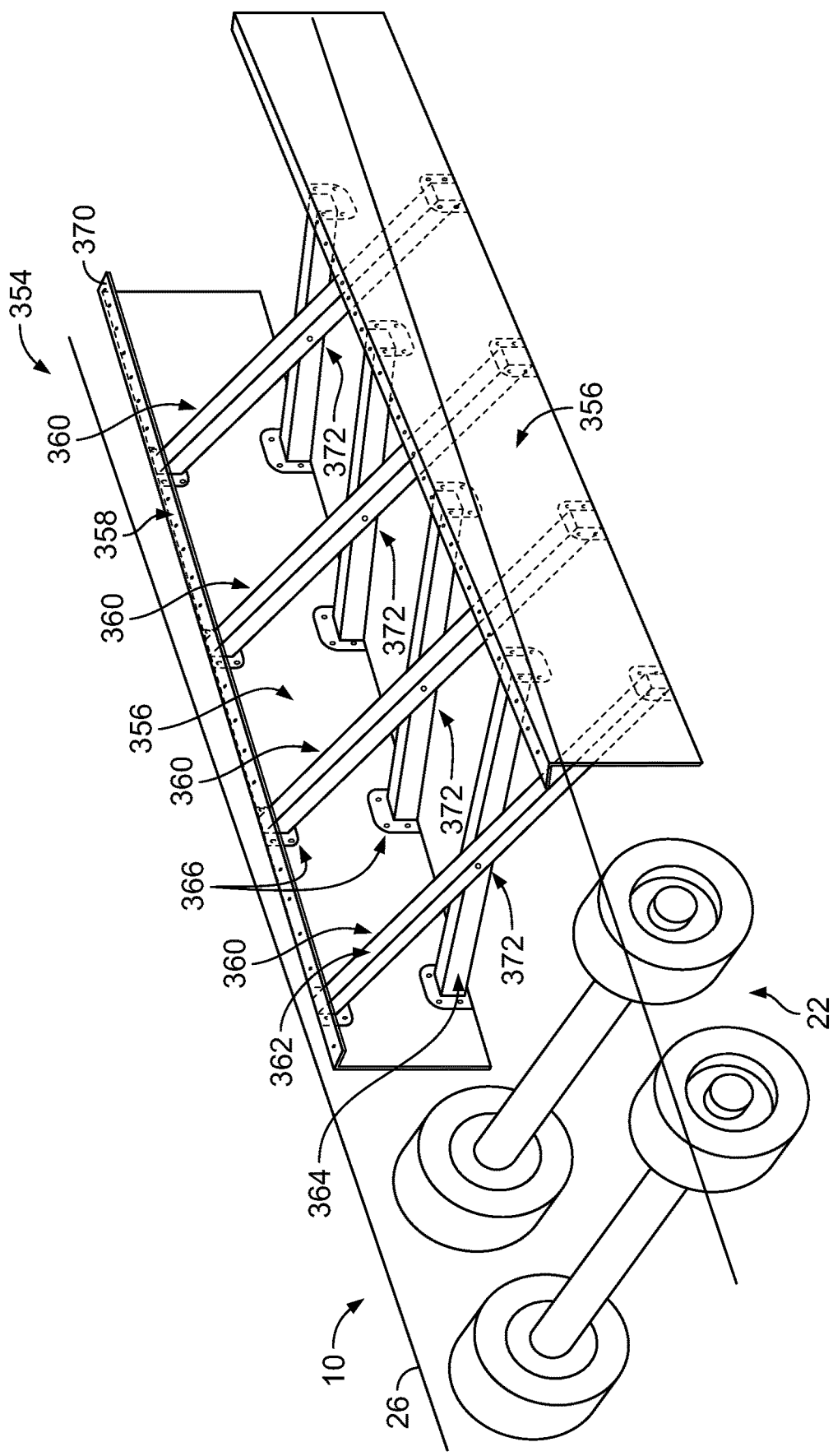
FIG. 32 is a perspective partial view of a further side underride system including an aerodynamic side skirt system and a support system between portions of the side skirt system.

Referring now to FIG. 32, according to one illustrative embodiment, a side underride system 354 may include first and second opposing side skirt walls 356, a hinge assembly 358, and one or more cross-braces 360 including a first diagonal truss beam 362 and a second diagonal truss beam 364. The first and second skirt walls 356 may be coupled to a floor assembly 26 of a trailer 10 via the hinge assembly 358, any other coupling method described herein, or any other suitable coupling method, and/or the cross-braces 360 may be coupled to the skirt walls 356 via connectors 366 to form a support system. Additionally or alternatively, the cross-braces 360 may be coupled to the floor assembly 26. Still further, the cross-braces 360 may be coupled to a mounting bracket 140.

Illustratively, the skirt walls 356 may be coupled to the trailer 10 along a length of the trailer 10 and may include similar structure and function as the skirt walls 30 described above. For example, the first skirt wall 356 may be configured to be positioned below the trailer 10 near the first side wall 14 and the second skirt wall 356 may be configured to be positioned below the trailer 10 near the second side wall 14. Further, the skirt walls 356 may be coupled to the trailer 10 between the landing gear 24 and the rear wheel assembly 22. In one specific application, this length may be about 16 feet; however shorter or longer lengths may be contemplated within the scope of this disclosure. Also, the skirt walls 356 may each include a single, substantially rigid flat or curved wall panel, or multiple wall panels coupled together. Alternatively, the skirt walls 356 may be made of a sandwich composite including a honeycomb core and metal or plastic outer sheets, or may be made of a fiber-reinforced plastic composite. Further, the skirt walls 356 may be of any number of suitable, non-composite materials such as metals, metal alloys, and/or plastics, for example.

The skirt walls 356 may be coupled to the trailer 10 via the hinge assembly 358. Illustratively, the hinge assembly 358 may traverse an entire length of each skirt wall 356 or one or more discrete portions thereof. Generally, the hinge assembly 358 may include a first plate (not shown) coupled to a second plate 370 by a hinge (not shown). The first plate may be coupled to an inner or outer surface of a respective wall skirt 356 and the second plate 370 may be coupled to the floor assembly 26 of the trailer 10, such as to one or more cross members 40 (see FIG. 4) or the base rail 28 (see FIG. 1), with one or more suitable fasteners. The hinge may be moveable so that the first plate and the second plate 370 may be moved relative to one another about the hinge. Alternatively, the hinge may be fixed so that first plate is oriented about 90 degrees—or at any other suitable angle—relative to the second plate 370. In another alternative embodiment, the hinge may permit laterally inward movement (that is, from a position parallel to the side walls 14 laterally inward toward the floor assembly 26), yet prevent laterally outward movement past about 90 degrees (i.e., past a position substantially parallel to the side walls 14). In embodiments where the skirt walls 356 cannot move laterally, the skirt walls 356 may be shorter than the skirt walls 30 described above. Further, the skirt walls 356 may include a longer flexible flap (similar to the above-described flap 36) coupled to lower edges thereof. The flap may operate to resist airflow and may prevent damage to the skirt walls 356 from forces applied vertically such as in situations where the trailer 10 may traverse over a curb or railroad track where the road surface is not flat.

Furthermore, it is within the scope of this disclosure to include other suitable longitudinal straps, bars, or connectors configured to couple the skirt walls 356 to the cross members 40 and/or the base rail 28. It is also contemplated within this disclosure that the base rail 28 may be modified to provide a direct coupling surface for the skirt walls 356. For example, the base rail 28 may extend further downward past the cross members 40 to provide a suitable surface to which the skirt walls 56 may be coupled.

Accordingly, in some embodiments, a single hinge assembly 358 may couple the side underride system 354 to the trailer 10, as opposed to the multiple mounting brackets described above. Furthermore, the hinge assembly 358 may act as a fuse-type assembly such that the hinge assembly 358 or the coupling between the hinge assembly 358 and the trailer 10 may fail before any components of the trailer 10 fail in the event of a side impact collision. As such, when such a collision occurs, the side underride system 354 may be easily uninstalled from the trailer 10 (i.e., by disconnecting the hinge assembly 358 from the trailer 10) so that the trailer 10 may still be drivable.

Referring again to FIG. 32, the cross-braces 360 may act as a support system to provide side underride protection. Illustratively, the cross-braces 360 may be coupled to the skirt walls 356 across a width of the trailer 10. In one specific application where each skirt wall 356 is coupled directly below and parallel to a respective side wall 14, this width may be about 8 feet. However, the cross-braces 360 may be coupled to the skirt walls 356 over various widths, for example, when the skirt walls 356 form an angled or curved profile from the front of the trailer 10 to the rear of the trailer 10. To ensure impact protection across the length of the system 354, as further described below, the cross-braces 360 may be spaced apart along the length of the trailer 10. For example, the cross-braces 360 may be spaced apart at specific intervals to ensure that a passenger vehicle colliding with a skirt wall 356 may engage at least one of the cross-braces 360 upon impact. In one specific example, the system 354 may include four cross-braces 360 spaced apart at five-foot intervals.

As mentioned above, each cross-brace 360 may be coupled to the skirt walls 356 via one or more connectors 366. The connectors 366 may be welded or otherwise coupled (such as with suitable fasteners) to the truss beams 362, 364 and/or the skirt walls 356. For example, the connectors 366 may be U-shaped connectors to which the truss beams 362, 364 are slid downward into. Alternatively, the connectors 366 may be T-shaped or L-shaped or include any other suitable shape to receive or be coupled to the truss beams 362, 364.

The truss beams 362, 364 may be coupled to the skirt walls 356 via the connectors 366, then only the skirt walls 356 may be coupled to the trailer 10 via the hinge assembly 358. According to another example, the truss beams 362, 364 may be coupled to both the skirt walls 356 and the floor assembly 26. For example, the truss beams 362, 364 may be first coupled to the floor assembly 26, such as to the cross members 40 and/or the base rail 28, and then the skirt walls 356 may be coupled to the truss beams 362, 364 and/or the floor assembly 26. Accordingly, the system 354 may be coupled to the trailer 10 from beside the trailer 10 or from underneath the trailer 10.

Furthermore, the truss beams 362, 364 may be coupled between the skirt walls 356 in substantially diagonal orientations and, more specifically, in opposing diagonal orientations so that the truss beams 362, 364 cross each other at a location between the skirt walls 56. For example, as shown in FIG. 32, the first truss beam 362 may be coupled to the first skirt wall 356 near an upper edge of the first skirt wall 356 and to the second skirt wall 356 near a lower edge of the second skirt wall 356. The second truss beam 364 may be coupled to the first skirt wall 356 near a lower edge thereof and to the second skirt wall 356 near an upper edge thereof. As a result, the truss beams 362, 364 may cross each other at an intersection point 372. In some embodiments, the truss beams 362, 364 may be loaded in compression, then pinned, bolted, bonded, welded, hinged, or otherwise coupled together at the intersection point 372 to provide further structural integrity to the support system. Illustratively, the relatively shallow angle between the crossing truss beams 362, 364 at the intersection point 372, as well as the compression loading, may help the cross-brace 360 withstand additional forces before buckling from a side impact collision.

Figure 33:
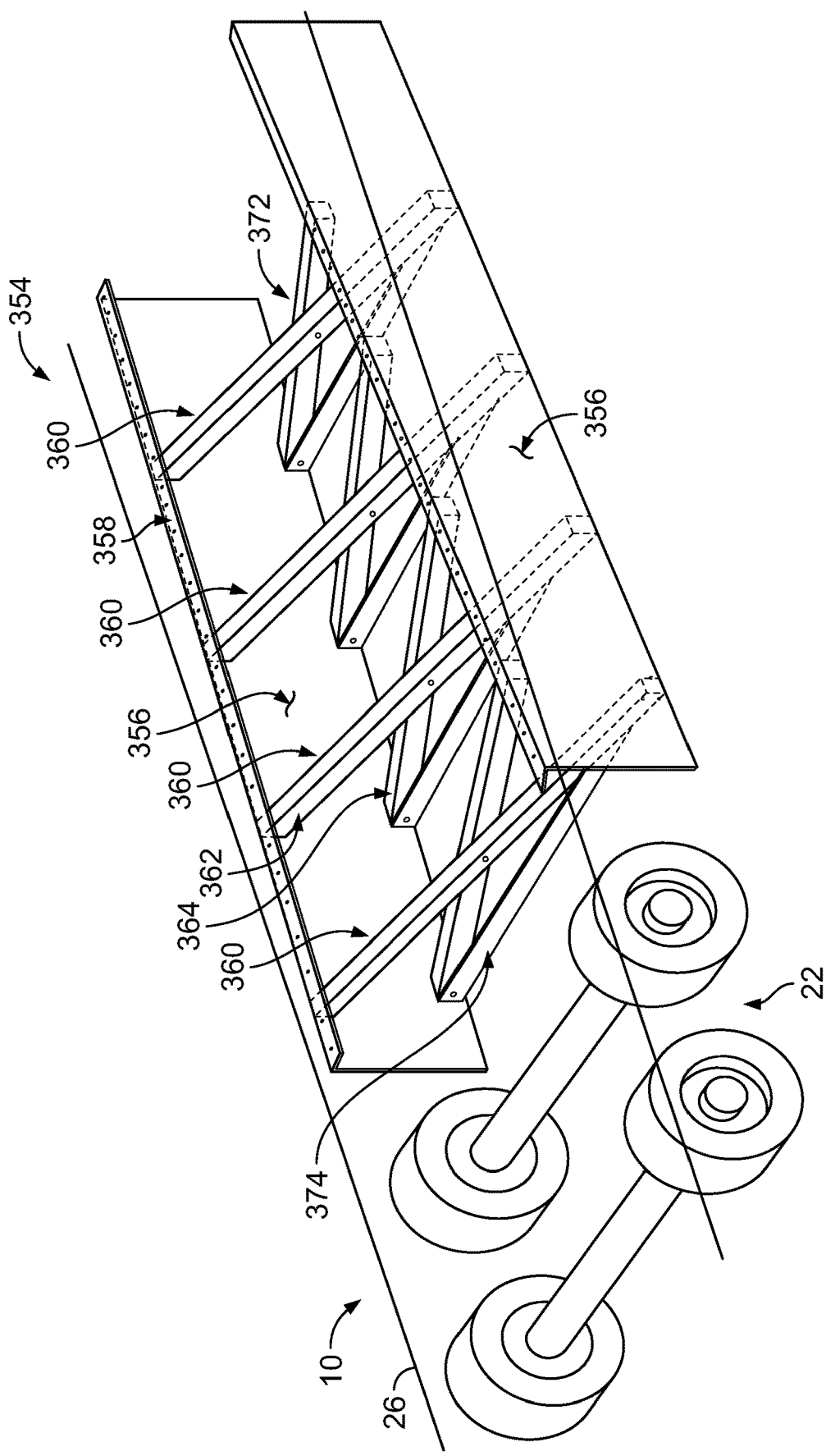
FIG. 33 is a perspective partial view of the side underride system of FIG. 32 with an alternate support system.

In other illustrative embodiments, the system 354 may include additional truss beams. For example, as shown in FIG. 33, the system 354 may include a third truss beam 374 positioned between the skirt walls 356 in a substantially horizontal orientation. The third truss beam 374 may be coupled to the skirt walls 356 and/or the first and second truss beams 362, 364 by a suitable coupling method (e.g., via bonding, welding, suitable fasteners such as pins, bolts, hinges, etc.).

Figure 34:
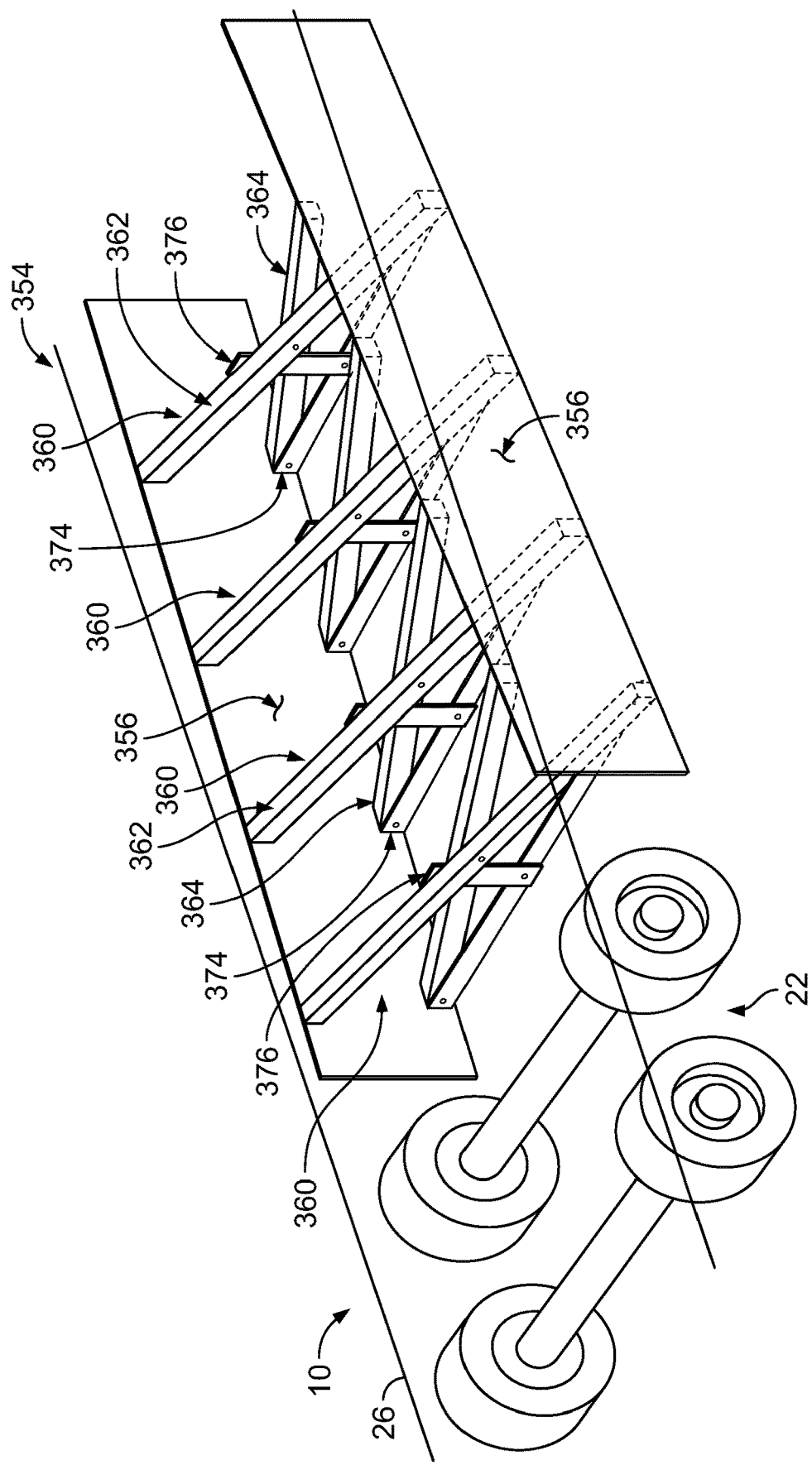
FIG. 34 is a perspective partial view of the side underride system of FIG. 32 with another alternate support system.

In another example, as shown in FIG. 34, the system 354 may include a fourth truss beam 376 positioned between the skirt walls 356 in a substantially vertical orientation. More specifically, the fourth truss beam 376 may be coupled to one or more of the diagonal truss beams 362, 364 at the intersection point 372 and to the horizontal truss beam 374 directly below the intersection point 372, although other coupling locations may be contemplated within the scope of this disclosure.

Figure 35:
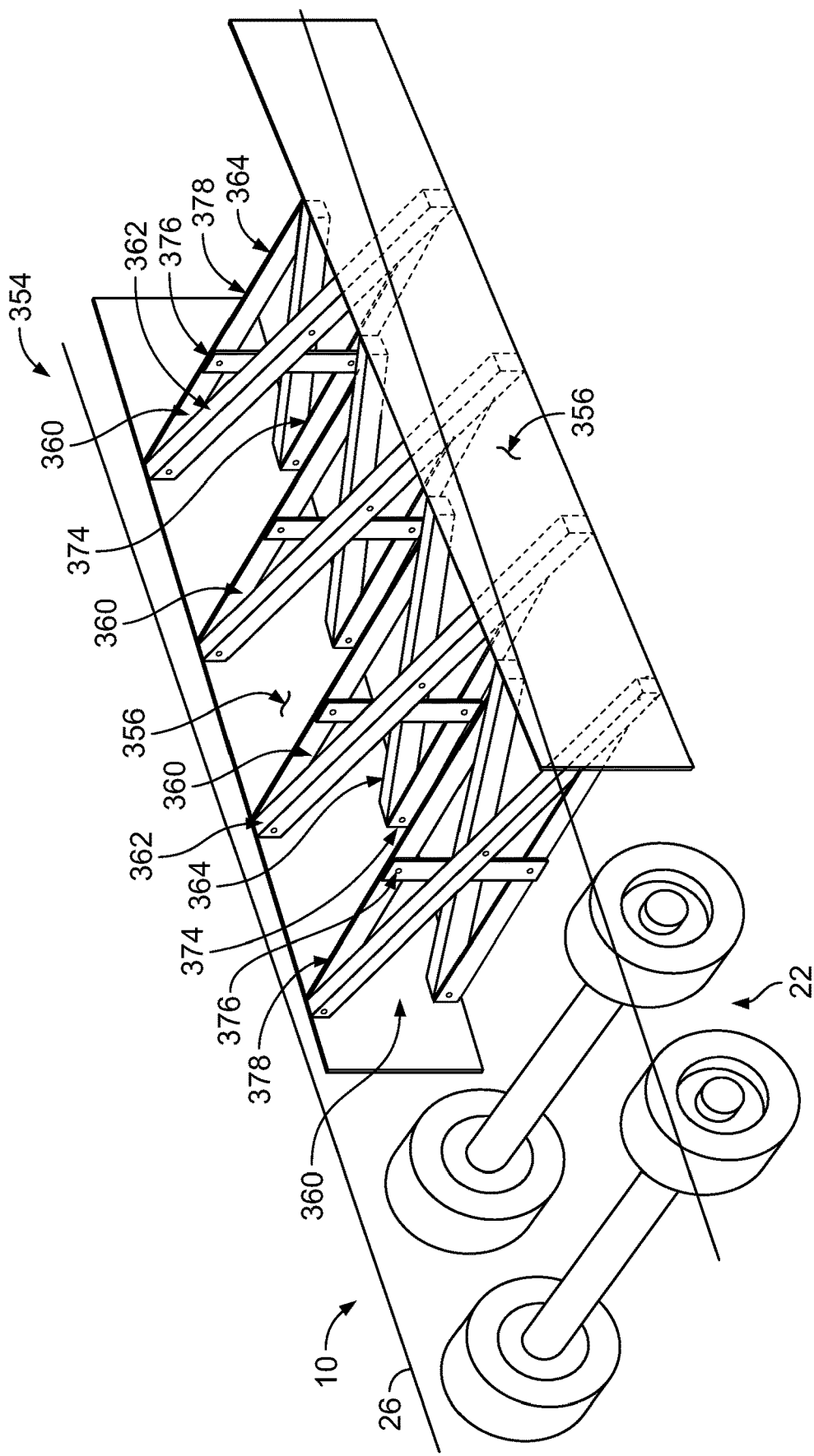
FIG. 35 is a perspective partial view of the side underride system of FIG. 32 with yet another alternate support system.

In yet another illustrative example, as shown in FIG. 35, the system 354 may include a fifth truss beam 378 positioned between the skirt walls 356 in a substantially horizontal position, parallel to the third truss beam 374. Illustratively, the third truss beam 374 may be coupled to the skirt walls 356 at lower edges thereof, while the fifth truss beam 378 may be coupled to the skirt walls 356 at upper edges thereof. Similar to the third truss beam 374, the fifth truss beam 378 may be coupled to the skirt walls 356 and/or the first and second truss beams 362, 364 by any suitable coupling (e.g., via the connectors 366, welding, other suitable fasteners, etc.). Also, the fourth truss beam 376 may extend from the third truss beam 374, past the intersection point 372 of the diagonal truss beams 362, 64, and to the fifth truss beam 378, thus permitting all truss beams 362, 364, 374, 376, 378 to be coupled together between the skirt walls 356.

The above-described cross-braces 360 may include truss members with various cross-sections that offer suitable column compression and buckling strength. Furthermore, the cross-braces 360 may include material that is substantially rigid, but lightweight. For example, the cross-braces 360 may include any suitable material such as, but not limited to, metallic extrusions (such as extruded aluminum), roll formed high-strength aluminum alloy or high-strength steel, fiber reinforced polymeric matrix pultrusions, galvanized steel sheet stampings, or any other suitable material or materials. Generally, any suitable material includes suitable strength and lightweight features, and is conducive to form strong connections via riveting, bolting, bonding or other methods. According to one specific example, the cross-braces 360 may include pre-made, fiber-reinforced, plastic truss beams.

In any of the embodiments of FIGS. 32-34 (or FIGS. 36-37), it is not necessary to include a rail or other rigid structure connecting bottom ends of the first and second diagonal truss beams 362, 364 (for example, as seen with rail member 112 in FIG. 15). Rather, the first and second skirt walls 356 provide stability, structural support, and an interconnection between lower (and upper) ends of the first and second diagonal truss beams 362, 364, respectively. More particularly, for example, if a rigid skirt is utilized (such as DURAPLATE®), the skirt may be rigid enough to provide the necessary structure support. Further, the first and second diagonal truss beams 362, 364 need not be coupled directly to the floor assembly 26 of the trailer. Rather, the diagonal truss beams 362, 264 and/or the truss beams 378 may be coupled to the base rail 28 (or any other suitable component), for example, between the cross members 40 of the floor assembly 26 (and not directly connected to the floor assembly 26). As shown in FIG. 4, for example, the truss beams 378 are not coupled directly to the floor assembly 26 of the trailer.

Figure 36:
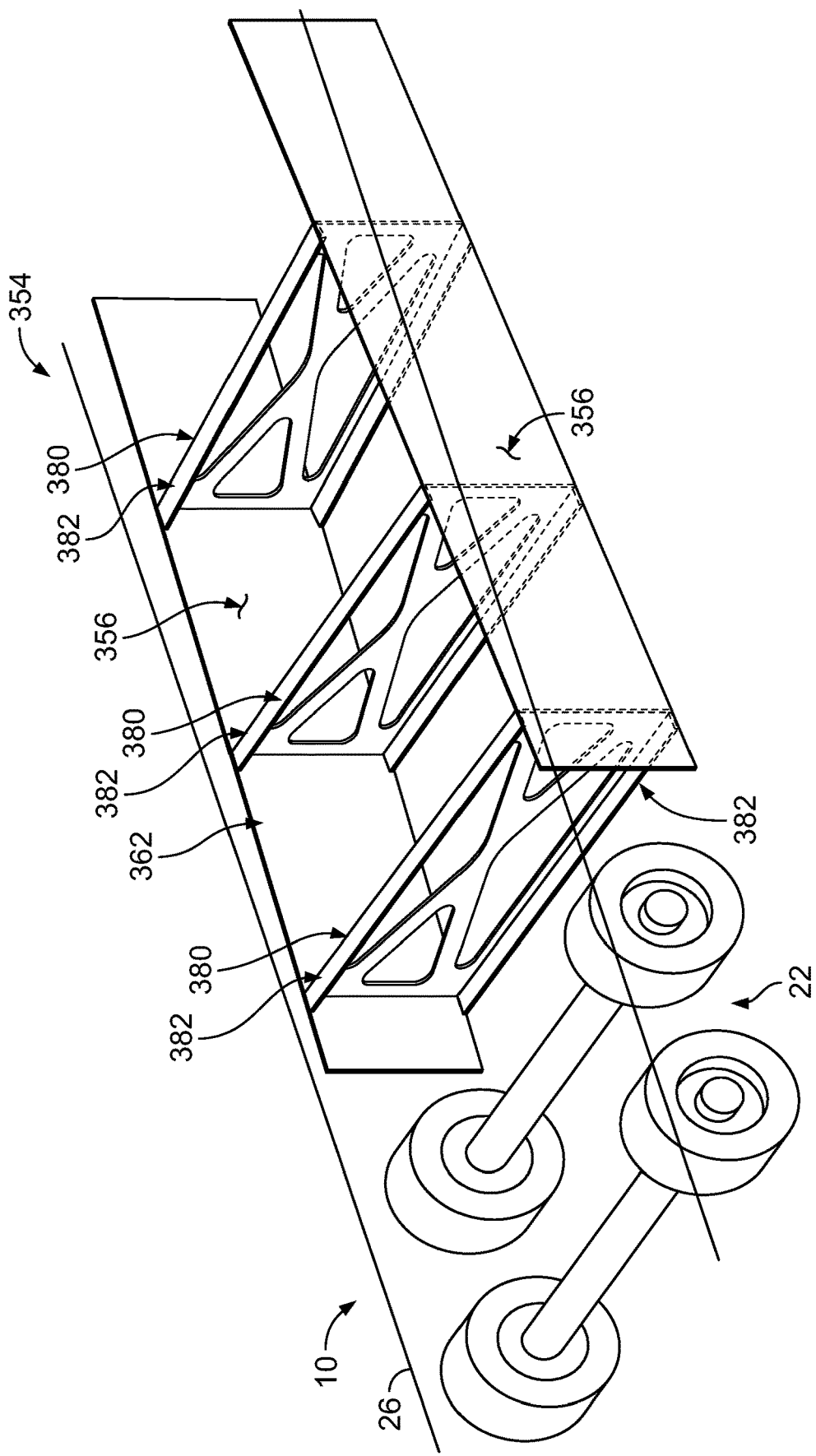
FIG. 36 is a perspective partial view of the side underride system of FIG. 32 with yet another alternate support system.
Figure 37:
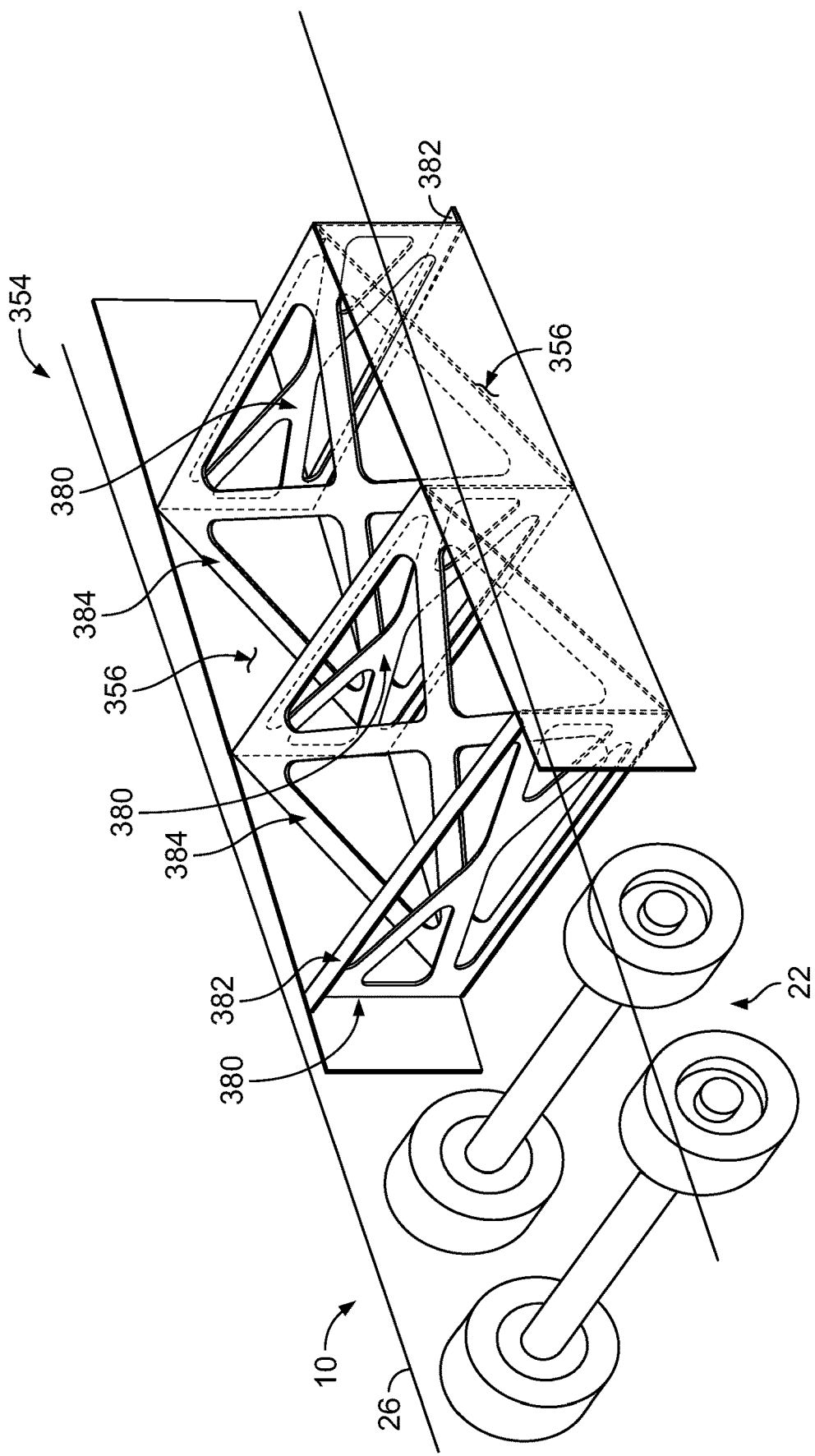
FIG. 37 is a perspective partial view of the side underride system and support system of FIG. 36 with additional cross-braces.

Other configurations of truss beams in addition to those illustrated and described herein may be contemplated within the scope of this disclosure. Furthermore, while the cross-braces 360 are illustrated and described herein as having separate interconnected truss beams 362, 364, 374, 376, 378, it is within the scope of this disclosure to include unitary cross-braces. For example, in another illustrative embodiment, a system 354 may include alternate cross-braces 380, 384 as shown in FIGS. 36-37. In particular, the cross-braces 380, 384 may include a unitary structure with truss-like bracing or webbing that extends across a width of the trailer 10 between the skirt walls 356 and includes a height about equal to the height of the skirt walls 356 (though other heights may be contemplated). The cross-braces 380, 384 may be coupled to the skirt walls 356 and/or the floor assembly 26. For example, the cross-braces 380 may include upper and/or lower mounting surfaces 382, wherein each upper mounting surface 382 may be coupled to a cross member 40 of the floor assembly 26 at one or more locations along the length of the cross member 40 (i.e., along a width of the trailer 10). In other embodiments, the cross-braces 380 may be integral with the cross members 40 of the floor assembly 26, I-beams of the floor assembly 26, or any other structure of the trailer and/or the skirt walls 356.

The cross-braces 380, 384 of FIGS. 36 and 37 may include various cross-sections and specific shapes that provide column compression and buckling strength. Furthermore, the cross-braces 360, 380, 384 may include material that is substantially rigid, but lightweight. For example, the cross-braces 360, 380, 384 may include any suitable material such as but not limited to, a metallic formed sheet from e.g., high-strength aluminum alloy, high-strength steel, fiber reinforced polymeric matrix plate, or other suitable material or materials. For example, the cross-braces 380, 384 may also or alternatively include compression molded composite laminates and/or foam cores structures. Generally, any suitable material includes suitable strength and lightweight features, and is conducive to form strong connections via riveting, bolting, bonding or other methods. According to one specific example, the cross-braces 380, 384 may include compression-molded, fiberglass-reinforced plastic.

As shown in FIG. 36, the system 354 may include first, second, and third cross-braces 380 equally spaced apart and each oriented substantially vertically. However, it is contemplated within this disclosure to include more or fewer cross-braces 80 along a length of the trailer 10. Furthermore, as shown in FIG. 37, the system 354 may include vertical cross-braces 380 as well as one or more diagonal cross-braces 384 positioned between adjacent vertical cross-braces 380. Illustratively, a diagonal cross-brace 384 may be coupled to a lower mounting surface 382 of a first vertical cross-brace 380 and to an upper mounting surface 382 of an adjacent vertical cross-brace 380. The diagonal cross-braces 384 may be similar in structure to the vertical cross-braces 380, though may be shorter or longer in order to traverse the interval between adjacent cross-braces 380.

As described above, the cross-braces 360, 380, 384, via the truss beams or truss-like structures, may provide sufficient strength and support between the skirt walls 356 to help reduce the chances of vehicle underride during a side impact collision. Furthermore, due to the interlocking truss beams or truss-like structures, the cross-braces 360, 380, 384 may operate to absorb some of the force and energy of any impact thereto to potentially decrease any forces on the passengers within an automobile that impacts the trailer 10. The cross-braces 360, 380, 384 may also compress, deflect, or collapse slightly under impact (i.e., under lateral forces) to further absorb such forces. In some embodiments, the movable hinged coupling between the skirt walls 356 and the trailer 10 may also help the system 354 absorb energy upon impact.

The cross-braces 360, 380, 384 may be formed with any suitable number of apertures having any suitable shape. In this manner, the weight and material of the cross-braces 360, 380, 384 is reduced, while maintaining sufficient strength to help reduce the chances of vehicle underride during a side impact collision. In other embodiments, one or more of the cross-braces 360, 380, 384 may be made of an uninterrupted material.

To potentially increase such protection across the length of the system 354 and, more specifically, to potentially increase the chances that a passenger vehicle colliding with a skirt wall 356 may engage at least one of the cross-braces 360, 380, 384 upon impact, the cross-braces 360, 380, 384 may be sufficiently spaced apart along the length of the trailer 10 at intervals less than an average car width. However, other interval widths (constant or variable) may be contemplated within the scope of this disclosure. Furthermore, it is within the scope of this disclosure for a side underride system 354 to include one or more combinations of different cross-braces 360, 380, 384.

Figure 38:
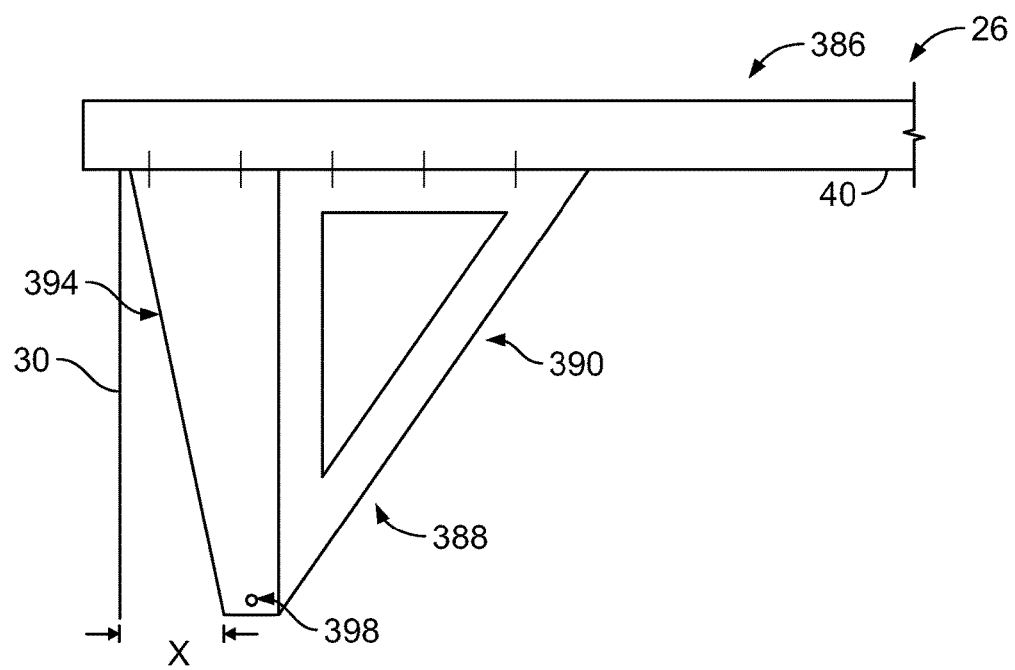
FIG. 38 is a partial plan view of another side underride system including a tiltable aerodynamic side skirt system and a support system between portions of the side skirt system.
Figure 39:
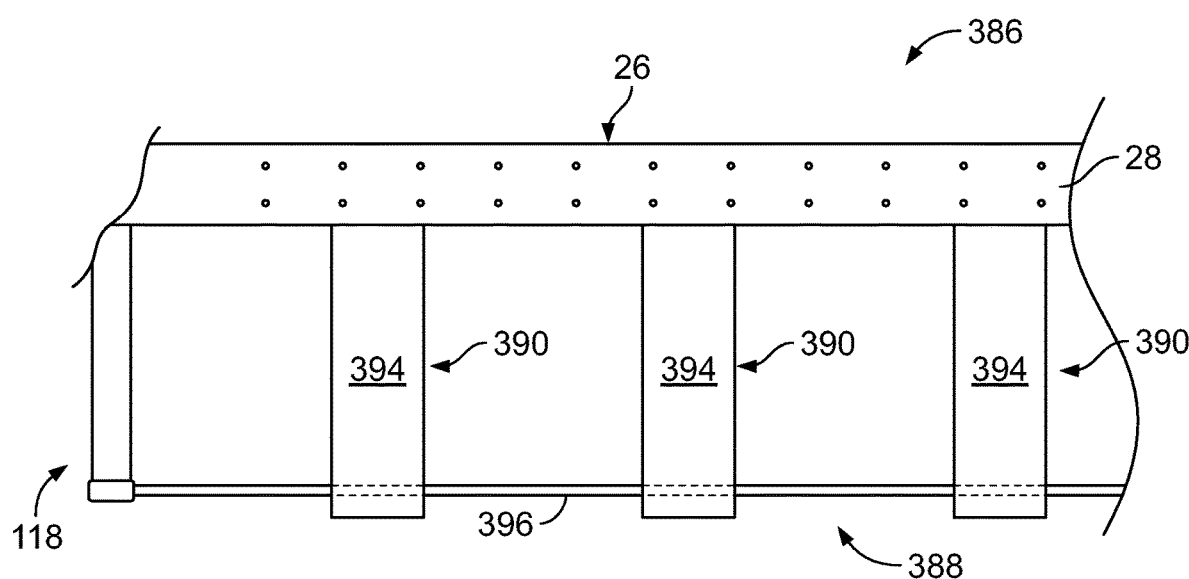
FIG. 39 is partial side view of the side underride system of FIG. 38.

Referring now to FIGS. 38 and 39, according to another illustrative embodiment, a side underride system 386 may be retrofit with an existing skirt system 12 on a trailer 10 and include a support system 388 with one or more brackets 390 positioned behind and spaced-apart from the skirt system 12. It should be noted that the side underride system 386 may alternatively be a completely new system including a side skirt system 12 with a support system 388.

The skirt system 12 may be the same as that described above with respect to FIGS. 1-3 (or any other suitable skirt system). In particular, the skirt system 12 may be coupled to the floor assembly 26 in a manner that permits the skirt system 12 to tilt laterally inward and outward with respect to the cross members 40 (e.g., with mounting bracket assemblies or a hinge assembly). The skirt system 12 may extend generally between the landing gear 24 and the rear wheel assembly 22 of the trailer 10, or may extend along a greater or a lesser length of the trailer 10. For example, the skirt system 12 may extend along the entire, or substantially the entire, length of the trailer 10 (such as from the landing gear 24 to a rear impact guard 118 (FIG. 18 or 24) positioned at the rear of the trailer 10 and extending downward from the rear wall 18) or may be modified to extend along only a small portion of the length of the trailer 10.

The brackets 390 of the support system 388 may be triangular brackets coupled to the floor assembly 26 behind the skirt walls 30 of the skirt system 12. For example, the brackets 390 may each be coupled to a respective cross member 40 or to the base rail 28 through welding, bolting, fasteners, and/or another suitable coupling. In some embodiments, the brackets 390 may also be coupled to the rear impact guard 118, the landing gear 24, and/or other mounting bracket assemblies.

Furthermore, as shown in FIG. 37, the brackets 390 may be positioned relative to the skirt walls 30 so that a lower edge of each bracket 390 is spaced a distance "X" laterally inward from a vertical end of the skirt wall 30. This distance X may be sized to provide substantial clearance to allow the skirt wall 30 to tilt laterally inwardly to potentially avoid damage of the skirt wall 30 when the trailer 10 traverses into or over a fixed, immovable obstacle, for example, as described above. While the bracket 390 is illustrated in FIG. 10 as having an angled side surface 394, it is within the scope of this disclosure to include brackets 390 with substantially straight side surfaces 394 (e.g., parallel to the side walls 14 of the trailer 10).

The brackets 390 may further provide strength and energy absorption to the system 386 in the event of a side impact collision. In particular, during a side impact collision, the skirt walls 30 may initially flex inwardly and contact the side surfaces 394 of the brackets 390. However, the brackets 390 may help prevent the skirt walls 30 from bending or folding further laterally inwardly and, thus, reduce the risk of vehicle underride beneath the trailer 10. The brackets 390 may include steel (such as high strength steel, HSS), composite material (such as molded structure composites, MSC), or any other suitable material.

To provide sufficient support, the brackets 390 may be spaced apart across the length of the trailer 10 behind the skirt walls 30. In one example, the brackets 390 may be spaced apart at about four-foot intervals so that, at any impact location, an impacting vehicle may strike a bracket 390; however, other constant or varying interval lengths may be contemplated within the scope of this disclosure. Furthermore, as shown in FIG. 39, the support system 388 may include one or more cables 396 that traverse the intervals between adjacent brackets 390. For example, each bracket 390 may include an aperture 398 positioned near the lower edge thereof (or at any location along the height of the bracket 390). The cable(s) 396 may be routed through the apertures 398 to form a support system 388 of connected brackets 390 across a length of the trailer 10.

As shown in FIG. 39, the cable(s) 396 may terminate at the rear impact guard 118. For example, the cable(s) 396 may be permanently or removably coupled to the rear impact guard 118 (such as to a bumper, a bumper support member, or any other component of the rear impact guard 118). Similarly, the cable(s) 396 may terminate at the landing gear 24. Alternatively, the cable(s) 396 may also be routed across a width of the trailer 10 through the rear impact guard 118, the landing gear 24, or other mounting brackets to generally form a continuous cable loop around the trailer 10.

Illustratively, the cable(s) 396 may be steel cables and may be approximately three-eighths to ½ inch in diameter. Of course, it is within the scope of this disclosure to include any number of cables made from other suitable materials including composite rope, composite fibers, and other suitable high strength, low stretch materials, and having other suitable diameters. Further, the cable(s) 96 may be covered in ballistic nylon or canvas. Any of the cable concepts disclosed herein may also be utilized with the embodiment of FIGS. 38 and 39.

As described above, a trailer 10 may be provided with a side underride system including a side skirt system with skirt walls and a support system with any number of cross-braces or brackets between the skirt walls. Any one of the support systems may be retrofit with existing skirt systems, may be added with new skirt systems, or may completely replace existing skirt systems. For example, in replacement systems, the support system may support the skirt walls, thus potentially eliminating the need, costs, and weight of additional mounting bracket assemblies for supporting the skirt system. The above-described side underride system may provide dual functions of potentially improving aerodynamic efficiency (i.e., via the skirt system) and providing side underride protection (i.e., via the skirt system and the support system). Such side underride protection may reduce the risk of passenger vehicle underride in the event of a side impact collision, as well as reduce the risk of pedestrians, bicyclists, or motorcyclists from falling or sliding under the trailer 10, for example, between the landing gear and the rear wheel assembly.

The cables extending past (i.e., laterally adjacent) the rear wheel assembly may inhibit movement of objects into an area around the rear wheel assembly without material coupled to portions of the first and second cables adjacent the rear wheel assembly. This may enable such movement of objects while allowing some access to the rear wheel assembly and lessening interference between skirt or tarp members that might be caused by such members extending past (i.e., laterally adjacent) the rear wheel assembly.

Any of the skirt systems, skirt walls, skirt members, etc. may be made of a sandwich composite including a honeycomb core and metal or plastic outer sheets, or the wall panels 32 may be made of a fiber-reinforced plastic composite. Further, such components may be of any number of suitable, non-composite materials such as metals, metal alloys, and/or plastics, for example.

Any of the support systems and/or side underride guards disclosed herein may be utilized alone or in combination with one or more skirt systems, for example, those described with respect to FIGS. 1-3 or any of the other skirt systems disclosed herein or other suitable skirt systems.

Any of the features of any of the embodiments disclosed herein may be combined with any of the other features disclosed herein or incorporated in any of the embodiments disclosed herein.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. For example, any of the features or functions of any of the embodiments disclosed herein may be incorporated into any of the other embodiments disclosed herein.

We claim:

1. A side underride system configured to be coupled to a trailer, comprising:
    a first skirt wall coupled to the trailer, positioned below a first side wall of the trailer, and extending along a first length of the trailer between a skirt wall front end and a skirt wall rear end; and
    a cable system including a first cable coupled to the trailer, positioned below the first side wall, and extending along a second length of the trailer between a cable system front end and a cable system rear end, the skirt wall rear end being positioned forward of the cable system rear end.

2. The side underride system of claim 1, wherein the first length of the skirt wall extends from an area near landing gear of the trailer to an area forward of a rear wheel assembly of the trailer, and the second length of the cable system extends from an area forward of the rear wheel assembly of the trailer to a point rearward of the rear wheel assembly.

3. The side underride guard of claim 1, wherein the skirt wall further includes a cable separate from the cable system and extending along at least a portion of the skirt wall.

4. The side underride system of claim 1, wherein the skirt wall includes:
    a planar material extending along at least a portion of the first length; and
    one or more horizontal cables coupled to and extending along at least a portion of the planar material.

5. The side underride system of claim 1, wherein the skirt wall is formed of a substantially flexible material.

6. The side underride system of claim 1, wherein the first and second lengths do not overlap.

7. The side underride system of claim 1, wherein the skirt wall is coupled directly to a cross-member of a floor assembly of the trailer.

8. The side underride guard of claim 4, further including a mounting bracket coupled to the trailer near a rear end of the skirt wall, wherein both the skirt wall rear end and the cable system front end are coupled to the mounting bracket, and wherein the one or more horizontal cables is routed through an aperture in the mounting bracket.

9. The side underride guard of claim 1 further including at least one diagonal truss beam coupled to the skirt wall.

10. A side underride system configured to be coupled to a trailer, comprising:
    a skirt assembly including (i) a first skirt wall coupled to the trailer, positioned below a first side wall of the trailer, and extending between a front of the trailer and a location forward of a rear wheel assembly of the trailer, and (ii) a first cable coupled to the first skirt wall; and
    a cable system including a second cable coupled to the trailer, positioned below the first side wall, and extending from a second location forward of the rear wheel assembly of the trailer to a location rearward of the rear assembly.

11. The side underride system of claim 10, wherein the skirt wall is formed of a flexible material.

12. The side underride system of claim 10, further including a mounting bracket coupled to the trailer, a rear end of the first cable and a forward end of the second cable being coupled to the mounting bracket.

13. The side underride system of claim 10, wherein the second cable is removably coupled to the trailer such that the rear wheel assembly of the trailer may be accessed upon removal of the second cable.

14. The side underride system of claim 10, wherein the first cable has a first longitudinal length along a length of the trailer, the second cable has a second longitudinal length along the length of the trailer, and the first and second longitudinal lengths do not overlap.

15. The side underride guard of claim 10, wherein a first end of the second cable is coupled to a mounting bracket forward of the rear wheel assembly and a second end of the second cable is coupled to a rear impact guard positioned rearward of the rear wheel assembly such that the second cable extends over the rear wheel assembly.

16. A side underride system configured to be coupled to a trailer, comprising:
    a cable system including
    (i) a first cable having a first terminal end configured to be coupled to a first side of the trailer forward of a rear wheel assembly of the trailer and a second terminal end configured to be coupled to the trailer rearward of the rear wheel assembly of the trailer and
    (ii) a second cable having a first terminal end configured to be coupled to a second side of the trailer forward of the rear wheel assembly of the trailer and a second terminal end configured to be coupled to the trailer rearward of the rear wheel assembly of the trailer, the first and second cables extending past the rear wheel assembly inhibiting movement of objects into an area around the rear wheel assembly without material coupled to portions of the first and second cables adjacent the rear wheel assembly.

17. The side underride system of claim 16, wherein the second ends of the first and second cables are configured to be attached to and terminate at a rear impact guard of the trailer.

18. The side underride system of claim 16, wherein the first ends of the first and second cables are configured to be attached to and terminate at a mounting bracket coupled to the trailer or an aerodynamic skirt coupled to the trailer.

19. The side underride system of claim 16, wherein the first and second cables are configured to be selectively attached to and detached from the trailer.

20. The side underride system of claim 16, wherein the first and second cables are sized to extend a distance less than half of a length of the trailer to which the first and second cables are attached.

* * * * *